US010871361B2

(12) United States Patent
Skowron et al.

(10) Patent No.: US 10,871,361 B2
(45) Date of Patent: Dec. 22, 2020

(54) METAL INJECTION MOLDED CASED TELESCOPED AMMUNITION

(71) Applicant: Concurrent Technologies Corporation, Johnstown, PA (US)

(72) Inventors: Todd Skowron, Johnstown, PA (US); Juan Valencia, Johnstown, PA (US); Shawn Rhodes, Somerset, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 8 days.

(21) Appl. No.: 15/729,983

(22) Filed: Oct. 11, 2017

(65) Prior Publication Data

US 2018/0066925 A1 Mar. 8, 2018

Related U.S. Application Data

(63) Continuation-in-part of application No. 15/635,694, filed on Jun. 28, 2017.
(Continued)

(51) Int. Cl.
*F42B 33/00* (2006.01)
*F42B 5/28* (2006.01)
(Continued)

(52) U.S. Cl.
CPC ............ *F42B 33/00* (2013.01); *B22F 1/0062* (2013.01); *B22F 3/16* (2013.01); *B29C 45/00* (2013.01); *F42B 5/045* (2013.01); *F42B 5/28* (2013.01)

(58) Field of Classification Search
CPC .......... F42B 5/28; F42B 33/00; F42B 33/001; F42B 5/02; F42B 5/045; F42B 5/26
(Continued)

(56) References Cited

U.S. PATENT DOCUMENTS 4,220,089 A 9/1980 Smith
4,494,461 A 1/1985 Pryor et al.
(Continued)

OTHER PUBLICATIONS

Notification of Transmittal of the International Search Report and the Written Opinion of the International Searching Authority, International Search Report and Written Opinion of the International Searching Authority for PCT/US2017/050400, dated Feb. 13, 2018 (11 pages).

*Primary Examiner* — James S Bergin
(74) *Attorney, Agent, or Firm* — Buchanan Ingersoll & Rooney PC

(57) ABSTRACT

Disclosed is a cartridge case for various caliber ammunition that can consist essentially of a powdered metal and/or powdered metal alloy(s) that is formed into the cartridge case through an injection mold processing. Also disclosed is a method for forming a cartridge case, which may include use of Metal Injection Molding ("MIM") processes to produce the cartridge case which retains a primer, propellant, and/or a bullet. Also disclosed are embodiments related to a case telescoped cartridge that may include a cap and a body. The body can consist essentially of or consists entirely of a powdered metal and/or powdered metal alloy(s) that has been formed through MIM. The cap can comprise plastic that has been formed through plastic molding or comprise powdered metal and/or powdered metal alloy(s) that has been formed through MIM.

17 Claims, 65 Drawing Sheets
(59 of 65 Drawing Sheet(s) Filed in Color)

Related U.S. Application Data

(60) Provisional application No. 62/384,383, filed on Sep. 7, 2016.

(51) Int. Cl.
*F42B 5/045* (2006.01)
*B29C 45/00* (2006.01)
*B22F 1/00* (2006.01)
*B22F 3/16* (2006.01)

(58) Field of Classification Search
USPC .................................. 102/464, 468, 469, 470
See application file for complete search history.

(56) References Cited

U.S. PATENT DOCUMENTS

| | | |
|---|---|---|
| 7,059,234 B2 | 6/2006 | Husseini |
| 8,561,543 B2 | 10/2013 | Burrow |
| 9,032,855 B1 | 5/2015 | Foren et al. |
| 10,041,770 B2 * | 8/2018 | Burrow ..................... F42B 5/02 |
| 2011/0189440 A1 | 8/2011 | Appleby et al. |
| 2016/0033241 A1 | 2/2016 | Burrow |
| 2016/0131463 A1 | 5/2016 | Stauffer |
| 2017/0089672 A1 | 3/2017 | Burrow |
| 2018/0065183 A1 * | 3/2018 | Skowron ................ B21K 21/04 |

* cited by examiner

| | Max Bolt Force (lbf) | Max Extraction Force (lbf) | Plastic Strain in Case After Firing (in/in) | Primer Pocket Max Elastic Radial Deformation (mils) | Primer Pocket Permanent Plastic Radial Deformation (mils) | Average Peak Contact Pressure During Firing *** (psi) |
|---|---|---|---|---|---|---|
| Baseline Brass MMC | 15,863 | 983 | 0.084 | 0.60 | 0.03 | 47,212 |
| Baseline Brass LMC | 17,656 | 745 | 0.084 | 0.80 | 0.20 | 46,937 |
| MIM Brass Baseline | 11,522 | 1,043 | 0.071 | 0.51 | 0.00 | 45,229 |
| MIM 4140 Steel (As Sintered) | 9,874 | * | 0.037 | 0.61 | 0.30 | 44,820 |
| MIM 4140 Steel (Heat Treated) | 6,187 | 39 ** | 0.031 | 0.25 | 0.00 | 33,731 |
| MIM 17-4 Stainless (H1025) | 7,317 | 28 ** | 0.030 | 0.27 | 0.00 | 33,882 |
| MIM Ti-6AL-4V | 8,259 | 22 ** | 0.029 | 0.42 | 0.00 | 37,890 |
| MIM 6061-T6 | 11,917 | | 0.063 | 2.74 | 2.00 | 49,462 |

These use the same "hardened" brass material and hardness gradient. Provided to Compare geometry change of MIM case.

* Failure to extract, extraction force calculated based on residual contact pressure between case and chamber after firing

** Very low extraction forces resulting from high strength to modulus ratio

*** Contact pressure shown as a means of comparing obturation during firing

FIG. 7

| Material | Elastic Modulus (Mpsi) | Yield Strength (Kpsi) | Tangent Modulus (Kpsi) (up to 0.2 strain) | Theoretical Clearance After Firing Event (mils) |
|---|---|---|---|---|
| Cartridge Brass (Baseline) | 16 | 70 | 120 | 0.4 |
| 17-4 Stainless (H1025) | 28 | 155 | 140 | 0.9 |
| Ti-6V-4V | 15 | 112 | 155 | 1.6 |
| 4140 Steel (Heat Treated) | 30 | 60 | 151 | 0.9 |
| Steel (As Sintered) | 30 | 80 | 250 | -0.4 |
| 606-T6 | 10 | 36 | 150 | 0.2 |
| 6061-T4 | 10 | 18 | 150 | -0.5 |

| | | |
|---|---|---|
| Assumed Propellant Density (WC860) | d | 240.2 | grains/in³ |
| Target 50 Cal Charge Weight | w | 233.0 | grains |
| Average Vent Hole Volume ** | $V_{vent}$ | 0.0007 | in³ |
| Average Tapered Neck Volume Around Bullet ** | $V_{neck}$ | 0.0488 | in³ |
| Volume in Case Body | $V_{body}$ | See FIG. 19B | |

** Assumed to be constant for all designs

FIG. 18A

| | Material Density (lb/in³) | Case Weight (lb) | Weight Reduction From Baseline (%) |
|---|---|---|---|
| Baseline Brass Cartridge | 0.308 | 0.056 | N/A |
| MIM 4140 Steel Cartridge* | 0.282 | 0.055 | 2% ** |
| MIM 17-4 SS Cartridge* | 0.282 | 0.055 | 2% ** |
| MIM Ti-6Al-4V Cartridge* | 0.159 | 0.031 | 45% |
| MIM 6061 Aluminum Cartridge* | 0.098 | 0.019 | 66% |

\* MIM case design 1 used for volume and weight calculations.

\*\* It may be possible to further reduce 4140 HT and 17-4 weights by reducing volume in web and base to side wall transition with use of high yield strength material. However, further analysis and investigation are required to determine actual weight savings.

FIG. 19

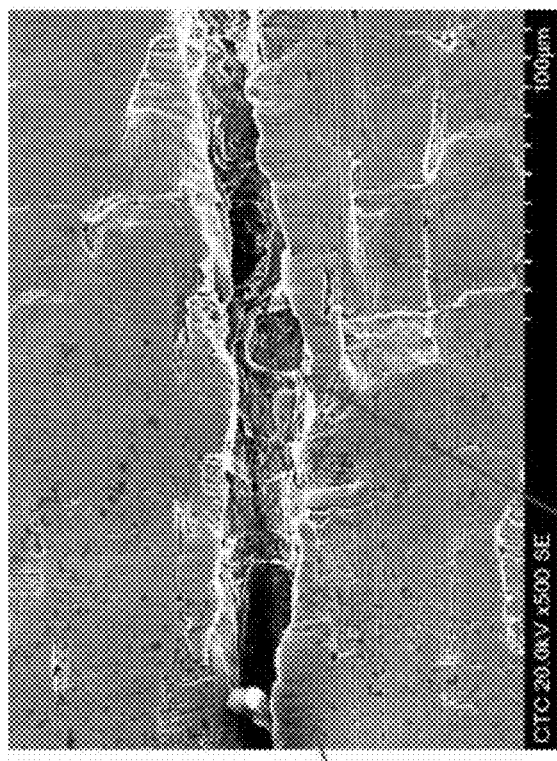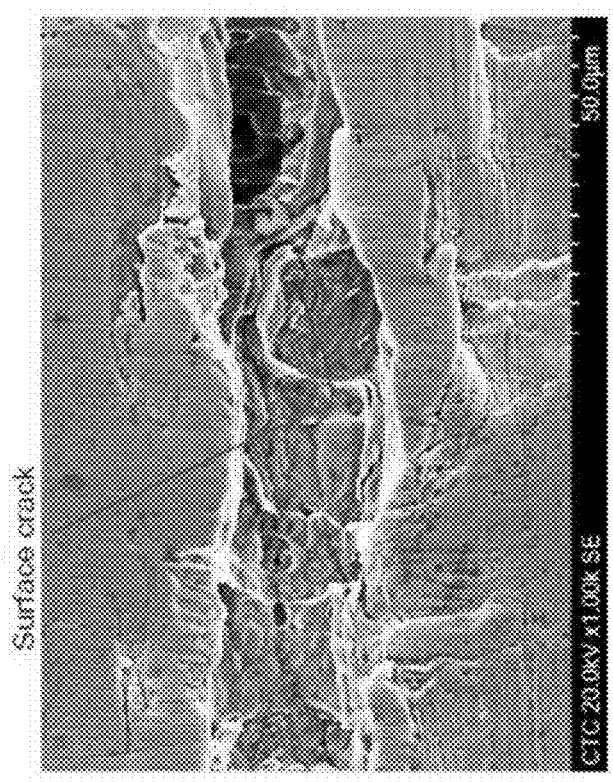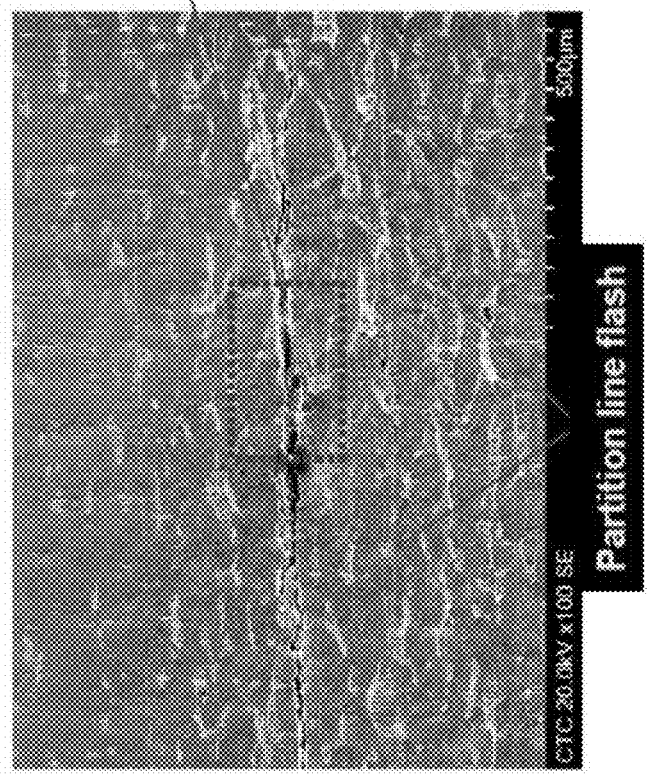
FIG. 32

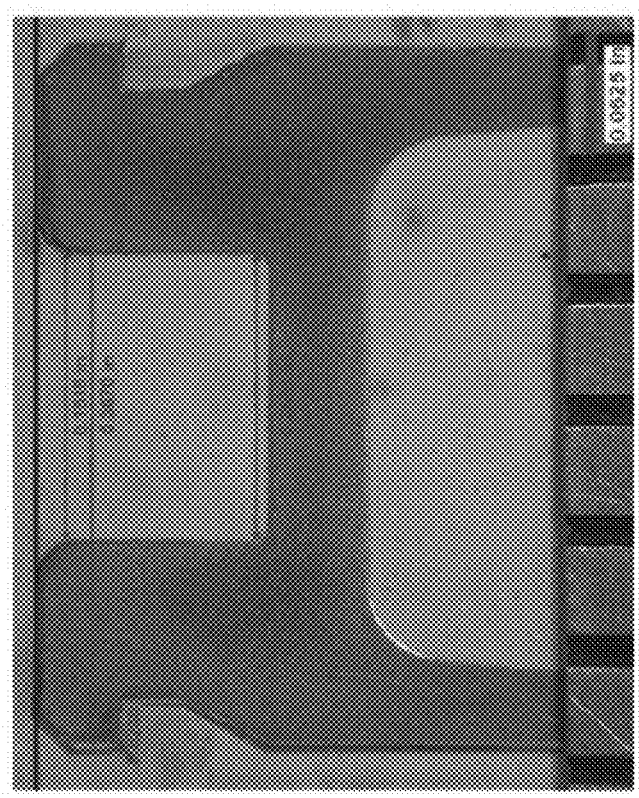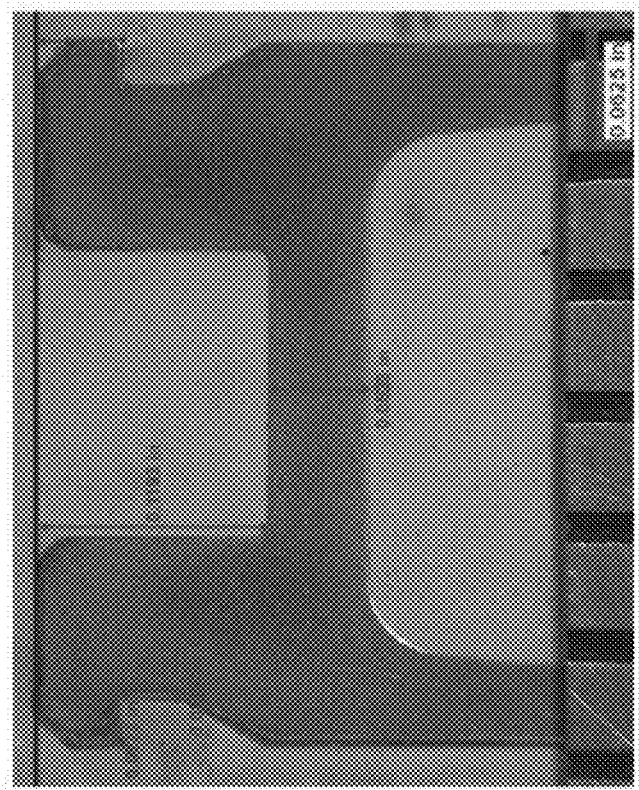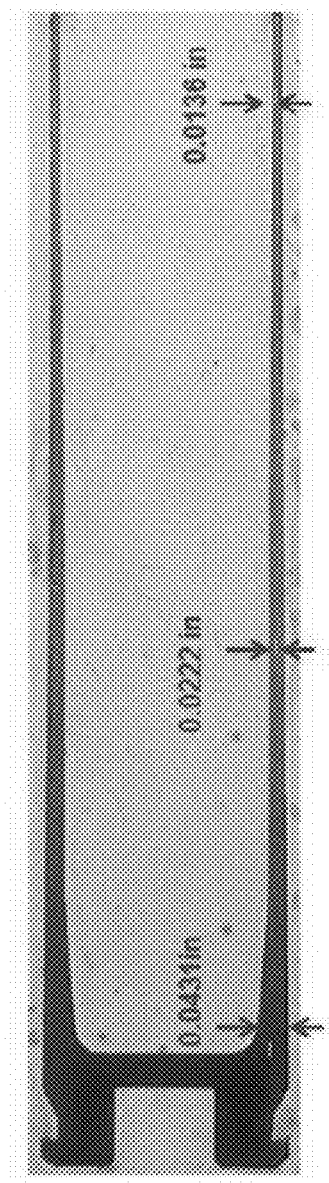
FIG. 44

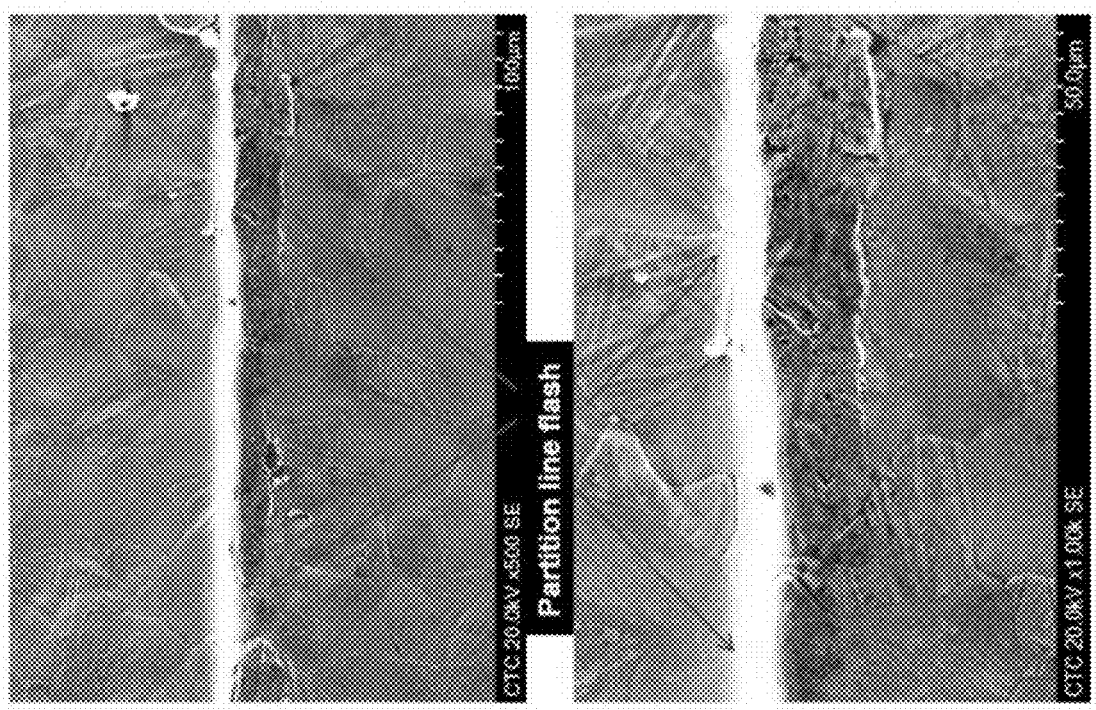
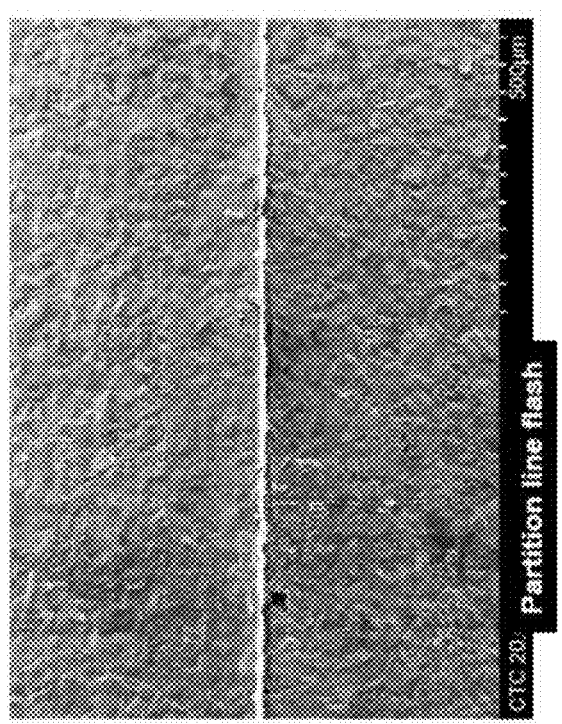
FIG. 55

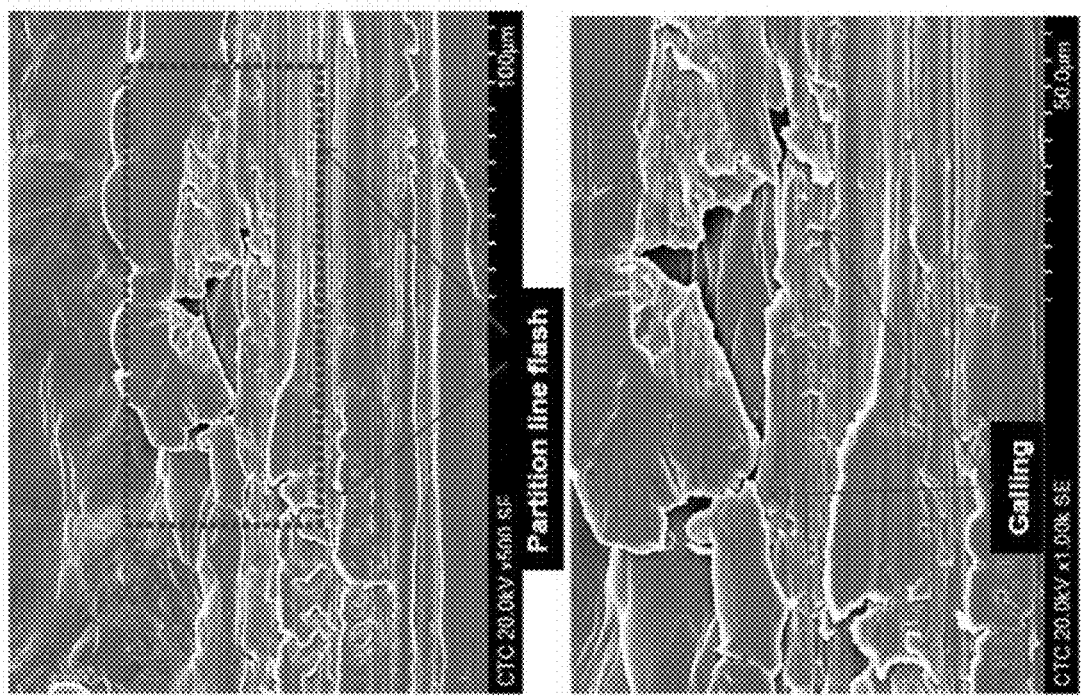
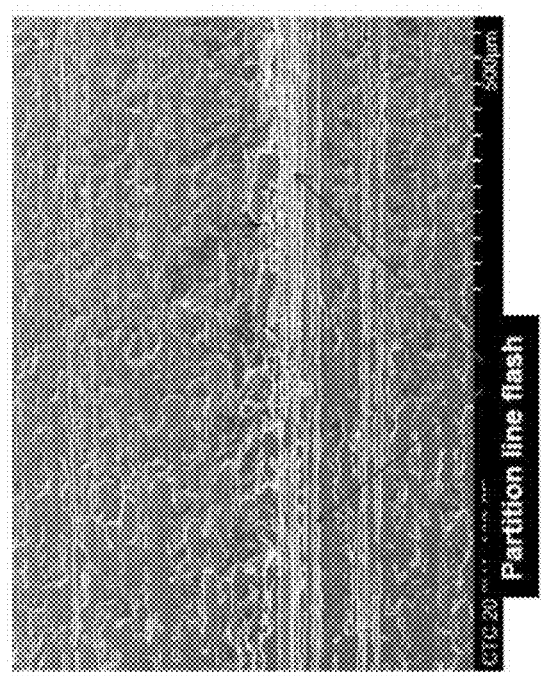
FIG. 56

METAL INJECTION MOLDED CASED TELESCOPED AMMUNITION

CROSS-REFERENCE TO RELATED APPLICATIONS

This application is a continuation-in-part application and claims the benefit of U.S. Utility application Ser. No. 15/635,694 entitled "Shell Case Design Utilizing Metal Injection Molding", filed on Jun. 28, 2017, which is related to and claims the benefit of U.S. Provisional Application No. 62/384,383 entitled "Shell Case Design Utilizing Metal Injection Molding", filed on Sep. 7, 2016, the entire contents of each are incorporated herein by reference.

STATEMENT REGARDING FEDERALLY SPONSORED RESEARCH

This invention was made with government support under DoD Contract No. W91ZLK-10-D005; Task No. 0823: CDRL A007 and DOTC Contract No. W15QKN-14-9-1001; Task No. DOTC 14-01-INIT388. The government has certain rights in this invention.

FIELD OF THE INVENTION

Embodiments herein relate to a cartridge case that can consist essentially of or consists entirely of a powdered metal and/or powdered metal alloy(s) that has been formed into the cartridge case through an injection mold processing. Also disclosed is a method for forming a cartridge case, which may include use of Metal Injection Molding (MIM) and, in particular, MIM technology that includes a propellant and a primer and is easily scalable for various caliber cartridge case geometries. Also disclosed are embodiments related to a cased telescoped ("CT") cartridge that may include an end cap and a body. The body can consist essentially of or consists entirely of a powdered metal and/or powdered metal alloy(s) that has been formed through MIM. The end cap can comprise plastic that has been formed through plastic molding or comprises powdered metal and/or powdered metal alloy(s) that has been formed through MIM.

BACKGROUND OF THE INVENTION

Small caliber ammunition production can be a complex process. The complexity can lead to high costs and inflexibility in the design and production of cartridge cases for the ammunition, and large variability and inconsistency that results in high scrap rates and non-conforming parts. It may be beneficial to have process by which the production of a cartridge case is simplified and/or streamlined, and can hold very tight tolerances while still being cost effective. It may also be beneficial to produce a cartridge case that consists essentially of or consists of a powdered metal or a powdered metal alloy(s) that has been formed via Metal Injection Molding ("MIM") procedures. Methods to generate cartridge casings with MIM processes exist, but these are limited in that only a small portion/section of the case is made via MIM processes (e.g., the case is made with an MIM formed insert). For example, the bulk of the case may comprise a polymer material (e.g., head, mouth, or body of the case) that is attached to a MIM portion to form the cartridge case. While these and similar methods may employ MIM processes, they too can lead to increased complexity, higher cost, and inflexibility. In addition, using such methods may not produce a cartridge case that meets all testing requirements such as, but not limited to, environmental conditioning tests, temperature extremes, rough handling, and pressures. Furthermore, such designs can exhibit failure due to the joints of the multi-piece designs.

With case telescoped ("CT") ammunition, the projectile is generally housed, or at least partially housed, within the cartridge case. The end of the cartridge case can include an end cap to retain and protect the projectile. The projectile may also be partially or completely enveloped by the body of the case cartridge. One of the benefits of CT ammunition can be that the projectile need not have to be exposed. This can assist with protecting and projecting the projectile. Further, the cartridge case may not require a tapered mouth, a rim, and/or an extractor groove. These aspects can reduce process steps and costs associated with producing the ammunition and simplify the operation of the weapons that use the ammunition. These aspects can also reduce length, numerous angles, shoulders, chamfers, geometric edges, and weight when compared to a ballistically similar traditional shouldered-style cartridge case. Some case telescoped ammunition can include caseless designs (e.g., a solid mass of propellant formed around the projectile and in a shape that complements that of the chamber of the weapon).

Conventional CT ammunition is generally limited to polymer materials made through plastic injection molding techniques. For example, the bulk of the cartridge case may comprise a polymer material and may also include the use of a polymer end cap, metal inserts, or additional parts to form the cartridge case. Reliance on polymer materials may inhibit or prevent compliance with environmental requirements, temperature extremes, rough handling, and may also lead to inadequate performance. Thus, it may be beneficial to produce a CT cartridge case that consists essentially of or consists entirely of a powdered metal or a powdered metal alloy(s) that has been formed via Metal Injection Molding ("MIM") procedures. It may be also beneficial to produce ammunition comprising a MIM CT cartridge case with a MIM end cap; however, the end cap may also comprise polymer and be produced via plastic injection molding.

The present invention is directed toward overcoming one or more of the above-identified problems.

SUMMARY OF THE INVENTION

Disclosed is a cartridge case that may be used for ammunition, where the cartridge case consists essentially of or consists of a powdered metal and/or a powdered metal alloy(s) that has been formed into the cartridge case through an injection mold processing. Also disclosed is a method of generating a cartridge case, which may include use of Metal Injection Molding ("MIM"). The method can further include use of Finite Element Method ("FEM") analytics or other analytical techniques to control the product characteristics by generating operational parameters and predictively optimizing them to meet and/or exceed ammunition requirements. With the inventive method, the MIM process can generate a cartridge case by simply: 1) injection molding, debinding, and sintering an initial part; and 2) tapering and/or trimming the initial part. The MIM cartridge case may also undergo secondary processing such as solution treatment, annealing, tempering, hardening, strengthening, tapering, etc. to further refine the properties for performance.

Also disclosed is a CT cartridge case that may be used for ammunition, where the CT cartridge case body consists essentially of or consists of a powdered metal and/or a powdered metal alloy(s) that has been formed into the cartridge case through an injection mold processing. Also disclosed is a method of generating a CT cartridge case, which may include use of MIM. The method can further include use of Finite Element Method ("FEM") analytics or other analytical techniques to control the product characteristics by generating operational parameters and predictively optimizing them to meet and/or exceed ammunition requirements. With the inventive method, the process can generate a cartridge case by simply: 1) injection molding a part using MIM to form a body of the ammunition case; 2) injection molding a part to form an end cap using MIM and/or plastic injection molding; 3) providing or producing a primer, propellant, and a projectile; and 4) assembling the ammunition by mating the body with the end cap and including the primer, the propellant, and the projectile. The cartridge case may also undergo secondary processing such as solution treatment, annealing, tempering, hardening, strengthening, forming, etc. to further refine the characteristics or performance.

The inventive method can provide a means to utilize alternative material (e.g., material other than brass) for the body portion of the ammunition case (shouldered cartridge case or a CT cartridge case). The inventive method can also provide a means to utilize alternative material (e.g., material other than a polymer) for the end cap portion of a CT ammunition case. Using MIM can be done to facilitate meeting desired production rates, reducing the load of a soldier carrying the ammunition comprising the cartridge case, reducing freight and shipping costs, holding tighter tolerances, meeting all testing requirements, allowing for increased and more consistent performance, and/or reducing resources required to produce cartridge cases. Such materials can include carbon steels, low alloy and high strength steel, precipitation hardening and high strength stainless steel, ferritic, austenitic, martensitic and duplex stainless steels, titanium-based alloys, high speed and tool steels, aluminum, aluminum alloys, tungsten carbides, nickel-based superalloys, nickel-iron, nickel iron-cobalt controlled expansion alloys, high density alloys, soft magnetic alloys, cobalt-based alloys, copper-based alloys, tungsten heavy alloys, elemental powder metals, etc. Other high and/or medium strength metals with sufficient strength to modulus ratios, ductility, elongation, hardness, tensile properties may also be used. Generally, any metal powder available in the metallurgical industry can be used in the feedstock material for MIM processing. It should be noted that some materials may not result in a reduction of weight. These can include tungsten, tungsten heavy alloys, tungsten carbides, high density alloys, and copper and copper based alloys.

Reference to a cartridge case herein can encompass various embodiments, each embodiment having a body portion with a head at its first distal end and a mouth at its second distal end. The various embodiments, however, can include various styles, where each style may be defined by certain features and an overall shape. Two general shapes can be shouldered and straight walled. A straight walled cartridge case generally has a body with no taper or little to no change in diameter. A shouldered cartridge case generally has a body with a slight taper and has stepped reduction in diameter forming a bottleneck configuration. Any of these general shaped cartridge cases can include other features, such as a rim, a primer pocket, an extractor groove, etc. Any one or combination of these shapes and features can be used to generate a cartridge style. General styles of cartridge cases can include shouldered cartridge case style, straight walled cartridge case style, centerfire cartridge case style, rimfire cartridge case style, and CT cartridge case style. Any one or combination of styles can be used to produce cartridge cases for various weapons. For example, some cartridge cases can be a rifle cartridge case, a pistol cartridge case, etc.

Unless specifically identified otherwise, reference to a cartridge case in this disclosure applies to any shape, style, and/or featured cartridge case. This can include straight walled shaped or shouldered shaped cartridge cases, shouldered cartridge case styles, straight walled cartridge case styles, centerfire cartridge case styles, rimfire cartridge case styles, CT cartridge case styles, rifle cartridge cases, pistol cartridge cases, etc. The MIM process for each can be the same or similar, but with the exception of secondary processing. For example, some shapes, styles, and/or features can require additional steps in the secondary processing of certain cartridge cases as compared to other cartridge cases. For instance, some shouldered shaped cartridge case designs can include a taper or bottleneck shape (e.g., shouldered-style cartridge case). The secondary processing for such cartridge case designs may include tapering the body, forming a shoulder, forming a neck, forming a rim, crimping the projectile, forming an extractor groove, etc. Some straight walled shaped cartridge case designs can include a body portion with straight sidewalls (e.g., straight wall cartridge case or CT cartridge case). The secondary processing for such cartridge case designs may omit any one or combination of tapering the body, forming a shoulder, forming a neck, forming a rim, crimping the projectile, forming an extractor groove, etc. Some secondary processing for CT cartridge case designs may also include producing an end cap and mating the body with the end cap. Some case designs can be a centerfire cartridge case. The secondary processing for such cartridge case designs may include forming a primer pocket. Some case designs may be rimfire cartridge cases. The secondary processing for such cartridge case designs may omit forming a primer pocket or a taper. However, some rimfire cartridge cases can be made by forming the primer pocket through the MIM process.

In some embodiments, FEM analytics or other analytical techniques can be used. This can facilitate generating a holistic approach when designing the cartridge case. For example, incorporation of FEM analysis methods via FEM software can be used to generate a holistic approach that factors in many variables into the design process for the MIM component. In some embodiments, the inventive method can use FEM analytics to provide inputs that may be used during the MIM process so that a MIM design can be optimized and meet target objectives. For example, the FEM software can be leveraged to determine which metals and/or metal alloys are feasible for a particular cartridge case or end cap design made by the MIM process. In this regard, the inventive method may cause the FEM software to take into account desired cartridge case or end cap material and mechanical characteristics, chamber pressures, weapon characteristics (e.g., chamber, bolt, and extractor forces), as well as other parameters that can enable the cartridge case or end cap to be made with the MIM process and to function properly during use in a weapon. Thicknesses, geometries, and other attributes of the cartridge case or end cap can also be specifically tailored to produce lighter weight and/or better performing cartridge cases. For example, the inventive method can allow for the use of higher strength or lightweight materials (in comparison to brass and other traditional cartridge case or end cap material), which can then enable tailoring certain geometries and dimensions of the cartridge case or end cap to lighten the cartridge case or end cap and/or increase the cartridge performance. The inventive method can thus provide for flexibility in mold design such that resulting cartridge case or end cap dimensions can be tailored to achieve material specific results which translates into enhances cartridge performance.

While embodiments disclosed herein may describe use of FEM techniques, FEM techniques are not required. Other analytical means can be used to apply the disclosed method and successfully produce a cartridge case or end cap.

MIM is a readily available technology that is robust and has extensive industrial applications, and thus use of the inventive method may not require significant capital expenditure for manufacturers. A MIM process used with the inventive method can utilize commonly available equipment. Such equipment can also be scaled up accordingly. Further, manufacturers can use the inventive method to generate the cartridge case or end cap while availing existing methods of more down-stream production processes (e.g., loading the propellant, seating the projectile, seating the primer, sealing the case interfaces, etc.) Thus, the inventive method can be easily incorporated into most, if not all, processes for producing ammunition without causing major overhauls, re-tooling, and/or other disruptions. FEM analytics and/or other analytics may be used to add robustness and flexibility into the cartridge case or end cap production process. This may enhance the ability to use different materials in the production of cartridge cases or end caps and to generate case or end cap dimensions tailored to achieve material specific results. For instance, a cartridge case consisting essentially or consisting of a powdered metal and/or a powdered metal alloy(s) can be made, where producing a cartridge case can: 1) retain traditional cartridge case dimensions set as standards for certain calibers of ammunition; 2) hold, contain, and/or be non-reactive with the propellant, the primer, and/or the projectile of the ammunition; 3) orient cartridge components in a weapon's chamber and/or align the projectile with a bore axis for proper engraving; 4) allow the cartridge case to recover after firing to permit easy extraction; 5) allow the cartridge case to act as a heat sink to reduce an amount of heat transfer to the weapon's chamber; 6) allow the cartridge case to be temperature resistant to avoid degradation and/or failure during firing; 7) facilitate sealing the breach of a weapon during the firing event, wherein progressive rearward obturation may be desirable; 8) survive handling, loading, and/or recoil forces; 9) be stable in long-term storage; 10) withstand harsh cold and hot environments; and/or 11) comprise a material that is non-sparking.

Use of the disclosed MIM processing methods and/or any of the analytical techniques can be used to engineer a cartridge case, an end cap, or any portion of each to meet varying pressure through geometrical design and/or material selection, to withstand higher internal pressures and/or temperatures that may affect the propellant (e.g., protect from burning the propellant), and/or to withstand environmental condition such as extreme cold and heat in a way that conventional methods cannot. Use of the disclosed methods can also facilitate producing a cartridge case, an end cap, or any portion of each with increased internal volume when compared to conventional cartridge designs. In addition, weight savings and/or enhanced performance can be achieved through material selection.

Although exemplary embodiments describe use of the inventive method for small caliber cartridge cases, medium and large (i.e., any caliber) cartridge cases can also be produced without departing from the spirit and scope of the present invention. Further, the inventive method can be applied to a multitude of calibers within each caliber family (i.e. small, medium, and large caliber).

In an exemplary embodiment, a method for producing a cartridge case can include generating an initial part by subjecting a Metal Injection Molding (MIM) material to an MIM process. The method can further include at least one of tapering and trimming the initial part to generate the cartridge case. The cartridge case may include an elongated member with a head at its first end, a mouth at its second end, and a body lying between the head and the mouth. The body may further include sidewalls conjoined with a base to form a hollow cavity to contain propellant. The base may further include a primer pocket structured to receive and retain a primer. The primer pocket may further include a vent formed within the primer pocket that extends from the primer pocket to the hollow cavity. The head may further include the base and a rim that extends radially from the base to generate an extractor groove. The mouth may be configured to receive and retain a projectile.

Some embodiments can include at least one of mixing and kneading powdered metal and/or powdered metal alloy(s) with a binder material to form the feedstock MIM material. Some embodiments can include at least partially melting or fully melting the binder material to form a semisolid metal-binder slurry. Some embodiments can include injecting the semisolid metal-binder slurry into a die cavity to form a green preform. Some embodiments can include at least one of thermally debinding and chemically or solvent debinding the green preform to generate a net-shape component. The embodiments include sintering the net-shape component for densification and to generate the initial part. In some embodiments, the at least one of tapering and trimming the initial part to generate the cartridge case comprises generating the cartridge case with a shoulder formed as a portion of the sidewalls that steps radially in towards the hollow cavity. In some embodiments, the at least one of tapering and trimming the initial part to generate the cartridge case comprises generating the cartridge case with a neck that extends out from the shoulder in a direction parallel or substantially parallel to the sidewalls. In some embodiments, at least a portion of the sidewalls exhibits a taper (e.g., centerfire rifle ammunition). In some embodiments, at least a portion of the sidewalls is straight walled (e.g., pistol ammunition). In some embodiments, at least a portion of the sidewalls is straight walled but does not contain a primer pocket (e.g., rimfire ammunition). In some embodiments, at least a portion of the cartridge case exhibits desired variations in thickness, hardness, ductility, and/or strength. In some embodiments, the cartridge case consists essentially of powdered metal and/or powdered metal alloy(s) that has been subjected to the MIM process.

In another exemplary embodiment, a method for producing a cartridge case can include using Finite Element Method (FEM) analysis to generate variables representing factors and characteristics associated with enabling the cartridge case to be made via a Metal Injection Molding (MIM) processes and to enable an MIM generated cartridge case to function properly during subsequent use as ammunition in a weapon. The method can further include generating operating parameters based on the variables to include as inputs for the MIM process. The method can further include mixing or kneading powdered metal and/or powdered metal alloy(s) with a binder material to form a MIM feedstock material. The method can further include Metal Injection Molding the MIM material into a MIM initial part via the MIM process. The MIM process may include at least partially melting the binder material to form a semisolid metal-binder slurry. The MIM process may further include injecting the semisolid metal-binder slurry into a die cavity to form a green preform. The MIM process may further include thermally debinding and/or chemically debinding the green preform to generate a net-shape component. The MIM process may further include sintering the net-shape component for densification and to generate the MIM initial part. The MIM process may further include at least one of tapering and trimming the initial part to generate the cartridge case. Tapering and trimming may be done for cartridge case designs that are not straight wall designs.

Some embodiments include transmitting the operational parameters from a FEM computer device to a MIM system. Some embodiments include establishing a set of parameters from traditional cartridge case designs to use as a baseline within the FEM analysis. In some embodiments, the cartridge case can include an elongated member with a head at its first end, a mouth at its second end, and a body lying between the head and the mouth. The body may further include sidewalls conjoined with a base to form a hollow cavity to contain propellant. The base may further include a primer pocket structured to receive and retain a primer. The primer pocket may further include a vent formed within the primer pocket that extends from the primer pocket to the hollow cavity. The head may further include the base and a rim that extends radially from the base to generate an extractor groove. The mouth may be configured to receive and retain a projectile. In some embodiments, at least a portion of the cartridge case exhibits desired variations in thickness, tolerances, hardness, ductility, and/or strength. In some embodiments, at least a portion of the sidewalls exhibits a taper. In some embodiments, at least a portion of the sidewall is straight walled. In some embodiments, no primer pocket is formed into the base.

In another exemplary embodiment, a cartridge case can include a body with a head at a first distal end and a mouth at a second distal end, wherein the cartridge case consists essentially of powdered metal and/or powdered metal alloy(s) that is formed into the cartridge case through an injection mold processing. In some embodiments, the cartridge case consists of the powdered metal and/or the powdered metal alloy(s) that is formed into the cartridge case through the injection mold processing.

In another exemplary embodiment, a method for producing a cartridge case can include subjecting a Metal Injection Molding (MIM) material to an MIM process to form an elongated member with a head at its first end, a mouth at its second end, and a body lying between the head and the mouth. The body further can include sidewalls conjoined with a base to form a hollow cavity. The head can include the base. The mouth may be configured to receive a projectile.

In some embodiments, the hollow cavity can be configured to contain propellant. Compacted propellant, loose propellant, or a combination thereof can be used. In some embodiments, the base can include a primer pocket structured to receive and retain a primer. The primer pocket can include a vent formed within the primer pocket that extends from the primer pocket to the hollow cavity. Some embodiments can further include generating an end cap. In some embodiments, the elongated member can be produced by a first MIM material and the end cap is produced by at least one of plastic injection molding a polymer and MIM processing a second MIM material. Some embodiments can further include configuring the end cap to slidably insert into the mouth. Some embodiments can further include configuring the end cap to receive and retain the projectile Some embodiments can further include configuring the end cap to generate a seal between the end cap and at least one of the elongated member and the projectile. Some embodiments can further include configuring the end cap to adhere to the projectile. Some embodiments can further include configuring the body and/or the end cap to at least partially envelop the projectile. In some embodiments, the elongated member can consist essentially of powdered metal and/or powdered metal alloy(s) that has been subjected to the MIM process. In some embodiments, the elongated member can consist of powdered metal and/or powdered metal alloy(s) that has been subjected to the MIM process. In some embodiments, the end cap can consist essentially of powdered metal and/or powdered metal alloy(s) that has been subjected to the MIM process. In some embodiments, the end cap can consist of powdered metal and/or powdered metal alloy(s) that has been subjected to the MIM process.

Some embodiments can further include using an analytical technique to generate variables representing factors and characteristics associated with enabling the cartridge case to be made via the MIM processes and to enable an MIM generated cartridge case to function properly during subsequent use as ammunition in a weapon. Some embodiments can further include using an analytical technique to generate variables representing factors and characteristics associated with enabling the cartridge case and/or the end cap to be made via the MIM processes and to enable the MIM generated cartridge case and/or end cap to function properly during subsequent use as ammunition in a weapon.

Some embodiments can further include mixing or kneading powdered metal and/or powdered metal alloy(s) with a binder material to form the MIM feedstock material. Some embodiments can further include at least partially melting the binder material to form a semisolid metal-binder slurry. Some embodiments can further include injecting the semisolid metal-binder slurry into a die cavity to form a green preform. Some embodiments can further include thermally debinding and/or chemically debinding the green preform to generate a net-shape component. Some embodiments can further include sintering the net-shape component for densification and to generate the elongated member.

Some embodiments can further include mixing or kneading powdered metal and/or powdered metal alloy(s) with a binder material to form the first MIM feedstock material and/or the second MIM feedstock material. Some embodiments can further include at least partially melting the binder material to form a semisolid metal-binder slurry. Some embodiments can further include injecting the semisolid metal-binder slurry into a die cavity to form a green preform. Some embodiments can further include thermally debinding and/or chemically debinding the green preform to generate a net-shape component. Some embodiments can further include sintering the net-shape component for densification and to generate the elongated member and/or the end cap.

In another exemplary embodiment, a cartridge case can include a body with a head at a first distal end and a mouth at a second distal end. The cartridge case may consist essentially of powdered metal and/or powdered metal alloy (s) that is formed into the cartridge case through injection mold processing.

In another exemplary embodiment, an end cap for a cartridge case can include an elongated member with a first end, a second end, and a longitudinally formed hollow. The end cap can consist essentially of powdered metal and/or powdered metal alloy(s) that is formed into the end cap through injection mold processing.

Some conventional cartridge cases made from material other than brass may not be reloadable, or may be prone to defects upon reloading. For example, some conventional cartridge cases made from aluminum can be prone to splitting if subjected to the forces and/or processing used to reload. In addition, some conventional cartridge cases can fail during firing, which may prevent using them in a reloading process. Some conventional cartridge cases made from polymers or telescoping cases with polymer end caps, for example, may not be reloaded. Embodiments of the inventive cartridge case and inventive end cap, however, can be reloaded. For example, use the MIM process can allow for production of cartridge cases made from material other than brass that can be reloaded due to the proper balance of ductility and strength. In addition, the MIM process can allow for production of CT cartridge cases made from material other than brass and that include end caps made from material other than polymer, where the CT cartridge cases can be reloaded.

While these potential advantages are made possible by technical solutions offered herein, they are not required to be achieved. The presently disclosed cartridge case, end cap, and methods of production can be implemented to achieve technical advantages, whether or not these potential advantages, individually or in combination, are sought or achieved.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, aspects, features, advantages and possible applications of the present invention will be more apparent from the following more particular description thereof, presented in conjunction with the following Figures, in which:

FIG. 7 shows comparisons of various factors that may be used to generate or optimize variables in an FEM analysis or other analytical method.

FIGS. 18A-18B show calculated internal cartridge case volumes for a baseline cartridge case and the two MIM generated cartridge cases of FIGS. 17A-17B.

FIG. 19 shows a comparison between a baseline cartridge case and various MIM generated cartridge cases, demonstrating an improvement in density and weight that may be achieved via the inventive method.

FIGS. 30-32 show SEM imagery of surface microstructure of the net-shape component, the cartridge case after the first taper, and the cartridge case after the second taper, respectively.

FIG. 44 shows the cross-sectional dimensions of two net-shape components subjected to a heat treatment.

FIGS. 55-56 show SEM imagery of surface microstructure of the net-shape component after being conditioned, and the net-shaped component after being conditioned and tapered, respectively.

FIGS. 58A and 58B show an exemplary CT cartridge case that may be produced using an embodiment of the MIM method, wherein FIG. 58A shows the exemplary CT cartridge case and FIG. 58B shows the exemplary CT cartridge case with phantom lines depicting an exemplary interior configuration of the CT cartridge case.

FIGS. 59A-59B show cut-away views of an exemplary CT cartridge case, wherein FIG. 59A shows cross-sectional views of the case and the projectile including propellant and FIG. 59B shows a cross-sectional view of the case with the projectile and no propellant.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1A:
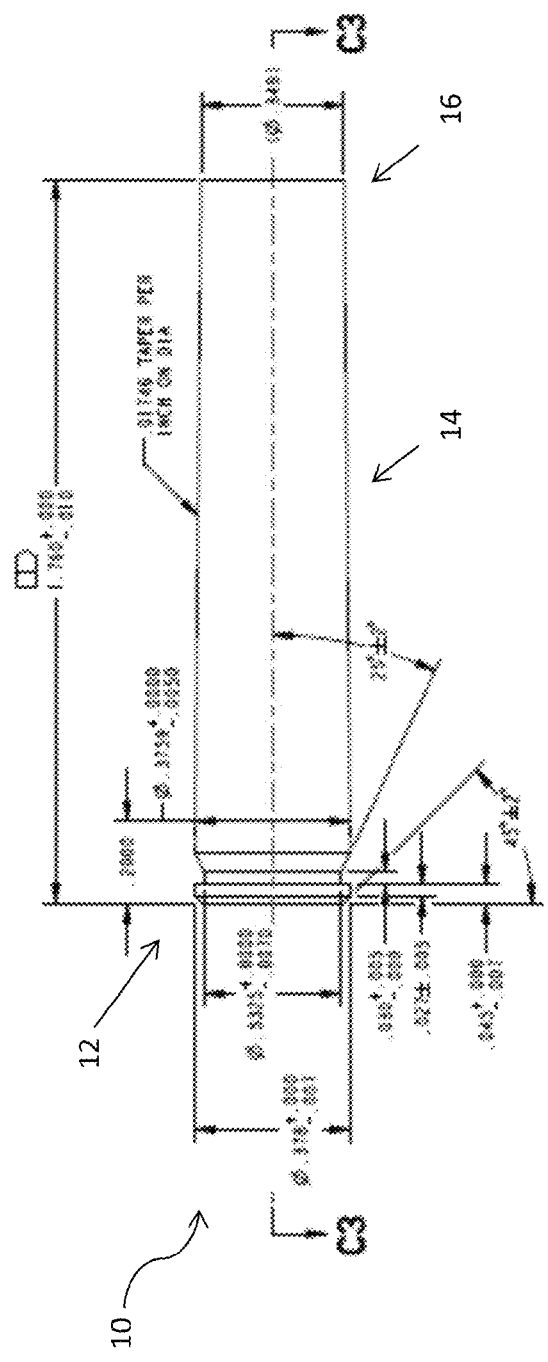
FIGS. 1A-1B show an exemplary cartridge case that may be created via the inventive method, and a cross section of the cartridge case of taken along the C3-C3 line (see FIG. 1A), respectively.
Figure 1B:
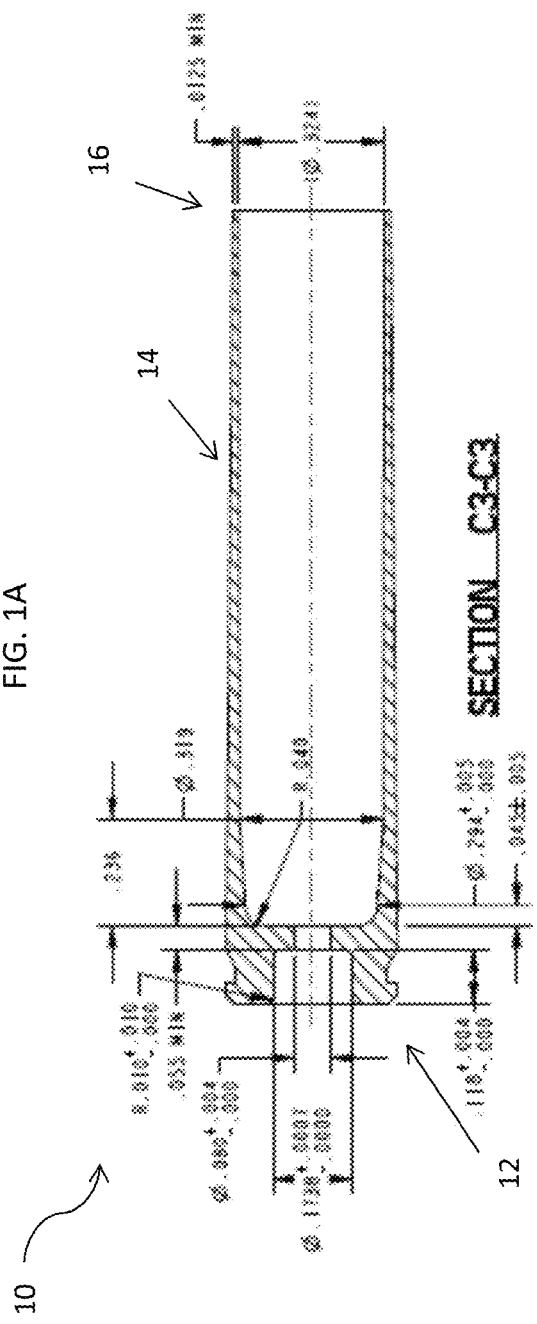
Figure 2:
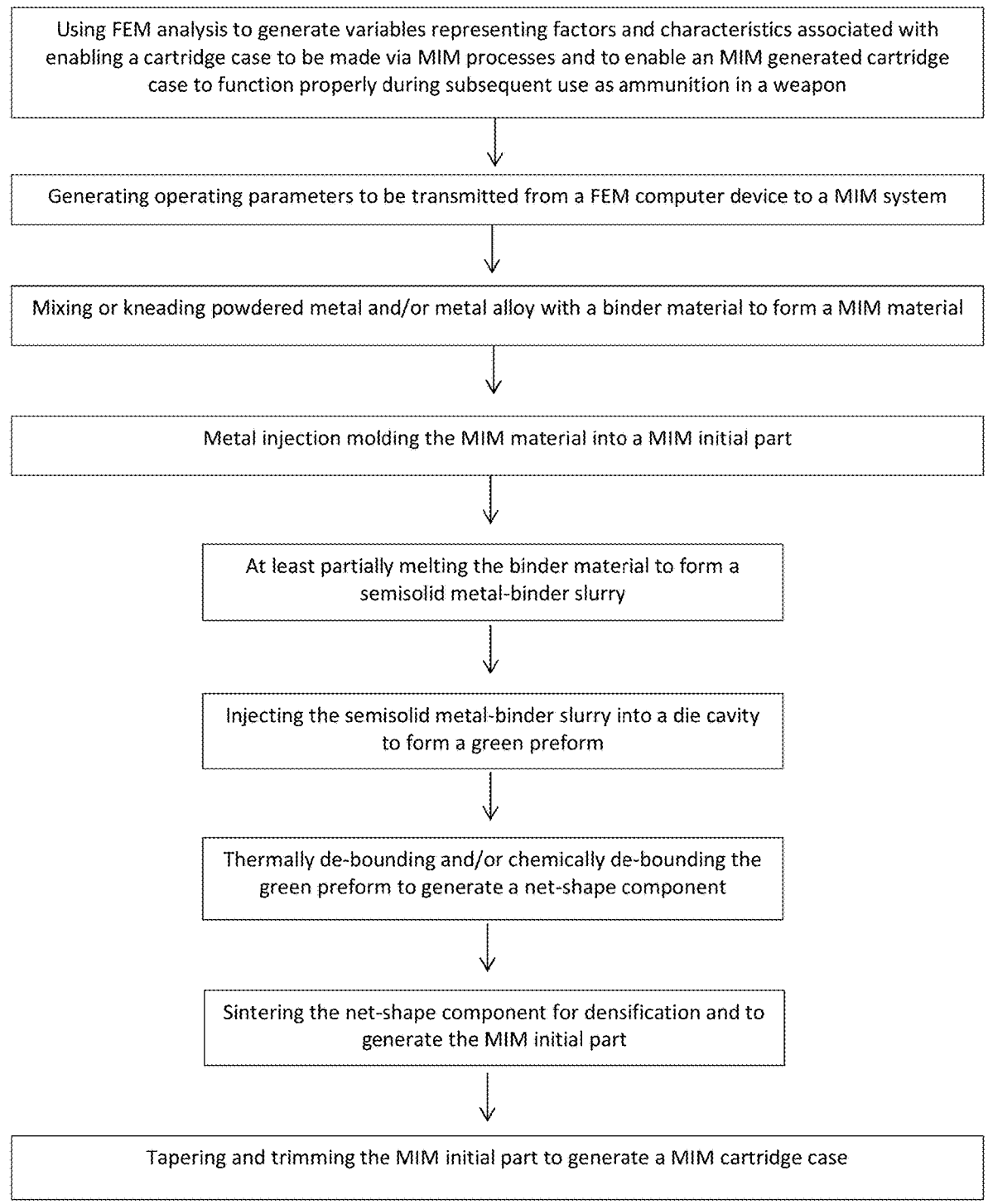
FIG. 2 shows an exemplary method of generating a cartridge case.

Referring to FIGS. 1-2, embodiments herein can include a cartridge case 10 that consists essentially of or consists of a powdered metal and/or a powdered metal alloy(s) 110 that has been formed into the cartridge case 10 through an injection mold processing. Also disclosed is a method for forming a cartridge case 10, which may include use of Metal Injection Molding ("MIM") 100 to produce the cartridge case 10. Further embodiments can include use of Finite Element Method ("FEM") analytics (which may be done through FEM software) or other forms of analytics to take into account desired material and mechanical characteristics and other parameters. This may assist in enabling the cartridge case 10 to be made in the MIM process 100 and to function properly during subsequent use as ammunition in a weapon. Further embodiments can include use of the FEM analytics or other analytical techniques to provide inputs that may be used during the MIM process 100.

Figure 3:
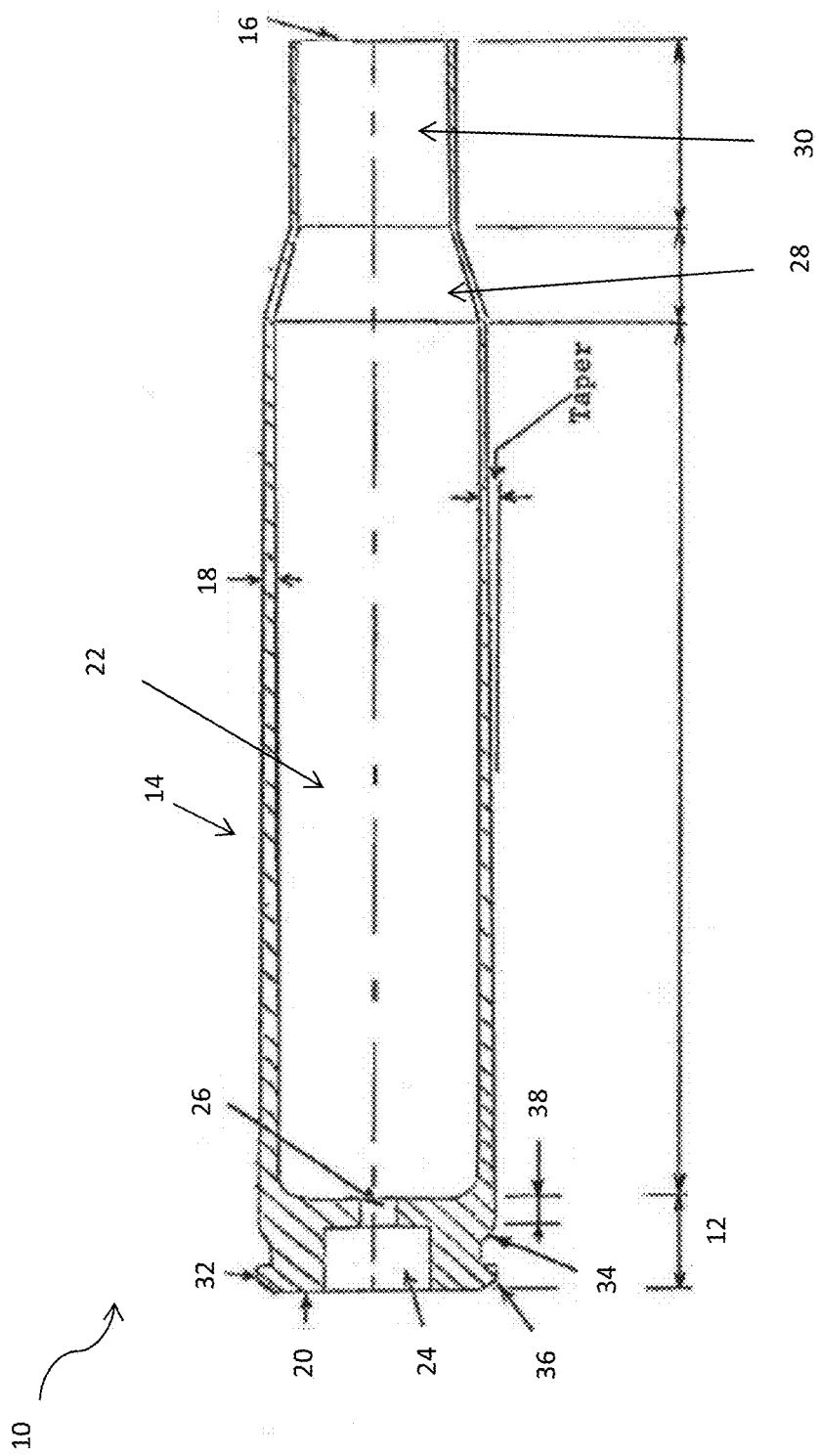
FIG. 3 shows a cross-section of an exemplary cartridge case that has been further processed for tapering and trimming (image from "The Cartridge Case", IIT Research Institute, Nov. 15, 1968).

Referring to FIG. 3, a cartridge case 10 can include a hollow elongated member with a first end and a second end. In some embodiments, the cartridge case 10 can be segmented into three portions, which may be a head 12 at the first distal end, a mouth 16 at the second distal end, and a body 14 lying between the head 12 and the mouth 16. The body 14 can further include sidewalls 18 conjoined with a base 20 to form a hollow cavity 22. The hollow cavity 22 may be used to contain a propellant 48 (e.g., gun powder, calcium carbonate, potassium sulfate nitrocellulose, nitroglycerin, di-ethylene glycol dinitrate, etc.) when using the cartridge case 10 as ammunition. The body 14 can have a general cylindrical structure so as to facilitate insertion of the cartridge case 10 into a chamber and/or bore of a weapon. The base 20 can further include a primer pocket 24 configured to receive and retain a primer 52. The primer pocket 24 can include a vent 26 to provide a means for heat exchange (e.g., spark of flame) between the primer 52 and the propellant 48 located in the hollow cavity 22 and to ignite the propellant 48. In some embodiments, the vent 26 can be an aperture formed within the primer pocket 24 that extends from the primer pocket 24 to the hollow cavity 22. The sidewalls 18 can have a thickness. Any portion of the sidewalls 18 can be structured to be thicker and/or stronger at and/or near the head 12 of the cartridge case 10. In some embodiments, the thickness and/or strength of at least a portion of the sidewalls 18 can change gradually from the mouth 16 to the head 12. In other embodiments, the thickness and/or strength of any portion of the sidewalls 18 can change gradually from any portion of the sidewalls 18 to the head 12. For example, a portion of the sidewalls 18 near the head 12 can be made to be progressively thicker and/or stronger as it leads into the head 12.

Some embodiments of the cartridge case 10 can be formed into a shouldered-style cartridge case. The shouldered-style cartridge case 10 can include a taper, a shoulder 28, and or a neck 30. For example, any portion of the sidewalls 18 can exhibit a taper. In at least one embodiment, at least a portion of the sidewalls 18 may exhibit a narrowing taper towards the mouth 16. Additionally, the sidewalls 18 can extend from the head 12 and may lead into a shoulder 28. The shoulder 28 may lead into a neck 30. The neck 30 may lead into the mouth 16. The shoulder 28 can be a portion of the sidewalls 18 that steps radially in towards the hollow cavity 22 as the sidewalls 18 extend toward the neck 30 so as to reduce the radius of the sidewalls 18 more sharply than the taper does. The shoulder 28 can terminate at the neck 30. The neck 30 can extend out from the shoulder 28 in a direction parallel, or substantially parallel, to the sidewalls 18, where a distal end of the neck 30 can be the mouth 16. In some embodiments, the thickness of any portion of the sidewalls 18 can be thinner at and/or near the shoulder 28, the neck 30, and/or the mouth 16. This may be done to facilitate progressive rearward obturation.

In at least one embodiment, the body 14 portion can include material and structural configurations that balance ductility with strength so as to not be too brittle and not be too ductile. If too brittle, the cartridge case 10 may have a tendency to circumferential rupture and split. If too ductile, the cartridge case 10 may be prone to extraction problems when the cartridge case 10 is ejected from the weapon.

The head 12 can be a circular structure at the first distal end of the body 14 that leads into the base 20. The primer pocket 24 can be formed into the head 12 so as to generate a receptacle embedded within the base 20 portion of the head 12. The primer 52, generally comprising a primer cup and an igniting element, can be contained within the primer pocket 24. The vent 26 can be an aperture formed within the primer pocket 24 that extends from the primer pocket 24, through a web 38 portion of the head 12, and into the hollow cavity 22. In some embodiments, the head 12 can be rigid enough to permit obturation of a primer cup against the primer pocket 24, and also be sufficiently ductile to permit staking or crimping of the primer cup. The head 12 may also exhibit sufficient strength so as to not rupture and/or split during firing the ammunition comprising the cartridge case 10. The head 12 should also be structured to prevent or avoid yielding and/or permanent deformation.

With some cartridge case designs 10, the head 12 can further include a rim 32 that may extend radially from the base 20, which may serve as a catching lip to allow a portion of a weapon's receiver (e.g., a bolt) to engage therewith. For example, the rim 32 can generate an extractor groove 34 to allow the weapon's receiver to engage the cartridge case 10. The rim 32 can further include a bevel 36 to assist with proper placement and smooth engagement with the weapon's receiver.

With a shouldered-style cartridge case 10, the mouth 16 can be configured to receive and retain a projectile 50 or bullet (both axially and concentrically). The mouth 16 may be ductile enough to facilitate press fitting the bullet 50 into the mouth 16 by crimping the mouth 16 onto the bullet 50 after the bullet 50 is inserted into the mouth 16. The mouth 16 may be further configured so that the press fit forms a seal during firing (obturation). The mouth 16 can also be structured to rebound for ejection purposes. The shouldered-style cartridge case 10 can be rimfire or centerfire. Generally, rifle cartridge cases are shouldered-style but some can be straight walled.

With a straight walled cartridge case 10, the body 14 may not have a taper, a shoulder 28, or a neck 30. For example, the sidewalls 18 can extend from the head 12 to the mouth 16 without any change in diameter. The head 12 can be a circular structure at the first distal end of the body 14 that leads into the base 20. A CT styled cartridge case can be a straight walled shaped cartridge case. The straight walled cartridge case 10 can be rimfire or centerfire. Generally, pistol cartridge cases are straight walled.

A CT styled cartridge case 10 can be a straight walled shaped cartridge case. Generally, a CT cartridge case includes the use of an end cap 46. The details of producing the CT cartridge case 10 and the end cap 46 will be discussed later.

With a centerfire cartridge case 10, the head 12 can be a circular structure at the first distal end of the body 14 that leads into the base 20. The primer pocket 24 can be formed into the head 12 so as to generate a receptacle embedded within the base 20 portion of the head 12. The primer 52, generally comprising a primer cup and an igniting element, can be contained within the primer pocket 24. A vent 26 can be an aperture formed within the primer pocket 24 that extends from the primer pocket 24, through a web 38 portion of the head 12, and into the hollow cavity 22. In some embodiments, the head 12 can be rigid enough to permit obturation of a primer cup against the primer pocket 24, and also be sufficiently ductile to permit staking or crimping of the primer cup. The head 12 may also exhibit sufficient strength so as to not rupture and/or split during firing the ammunition comprising the cartridge case 10. The head 12 should also be structured to prevent or avoid yielding and/or permanent deformation. A centerfire cartridge case 10 can be a shouldered-style cartridge case, a straight walled style cartridge case, or a CT styled cartridge case. A rifle cartridge case or a pistol cartridge case can be a centerfire cartridge case 10.

With a rimfire cartridge case 10, the head 12 may not have a primer pocket 24. The head 12 can be a circular structure at the first distal end of the body 14 that leads into the base 20. The base 20 can form the receptacle for the primer 52, as opposed to the primer 52 being inserted into a primer pocket 24. A centerfire cartridge case 10 can be a shouldered-style cartridge case, a straight walled style cartridge case, or a CT styled cartridge case. A rifle cartridge case or a pistol cartridge case can be a centerfire cartridge case 10.

Figure 4:
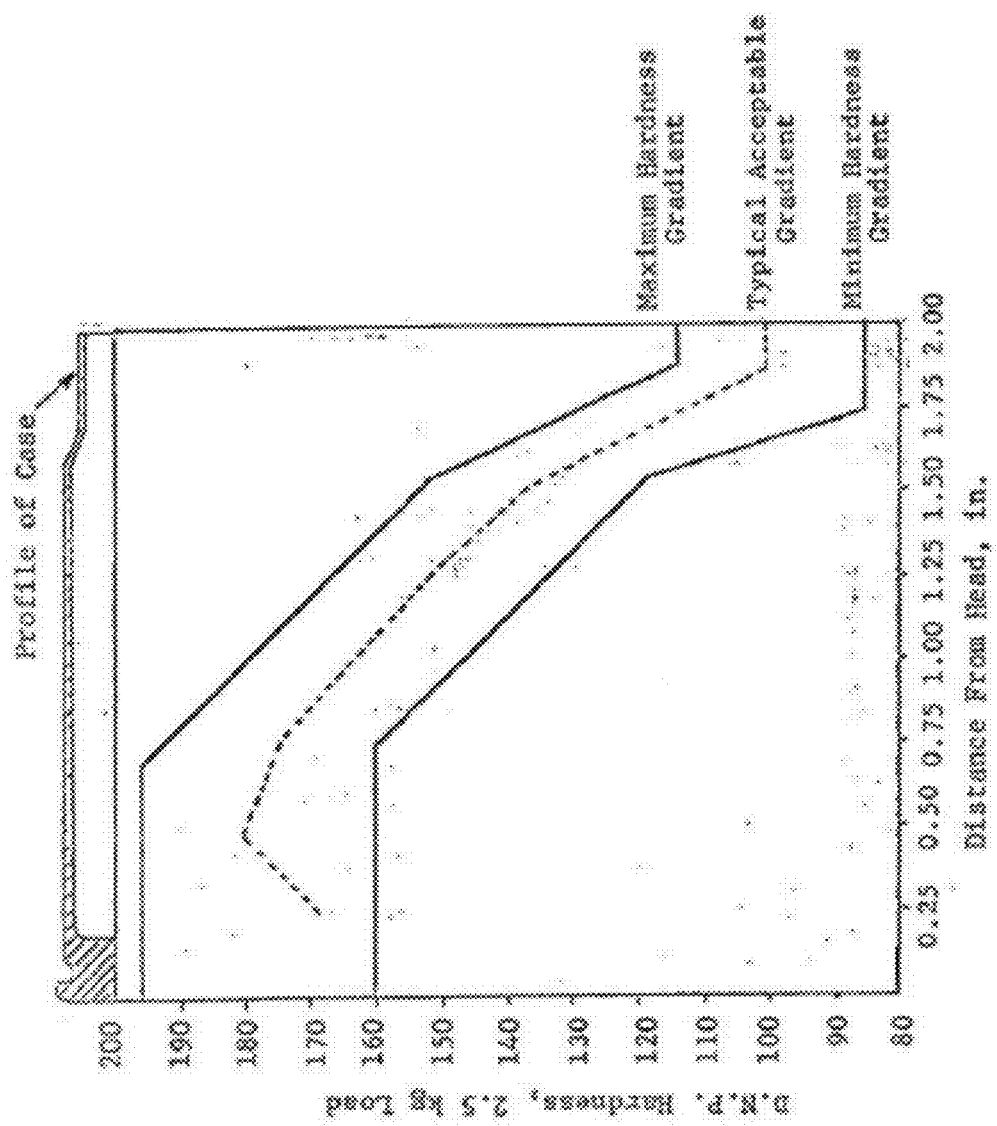
FIG. 4 shows an exemplary hardness profile of a cartridge case that may be used as a factor within Finite Element Method analysis or other analytical method when implementing the inventive method (image from "The Cartridge Case", IIT Research Institute, Nov. 15, 1968).

Referring to FIG. 4, in some embodiments, the hardness of the cartridge case 10 can exhibit a differential hardness gradient along a length of the cartridge case 10. In at least one embodiment, hardness gradients, in conjunction with sidewall 18 tapers, can be used to force progressive rearward obturation.

Traditional case cartridges consist of brass, because brass cartridge cases tend to exhibit the desired characteristics that facilitate proper functioning of the ammunition comprising the brass cartridge case. However, brass may not be a preferred metal 110 for use with a MIM process 100, because of the material's insufficient strength for more demanding cartridge applications. There are other materials exhibiting mechanical properties that differ from brass and are desirable for use as cartridge cases. For example, many other materials can be used to improve upon process technology of cartridge case production and to improve upon the operational characteristics of the ammunition comprising the cartridge case. The inventive method provides a means to do just that. Materials for use with the inventive method can be materials that exhibit high yield strength, low modulus of elasticity, adequate ductility, light-weight, corrosion resistance, temperature resistance (e.g., exhibit small to no changes in material properties when subjected to swings in temperature), waterproof aspects, and/or inert aspects. The materials can also be readily available and/or have a low material cost. Such materials can include carbon steels, low alloy and high strength steel, precipitation hardening and high strength stainless steel, ferritic, austenitic, martensitic and duplex stainless steels, titanium-based alloys, high speed and tool steels, aluminum, aluminum alloys, tungsten carbides, nickel-based superalloys, nickel-iron, nickel iron-cobalt controlled expansion alloys, high density alloys, soft magnetic alloys, cobalt-based alloys, copper-based alloys, tungsten heavy alloys, elemental powder metals, etc. Some aluminum alloys may not be suitable for MIM processes due to their reactivity and difficulty to sinter.

Figure 5:
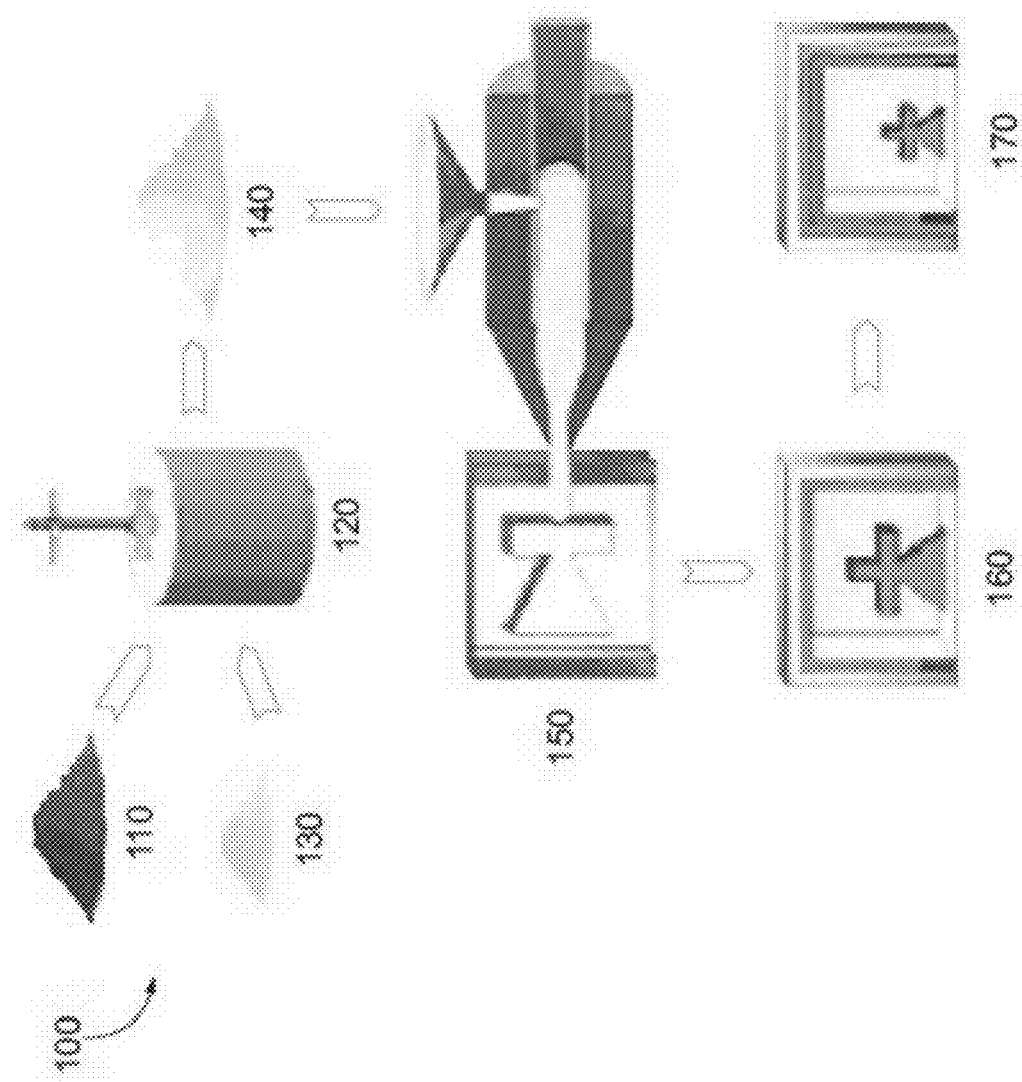
FIG. 5 shows an exemplary Metal Injection Molding (MIM) process that may be used with the inventive method (image from http://www.piminternational.com/aboutpim/binders).

Referring to FIG. 5, the inventive method can utilize an MIM process 100 to produce a cartridge case 10. The MIM process 100 can be a metalworking process in which a powdered metal and/or powdered metal alloy(s) 110 may be mixed 120 and/or kneaded with a binder material 130 to generate a raw material or feedstock 140 that is capable of being subjected to injection mold processing 150 to form a part (e.g., cartridge case 10). The injection mold processing 150 may include metal injection mold forming. After injection mold processing, further material conditioning can be performed on the part. This can include binder removal 160, sintering 170 coalescing metal particles, and/or other processes to form a final part comprising the desired metal and/or metal alloy 110 and having the desired shapes and geometric dimensions of the cartridge case 10.

An exemplary MIM process 100 can include of mixing and/or kneading 120 a metal powder and/or a metal alloy powder 110 with a binder 130 to generate an MIM feedstock material 140. The binder 130 can be an organic wax/polymer-like binder. In some embodiments, the binder 130 can exhibit a high viscosity. In at least one embodiment, the MIM material 140 can be 60% or larger amount of metal powder comprising 22-micrometer range spheres and 40% or lower amount of binder. The mixing 120 can be done to generate a MIM material 140 in a form of granules and/or pellets. The granules and/or pellets can then be used as a feedstock material 140 in which the feedstock material 140 is subjected to MIM 150. During MIM 150, the binder 130 of the MIM material 140 can be at least partially melted to form a semisolid metal-binder slurry. The semisolid metal-binder slurry can be injected into a die cavity of a die to form a green preform. The die cavity can be of a shape that substantially conforms to a shape of a cartridge case 10 (or other component shape if the process is being used to produce a part other than a cartridge case). The green preform can then be thermally and/or chemically de-bound 160 to produce a net-shape component. The green preform can also be sintered 170 when producing the net-shape component. This may be done for densification of the green preform. In some embodiments, sintering 170 can be performed so as to generate a net-shape component exhibiting a density of approximate 99.9%. After thermally debinding 160, chemically debinding 160, and/or sintering 170, a MIM initial part is formed. With a shouldered-style cartridge case 10, the process can continue by tapering and/or trimming the MIM initial part to generate a MIM cartridge case 10 (see FIGS. 17A-17B). Or the cartridge case 10 may not require any tapering and/or trimming when producing straight wall cartridges, pistol cartridges, and rimfire cartridges. With a CT cartridge case 10, the process can continue by producing an end cap 46 and mating the body 14 with the end cap 46 (see FIGS. 58-60).

Figure 20:
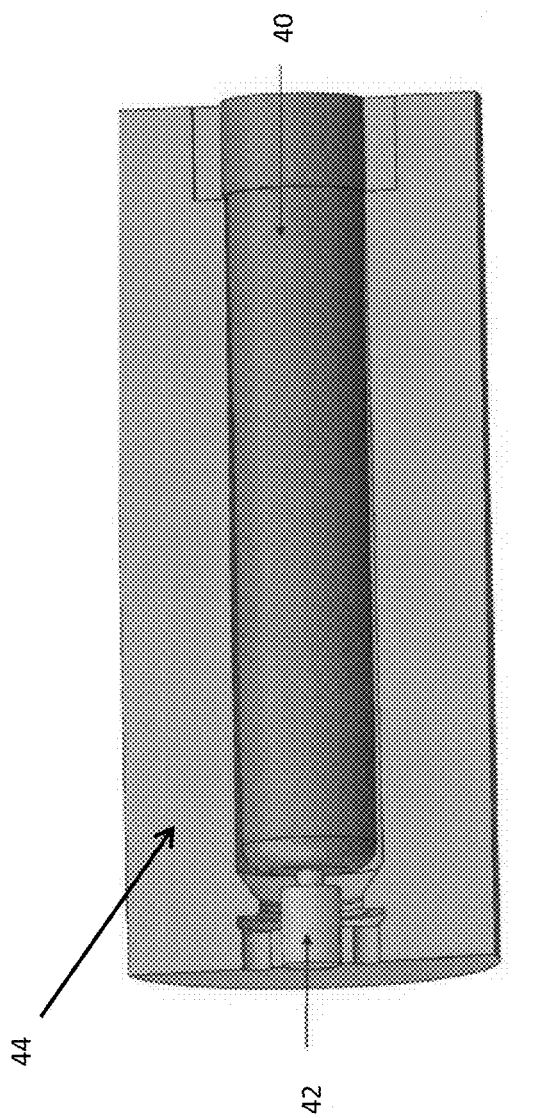
FIG. 20 shows a two-core design requiring secondary forming operations to create a taper on one end of the cartridge case that may be used with the inventive method.

MIM parts can shrink, for example, 20% from their molded dimensions during binder removal 160 and/or sintering 170. Thus, the mold 44 (see FIG. 20) can be made to be 20% larger than the final part. However, because MIM parts have little density gradient, shrinkage can be isotropic and repeatable. Thus, the MIM process 100 can generate net-shape components with very tight dimensional tolerances.

Figure 6:
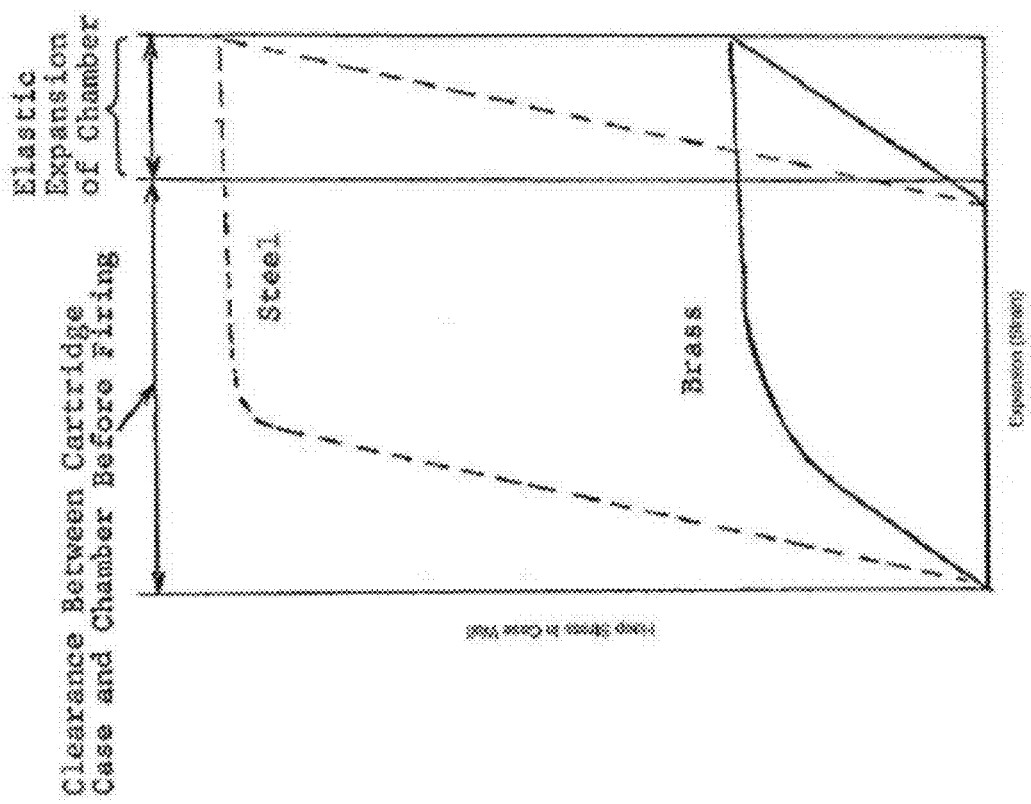
FIG. 6 shows a graph of expansion v. stress in the cartridge case wall, comparing steel to brass that may be further analyzed in an FEM analysis or other analytical method (image from "The Cartridge Case", IIT Research Institute, Nov. 15, 1968).

The inventive method can further include use of FEM analytics (which may be via FEM software) or other analytical methods to establish parameters that are associated with enabling the cartridge case 10 to be made in the MIM process 100 and to function properly during use as ammunition in a weapon. As noted above, many different materials, other than brass, can be used with the MIM process 100. These materials can exhibit material and mechanical properties that vastly differ from brass. Brass has been the mainstay of traditional cartridge cases, and therefore its material and mechanical properties are well-known for tooling and process technology purposes. When using materials other than brass, parameters accounting for such material and mechanical differences can be factored. For example, using a higher strength material may enable generating a cartridge case 10 with thinner sidewalls 18 (and thus a lighter cartridge case 10), but it also must be ensured that the mouth 16 of the cartridge case 10 still exhibits rebound for ejection. As another example, steel's high modulus may require significant yield strength to achieve an adequate amount of recovery, as shown in FIG. 6. Thus, there may be several countervailing factors that must be accounted for. The factors may include, but are not limited to:

1. Utilizing a powdered metal and/or a powdered metal alloy(s) 110 as part of the MIM material 140 that exhibits sufficient strength to be subjected to injection molding processes. This may include a material having a strength to modulus ratio above 4.0.
2. Utilizing a MIM material 140 that exhibits high yield strength, low modulus of elasticity, ductility (which may relate to proper bullet 50 and primer 52 insertion and crimp), light-weight, corrosion resistance, temperature resistance, thermal stability, material compatibility, waterproof aspects, inert aspects, being readily available, and/or has a low material cost.
3. Feedstock 140 flowability (which may relate to mold fill).
4. Elastic modulus and/or yield strength of the MIM material 140 (which may relate proper firing and extraction).
5. Shrinkage of the MIM generated part (which may relate to feedstock powder to binder ratio).
6. Generating a cartridge case 10 with a head 12, a body 14, and a mouth 16 that includes the various subcomponent parts and shapes described herein.
7. Generating a cartridge case 10 with dimensions that adhere to caliber and ballistic standards.
8. Bolt force, extraction force, and/or plastic strain within the cartridge case 10 after firing, pocket radial deformation, and/or contact pressures between the cartridge case 10 and a barrel of the weapon. (See FIG. 7).
9. Generating a cartridge case 10 with thicker and/or stronger sidewalls 18 at and/or near the head 12 of the cartridge case 10.
10. Generating a cartridge case 10 with a change in thickness and/or strength along a portion of a length of at least a portion of the sidewalls 18.
11. Generating a shouldered-style cartridge case 10 with a thinner thickness of at least a portion of the sidewalls 18 at and/or near the shoulder 28, the neck 30, and/or the mouth 16.
12. Generating a shouldered-style cartridge case 10 with a taper along at least a portion of the sidewalls 18.
13. Generating a cartridge case 10 with a differential hardness gradient along at least a portion of the length of the cartridge case 10.
14. Generating a cartridge case 10 with a proper balance of ductility and strength within at least a portion of the body 14.

Figure 8:
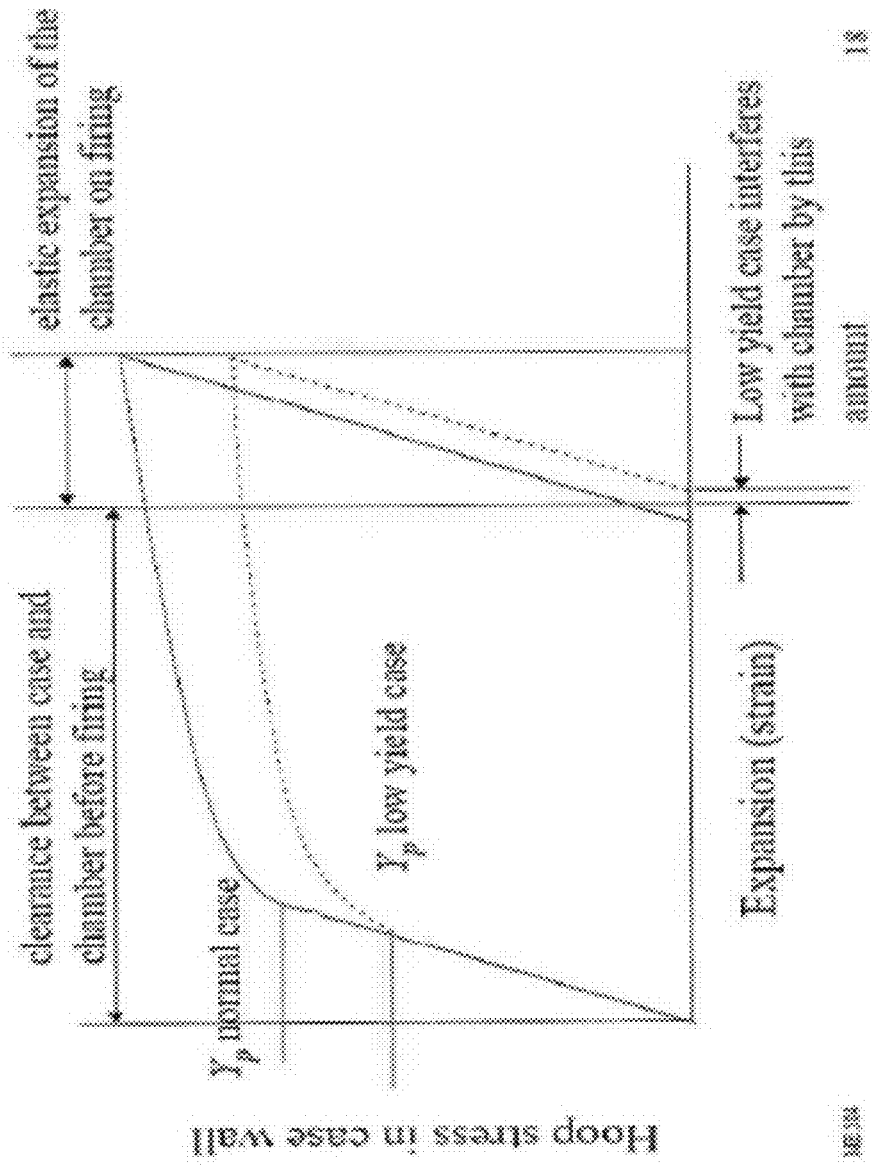
FIG. 8 shows the relation between expansion and stress during obturation that may be used to generate variables in an FEM analysis or other analytical method (image from Carlucci, Donald E. and Jacobson, Sidney S. *Ballistics: Theory and Design of Guns and Ammunition*, CRCPress, Boca Raton, Fla., 2008, pp. 108-110).

15. Generating a shouldered-style cartridge case 10 with a narrowing taper at and/or near the mouth 16 of the cartridge case 10.
16. Generating a cartridge case 10 with a head 12 that is rigid enough to permit obturation of a primer cup against the primer pocket 24 and that is ductile enough to permit staking and/or crimping of a primer cup.
17. Generating a cartridge case 10 with a head 12 that is strong enough to not rupture and/or split during firing the ammunition comprising the cartridge case 10.
18. Generating a cartridge case 10 with a head 12 that is structured to prevent and/or avoid yielding and/or permanent deformation.
19. Generating a shouldered-style cartridge case 10 with a mouth 16 that can receive and retain a projectile 50 axially and/or concentrically, or a CT cartridge case 10 with a mouth 16 that can receive and retain an end cap 46.
20. Generating a shouldered-style cartridge case 10 with a mouth 16 that is ductile enough to facilitate press fitting the projectile 50 or bullet into the mouth 16 by crimping the mouth 16 onto the bullet 50, or a CT cartridge case with a mouth 16 that is ductile enough to facilitate press fitting the end cap 46 into the mouth 16 by crimping the mouth 16 onto the end cap 46.
21. Generating a cartridge case 10 with a mouth 16 that can facilitate a press fit, forming a seal during firing (obturation).
22. Generating a cartridge case 10 with a mouth 16 that can rebound for ejection.
23. Generating a cartridge case 10 that can retain current case dimensions set as standards for certain calibers of ammunition.
24. Generating a cartridge case 10 that can hold, contain, and/or be non-reactive with the propellant 48, the primer 52, and/or the projectile 50 of the ammunition.
25. Generating a cartridge case 10 to facilitate orienting cartridge components in a weapon's chamber and/or align the projectile 50 with a bore axis for proper engraving.
26. Generating a cartridge case 10 that can allow the cartridge case 10 to recover after firing to permit easy extraction.
27. Generating a cartridge case 10 that can allow the cartridge case 10 to act as a heat sink to reduce an amount of heat transfer to the weapon's chamber.
28. Generating a cartridge case 10 that can allow the cartridge case 10 to be temperature resistant to avoid degradation or failure during firing.
29. Generating a cartridge case 10 that can facilitate sealing the breach during the firing event.
30. Generating a cartridge case 10 that can exhibit progressive rearward obturation.
31. Generating a cartridge case 10 that can survive handling, loading, and/or recoil forces.
32. Generating a cartridge case 10 that can be stable in long-term storage.
33. Generating a cartridge case 10 that meets the cold and warm environmental requirements.
34. Generating a cartridge case 10 that includes a MIM material 140 that is non-sparking.
35. Generating a cartridge case 10 where initial firing pressure can force the sidewalk 18 against the chamber interior (obturation) of the weapon. (See FIG. 8).
36. Generating a cartridge case 10 here cartridge case 10 expansion continues as the weapon's chamber expands elastically under firing pressure. (See FIG. 8).
37. Generating a cartridge case 10 where both the cartridge case 10 and chamber recover from elastic deformation as firing pressure subsides. This may include the weapon chamber recovering fully (purely elastic) and cartridge case 10 recovering partially (plastic deformation). (See FIG. 8).

The above characteristics are at least some requirements of ammunition cartridge cases that may be used to enable the cartridge case 10 to be made with the MIM process 100 and/or to function properly during use in a weapon. Any one or any combination of these characteristics can be used by the inventive method to generate a cartridge case 10. For example, variables and parameters encompassing these characteristics can be used by the MIM process 100 making a cartridge case 10. This may be done using analytical techniques. A particular form of analytics can be use of FEM analytics. This can include use of FEM software installed on a FEM computer device.

For example, these and other factors can be mathematically modeled and represented by variables. Algorithmic functions within the FEM software can then be generated, including use of these variables. The FEM software can then be operated on a computer device (FEM computer device) to develop a design which is delivered to a system operating the MIM process 100 (MIM system). For example, a user can input at least one variable into the FEM computer device, such as the dimensions and desired weight of the cartridge case 10 to be produced by the MIM system. The FEM computer device can then run at least one algorithm to generate at least one the operating parameter that would enable a MIM cartridge case design 10 exhibiting the desired characteristics. In some embodiments, the FEM computer device can be programmed to generate a plurality of operating parameters as a function of another operating parameter. For example, the FEM computer device may generate a set of operating parameters for each powdered metal and/or powdered metal alloy(s) 110 that would result in a cartridge case 10 having the desired dimensions and desired weight. A user may then select a powdered metal and/or powdered metal alloy(s) 110 with the most desirable characteristics to be used by the MIM system.

Proper functioning of a cartridge case 10 when used as ammunition can depend on many complex factors. To ensure that the MIM generated cartridge case 10 performs as expected when used as ammunition, a comparative analysis can be done. This can be incorporated into the inventive method, which may be further incorporated into the FEM analysis. For example, a set of parameters from known case designs (e.g., a traditional brass cartridge) can be used as a baseline. Thus, the inventive method can further include: 1) proposing a MIM material 140; 2) generating variables for cartridge case 10 forming process comparison; 3) generating variables for comparing the MIM material 140 to a known material (e.g., brass) to form a baseline; 4) selecting the MIM materials 140 and generating variables representing the selected MIM materials 140; 5) generating variables representing firing and extraction of ammunition comprising the MIM generated cartridge case 10; 6) generating variables representing recovery performance of the MIM cartridge case 10 after being formed into ammunition and being fired; 7) comparing MIM generated cartridge case 10 weights with baseline cartridge weights; 8) generating variables representing MIM generated cartridge case firing simulations with the baseline; 9) generating variables representing extraction performance; 10) analyzing the results and generating operating parameters for a selected MIM process 100; and, 11) transmitting the operating parameters to the MIM system.

Simplified formulas (Equations 1 and 2) for firing and extraction can be performed to identify feasible MIM materials 140 and to evaluate and down-select MIM materials 140 at a high level before detailed analysis.

$$u_{tube} = \frac{a'}{E_{tube}(b^2 - a'^2)}$$ Equation (1)

$$[(1-v)(p_1 a'^2 - p_2 b^2) + (1+v)b^2(p_1 - p_2)]$$

$$u_{case} = \frac{a^2 p_1}{E_{case} h}$$

$$\sigma_{\theta\theta} = \frac{a p_1}{h}$$

$$\varepsilon_{\theta\theta} = \frac{\sigma_{\theta\theta}}{E_{case}}$$

$$\varepsilon_{\theta\theta_{max}} - \varepsilon_y = \frac{\sigma_{\theta\theta_{max}} - \sigma_y}{E_{case-tangent}}$$ Equation (2)

$$\varepsilon_{return} = \frac{\sigma_{\theta\theta_{max}}}{E_{case}}$$

$$\varepsilon_{residual} = \varepsilon_{\theta\theta_{max}} - \varepsilon_{return}$$

$$u_{residual} = a \varepsilon_{residual}$$

(Eq. (1) and (2) referenced from Carlucci, Donald E. and Jacobson, Sidney S. *Ballistics: Theory and Design of Guns and Ammunition*, CRCPress, Boca Raton, Fl., 2008, pp. 108-110).

Figures 9A, 9B:
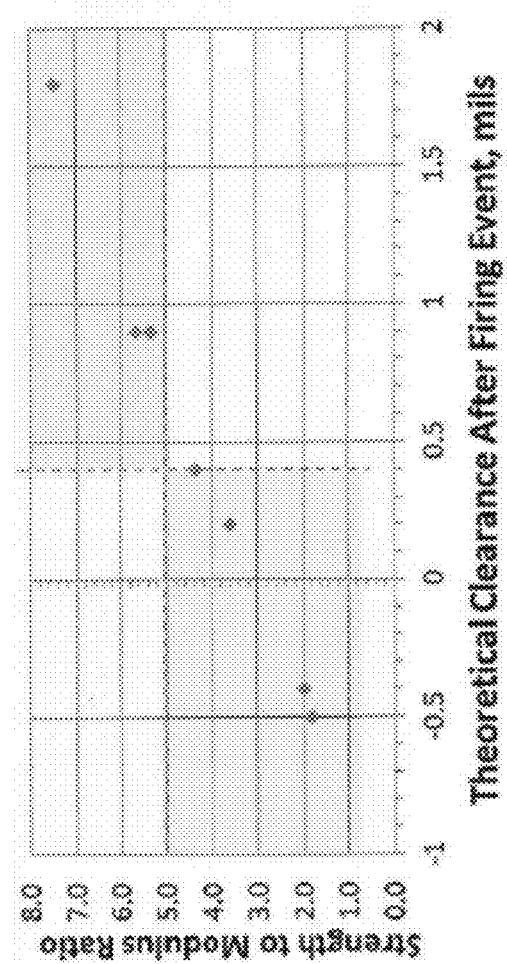
FIGS. 9A-9B show theoretical clearance v. strength-to-modulus ratios, and a chart comparing various factors of MIM generated cartridge cases, respectively, that may be used to generate variables in an FEM analysis or other analytical method.
Figure 10A:
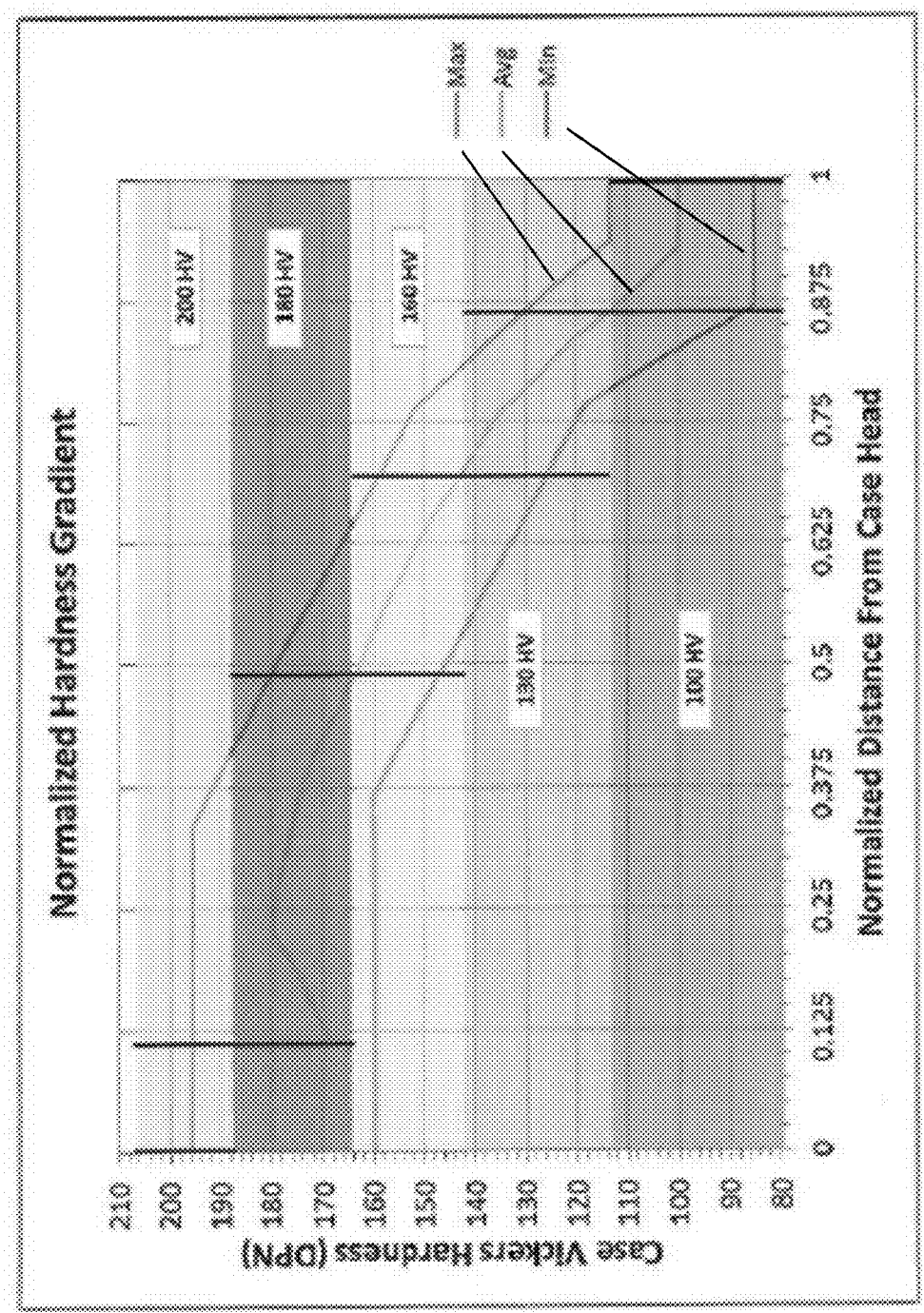
FIGS. 10A-10B show data results for normalized distance from case head v. case hardness, and true strain v. true stress, respectively, that may be used to generate variables in an FEM analysis.
Figure 10B:
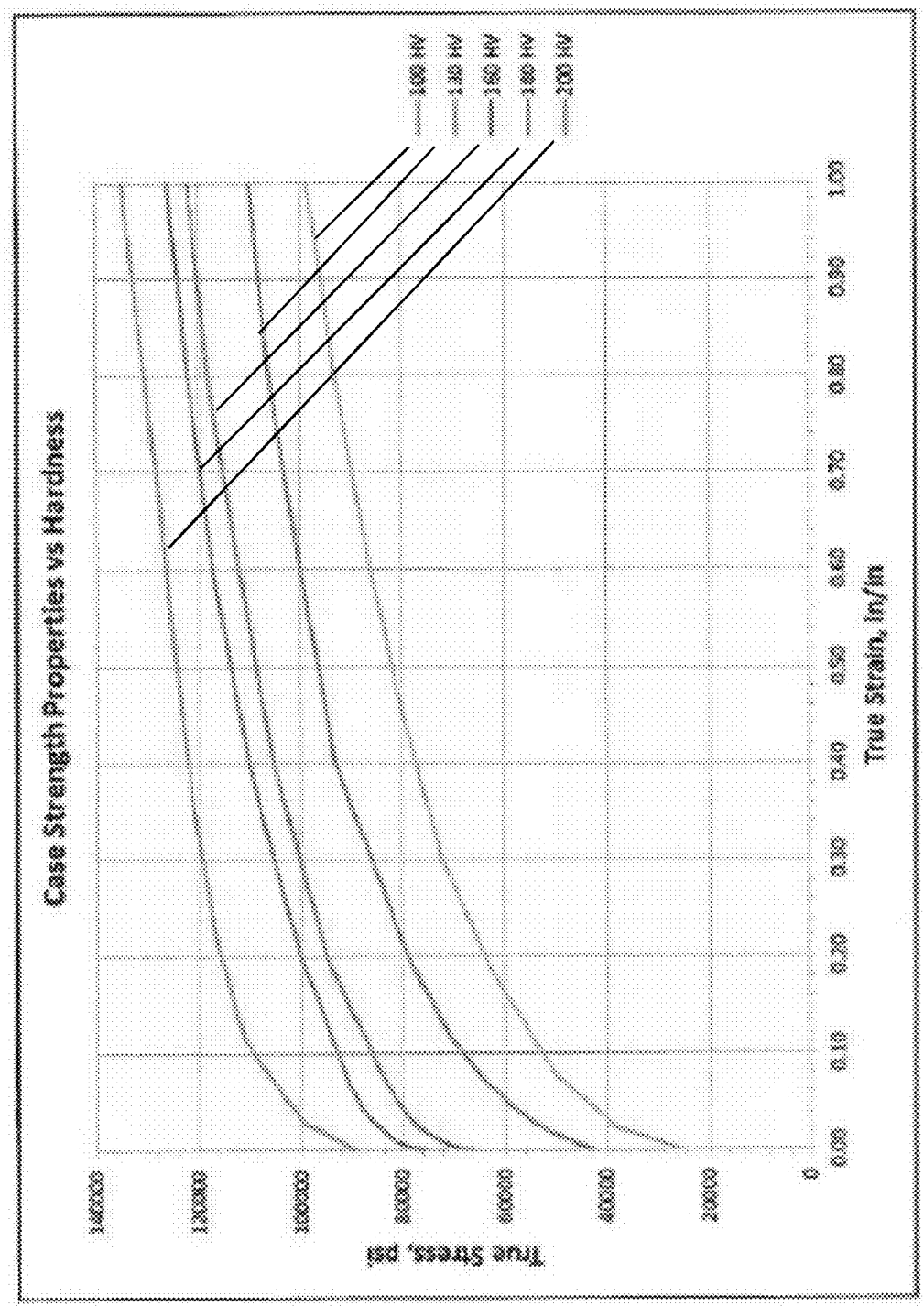

Case cartridges 10 with MIM materials 140 having a yield strength to modulus ratio above approximately 4.0 can perform equivalent to or better than a traditional brass cartridge. (See FIGS. 9A-9B). Thus, MIM materials 140 with a yield strength to modulus ratio above 4.0 may be preferred.

Generating variables for comparing the MIM material 140 to a known material (e.g., brass) to form a baseline can further include creating a baseline dynamic explicit Finite Element Analysis ("FEA") firing simulation. This may include approximating exact weapon geometry and firing information based on actual data and/or publically available data. This may further include obtaining actual data from a traditional brass cartridge to include as part of the baseline. This may further include evaluations using at least one of maximum material conditions ("MMC") and least material conditions ("LMC") to understand the significance of cartridge case 10 tolerances. For example, MMC may lead to a least case-to-chamber clearance, a longer cartridge case 10, and/or little head space. A LMC may lead to a maximum case-to-chamber clearance, a shorter cartridge case 10, and/or large head space. Baseline responses can be compared to publically available literature references or existing test data to validate a model response.

Figure 11:
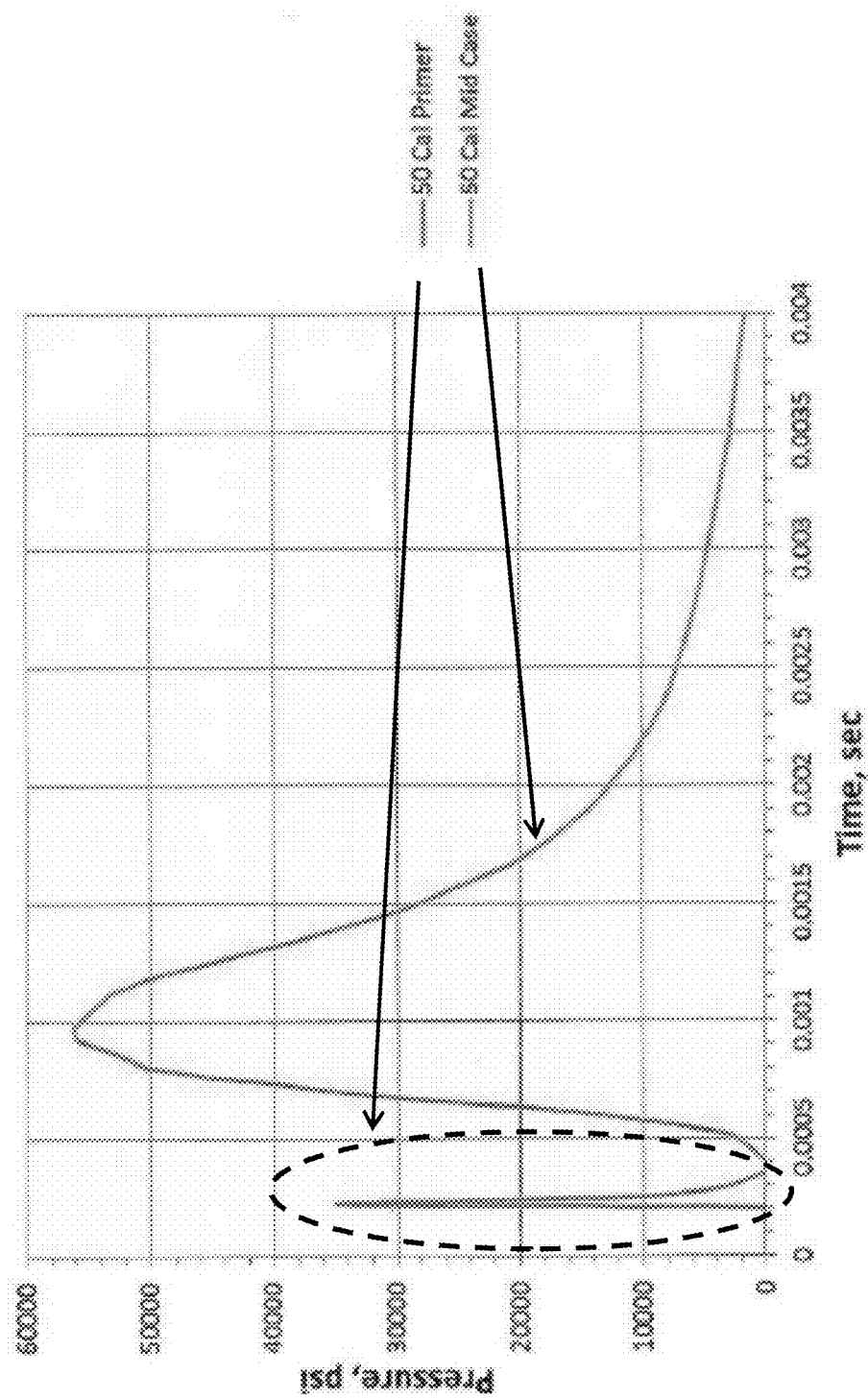
FIG. 11 shows time v. pressure for a firing pressure of a baseline firing simulation that may be used to generate variables in an FEM analysis or other analytical method.
Figure 12:
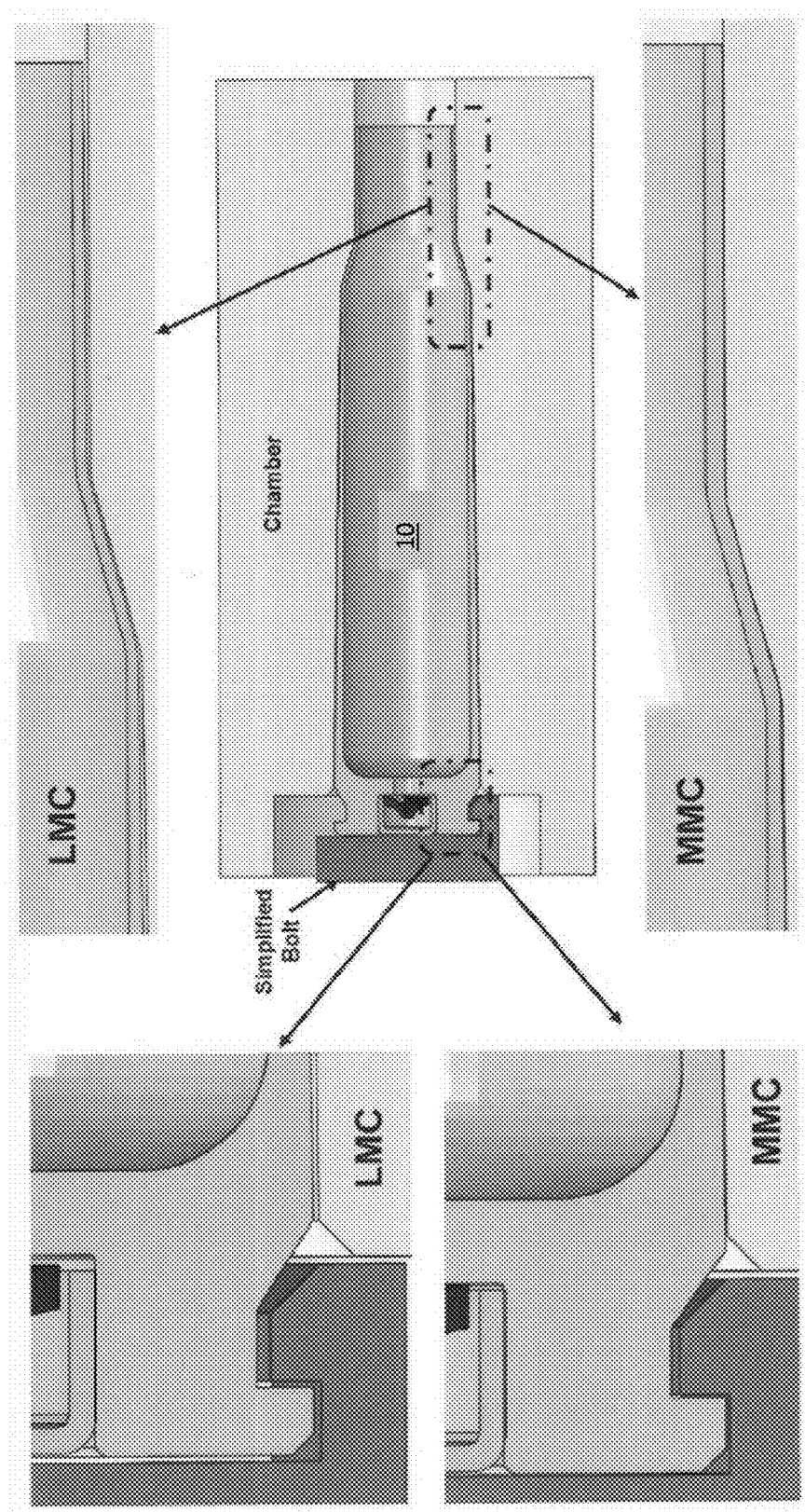
FIG. 12 shows firing simulation geometry of a baseline firing simulation that may be used to generate variables in an FEM analysis or other analytical method.
Figure 13:
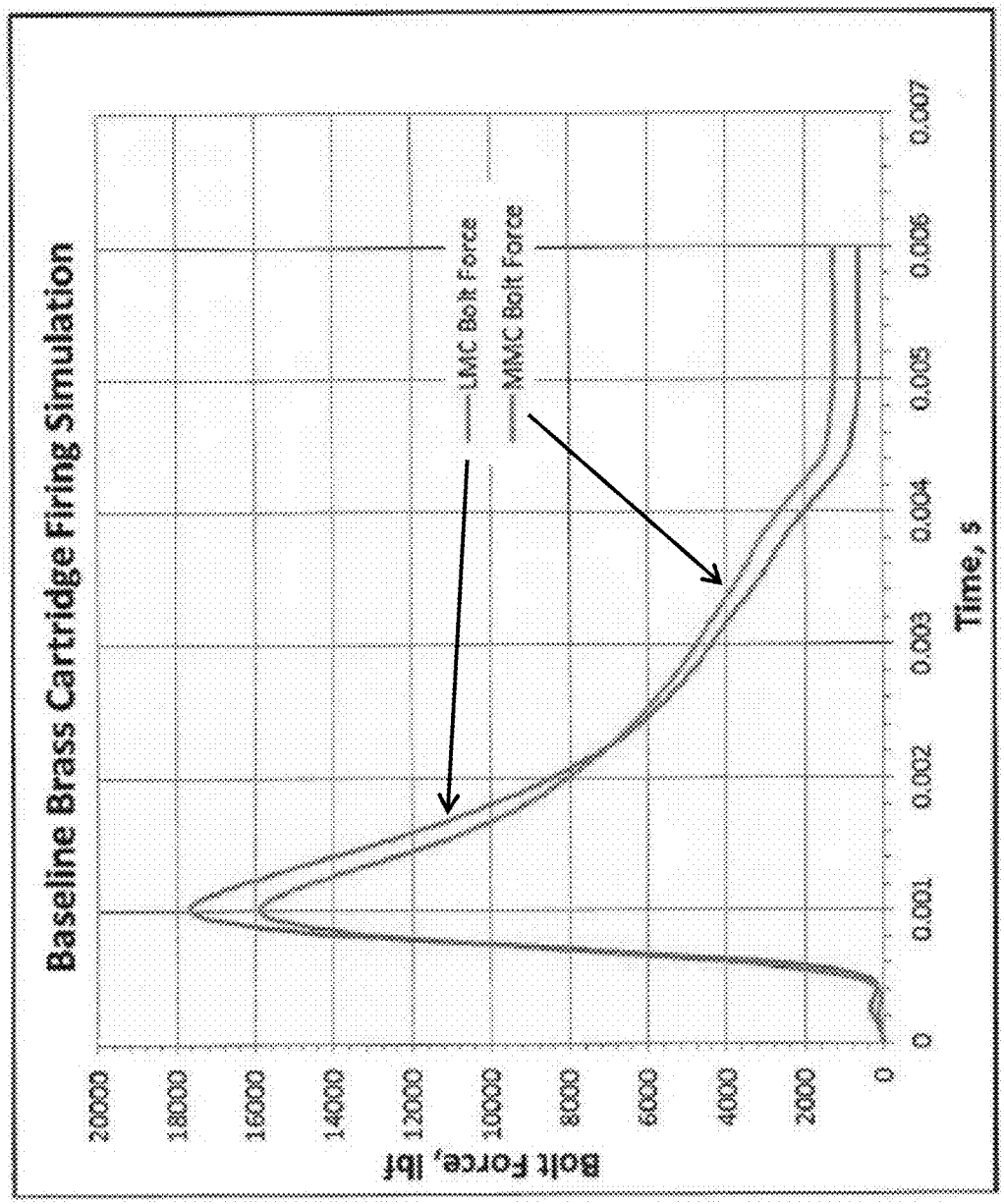
FIG. 13 shows firing simulation bolt forces of a baseline firing simulation that may be used to generate variables in an FEM analysis or other analytical method.

Using a 0.50 caliber cartridge case as an example, FIGS. 10-15B show non-limiting examples of how baseline data can be generated and used in the inventive method. FIGS. 10A-10B show a traditional brass cartridge case hardness gradient modeled by assigning appropriate material properties to five discrete regions along the cartridge case length. FIG. 11 shows firing pressure of a baseline firing simulation, where internal case pressure can be applied in two phases: 1) primer ignition; and 2) propellant ignition. Primer ignition may be applied to all internal surfaces in the primer pocket 24. Propellant ignition may be applied to all internal cartridge case 10 surfaces and primer pocket 24 surfaces. Both pressures can be applied as uniform pressures. Pressure gradients may not be considered. FIG. 12 shows firing simulation geometry of a baseline firing simulation. FIG. 13 shows firing simulation bolt forces of a baseline firing simulation. As can be seen, bolt forces can be predicted to be within an acceptable range lbf, depending on cartridge case 10 tolerances and caliber. It should be noted that 0.50 caliber bolt force data was not publically available. 5.56 mm bolt forces were found to be approximately 3,500 lbf. This translates into a 2× geometric size difference between 0.50 caliber and 5.56 mm, and a 2× increase in diameter (4× increase in bolt area). Thus, the predicted 0.50 caliber forces are approximately 4× higher than the 5.56 mm forces, which is reasonable. These data can be used as part of the baseline to compare a MIM cartridge case 10 design.

Figure 14A:
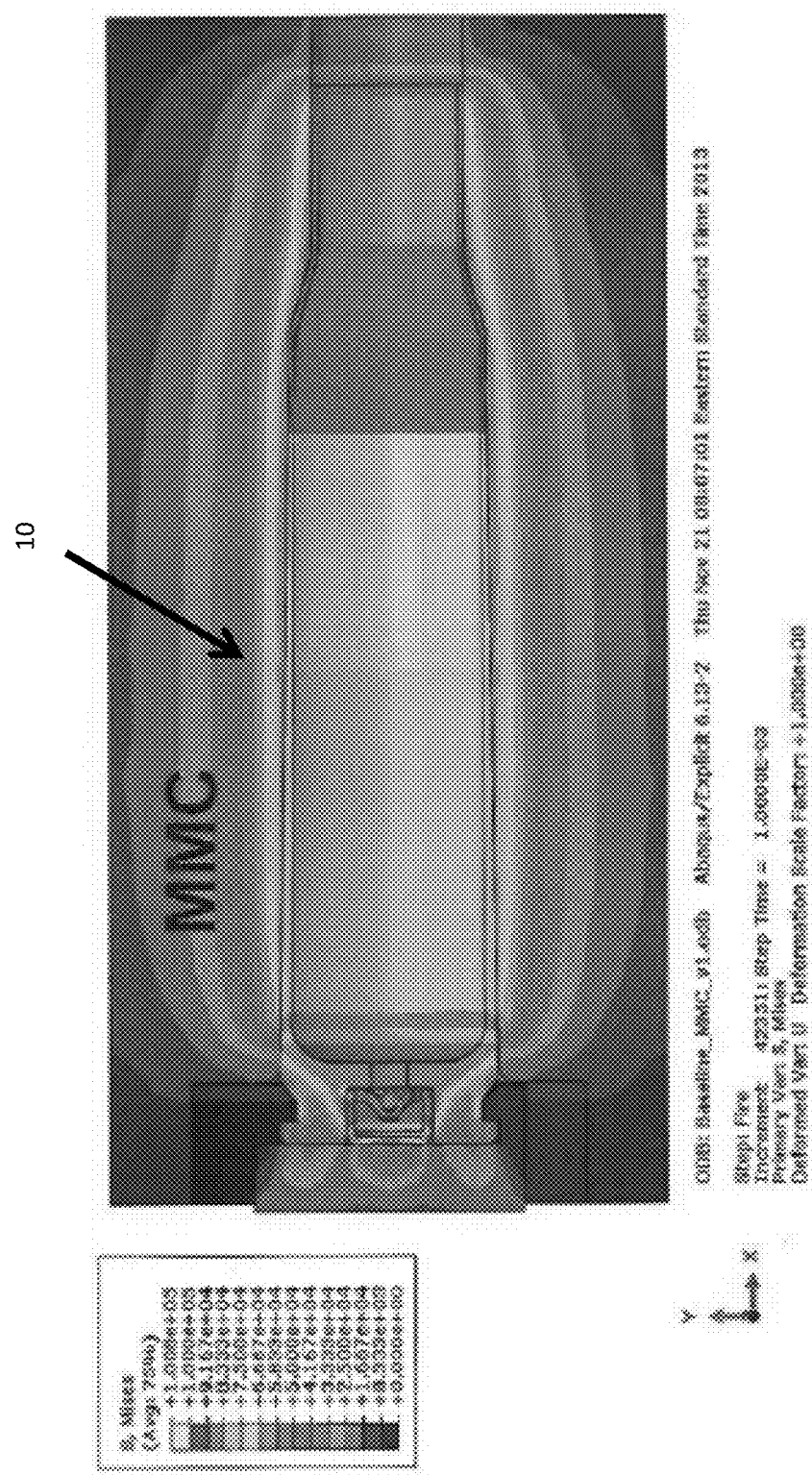
FIGS. 14A-14B show firing simulation stresses of a baseline firing simulation for a maximum material condition (MMC) case and a least material condition (LMC) case, respectively, that may be used to generate variables in an FEM analysis or other analytical method.
Figure 14B:
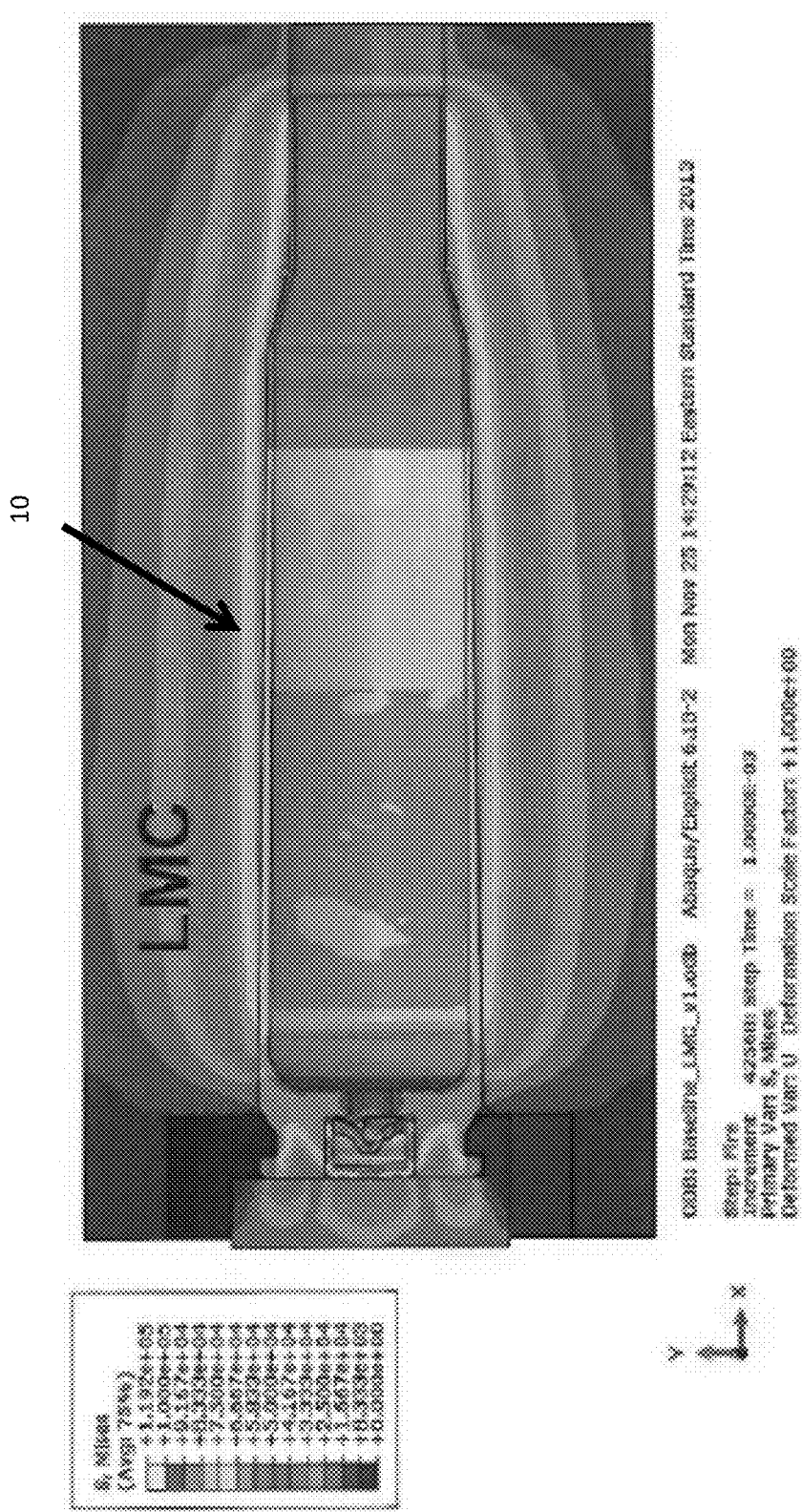
Figure 15B:
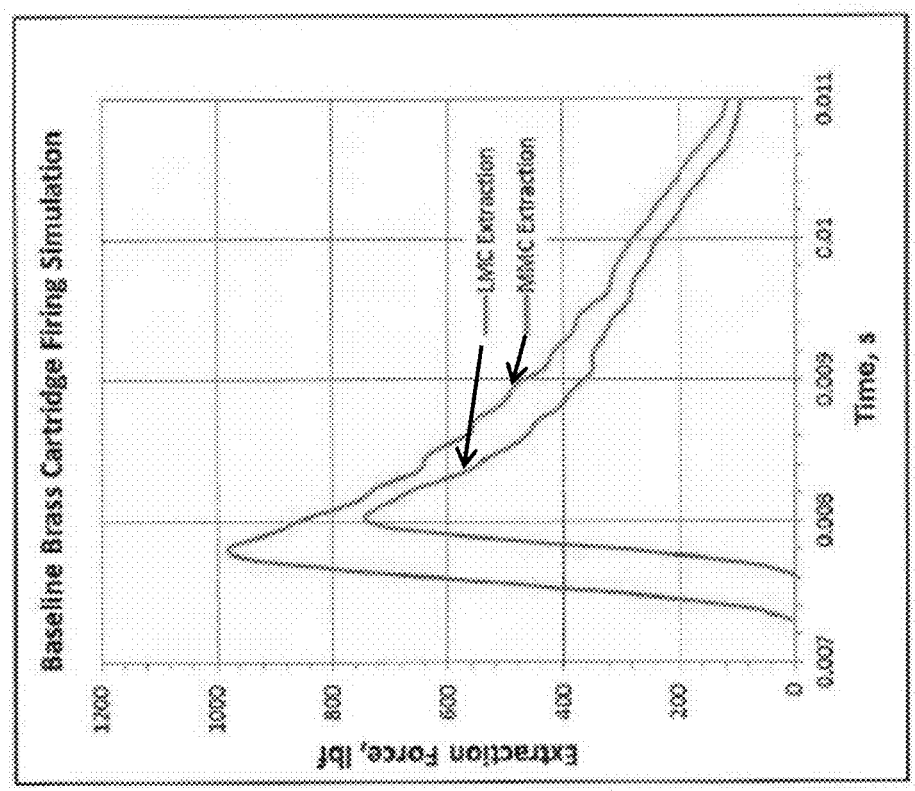
FIG. 15B shows time v. extraction force of a firing simulation MMC case and a firing simulation LMC case, which may be used to generate variables in an FEM analysis or other analytical method.
Figure 15A:
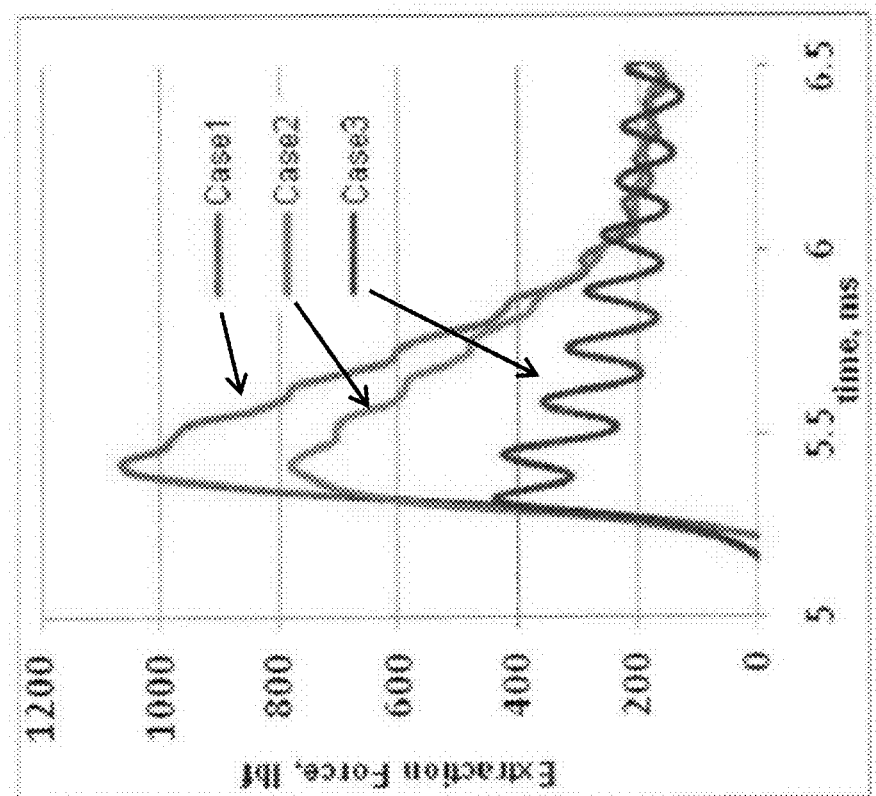
FIG. 15A shows time v. extraction force of a firing simulation for three different case cartridges.

FIGS. 14A-14B show firing simulation stresses of a baseline firing simulation for an MMC cartridge case 10 and an LMC cartridge case 10, respectively. As can be seen, uniform stress distributions were exhibited. Contact pressure was maintained between the cup and the primer for the entire firing event and during extraction. FIGS. 15A-15B show firing simulation extraction forces of a baseline firing simulation. Exact chamber and cartridge case dimensions used in generating literature data is unknown, but reasonable correlation with the limited available data can be used. These data can also be used as part of the baseline to compare a MIM cartridge case 10 design.

The MIM process 100 can significantly reduce the number of process steps and streamline the process used to produce cartridge cases 10, thus for reducing the total cost of ownership (TCO) for ammunition producers. For example, a traditional shouldered-style cartridge case production method includes at least the steps of: 1) forming a cup; 2) generating an initial draw from the cup; 3) generating a final draw from the cup; 4) forming a header; 5) turning the head; 6) piercing the base; 7) generating a first taper; 8) generating a second tapper; and, 9) trimming to generate a completed case. (See https://www.petersoncartridge.com/our-process/drawing-brass). This can be a complex forming process with multiple inspection points that requires high capital equipment and high personnel costs. Traditional cartridge case production methods can further result in relatively low piece-part price, a complex acquisition process for production, and/or a high total ownership cost (e.g., combined facility, personnel, equipment, inspection, piece part, etc.).

Figure 16:
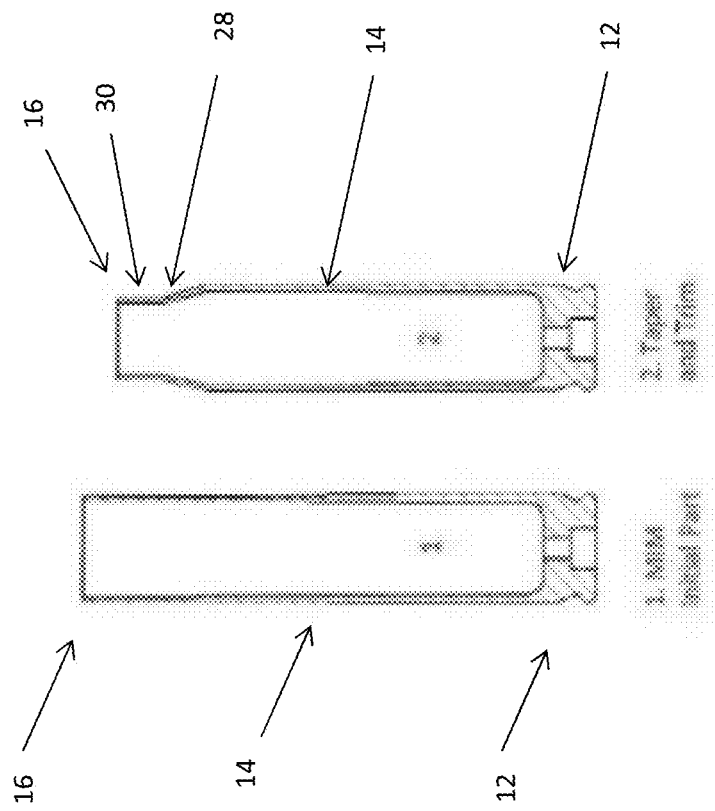
FIG. 16 shows an MIM cartridge case production process that may be used with the inventive method.

Conversely, the inventive method can use a MIM process 100 for a shouldered-style cartridge case 10 that may include as little as two steps: 1) metal injection molding an initial part; and, 2) tapering and trimming the part. (See FIG. 16). As contrasted with traditional shouldered-style cartridge case production methods, the inventive method can be a simpler process that involves less inspection points, low capital equipment costs, higher piece-part price, simpler acquisition processes for production, and/or lower total ownership costs.

A wide variety of materials may be used as the metal powder and/or metal alloy powder 110. Materials with a modulus to strength ratio above 4.0 may be used to ensure that the material performs equivalent to or better than traditional brass cartridge cases. It should be noted that aluminum and aluminum alloys can be very difficult to MIM. This may be due to difficulty in performing the sintering process 170 on aluminum and aluminum based MIM material 140 during densification. For example, innate aluminum oxide film on aluminum powder 110, along with possible contamination and possible oxidation during the de-binding process 160, can inhibit or even prevent the sintering and densification of an aluminum or aluminum alloy green preform into a net-shape cartridge case. In addition, an aluminum cartridge case 10 may be prone to burn-through during the firing event of the finished ammunition cartridge (e.g., catastrophic failure caused by burning of propellant 48 and a reaction of the aluminum when the primer 52 is ignited, i.e, thermite reaction).

Figure 17A:
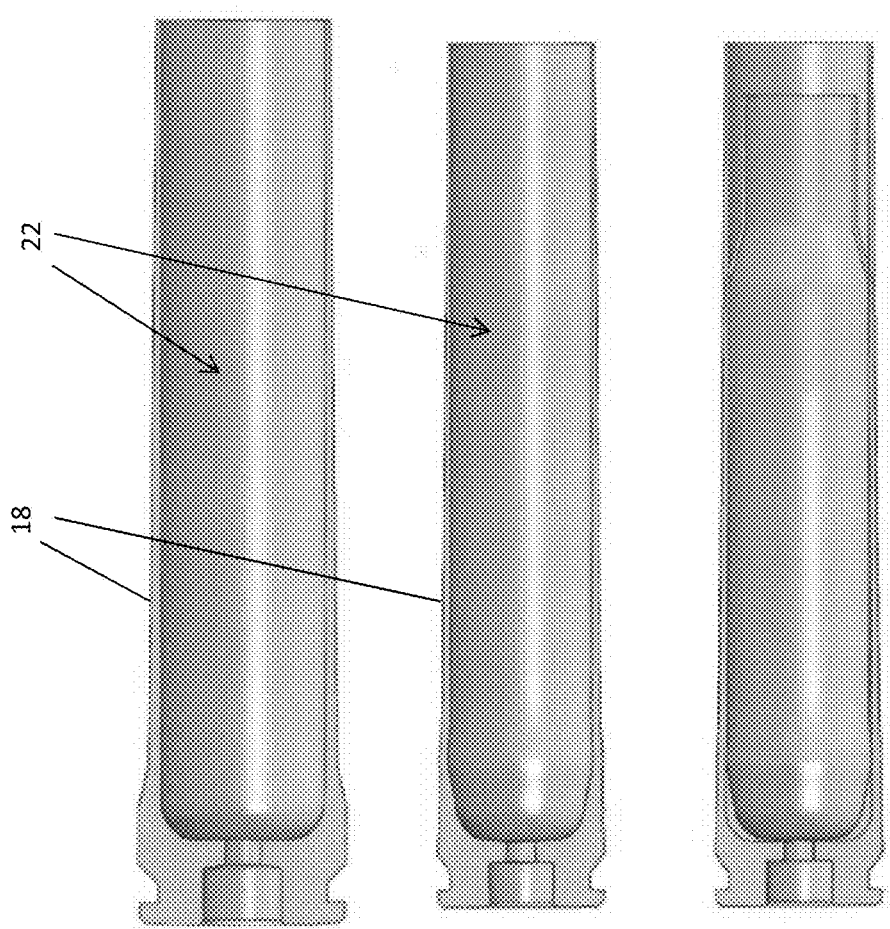
FIGS. 17A-17B show first and second MIM generated case cartridge designs, respectively, each demonstrating control of sidewall thickness and close geometric tolerances that may be achieved with the inventive method.
Figure 17B:
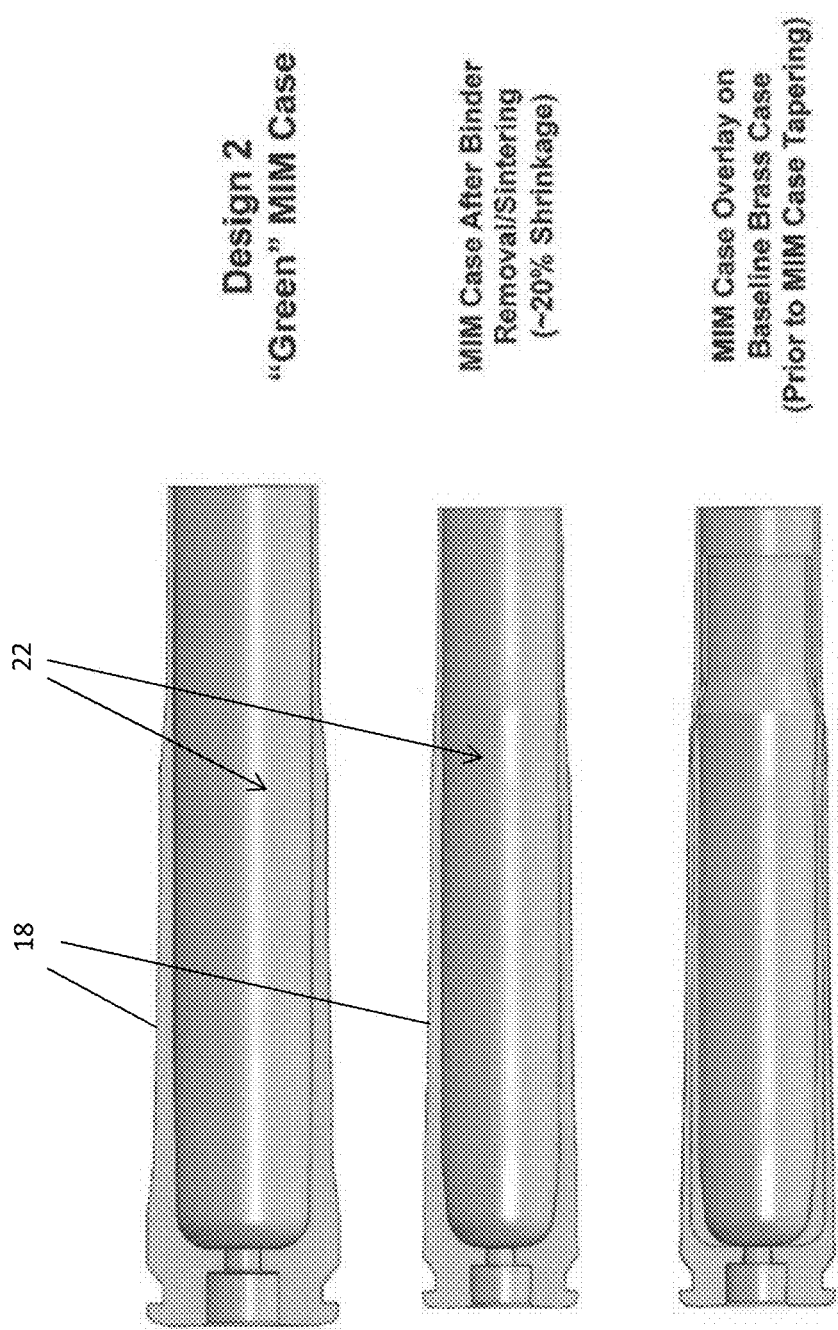

MIM parts uniformly shrink from their molded dimensions during binder removal 160 and/or sintering 170. The amount of shrinkage percent depends on the binder to powder ratio. Because MIM parts have little density gradient, shrinkage is isotropic and repeatable. Thus, uniform cartridge case sidewall 18 thicknesses can be achieved for MIM generated cartridge cases 10 to ensure tolerances are met. However, mold design considerations can accommodate sidewall 18 thickness variations, if such variations are desired. To demonstrate this, two cartridge case 10 design configurations (Design 1 and Design 2) are shown in FIGS. 17A-17B, where the sidewall 18 thicknesses of each are compared to a traditional brass cartridge case ("baseline brass case"). FIG. 17A shows Design 1, which is a green MIM generated cartridge case 10 molded to yield dimensions similar to the baseline brass cartridge case after binder removal 160 and sintering 170. As shown, the external dimensions of the MIM generated cartridge case 10 are very similar to the baseline brass cartridge case but for minor deviations with respect to interior dimensions. Note that the MIM generated cartridge case 10 may require a subsequent taper operation after MIM processing 100 is being designed as a shouldered-style cartridge case 10. FIG. 17B shows Design 2, which is a green MIM generated cartridge case 10 molded to yield dimensions similar to the baseline brass case after binder removal 160 and sintering 170, but with an increased case body sidewall 18 thickness to facilitate MIM mold fill. Note that a minimal change in sidewall 18 thickness at or near the mouth 16 may be used to maintain bullet/case interface or end cap/case interface. Again, with a shouldered-style MIM cartridge case 10, additional processes may include a subsequent taper operation after MIM process 100. FIGS. 17A-17B demonstrate the control of sidewall 18 thickness and close geometric tolerances that may be achieved with the inventive method. Thus, uniform cartridge case sidewall 18 thickness can be achieved through mold design considerations that accommodate thickness variation.

Figure 18B:
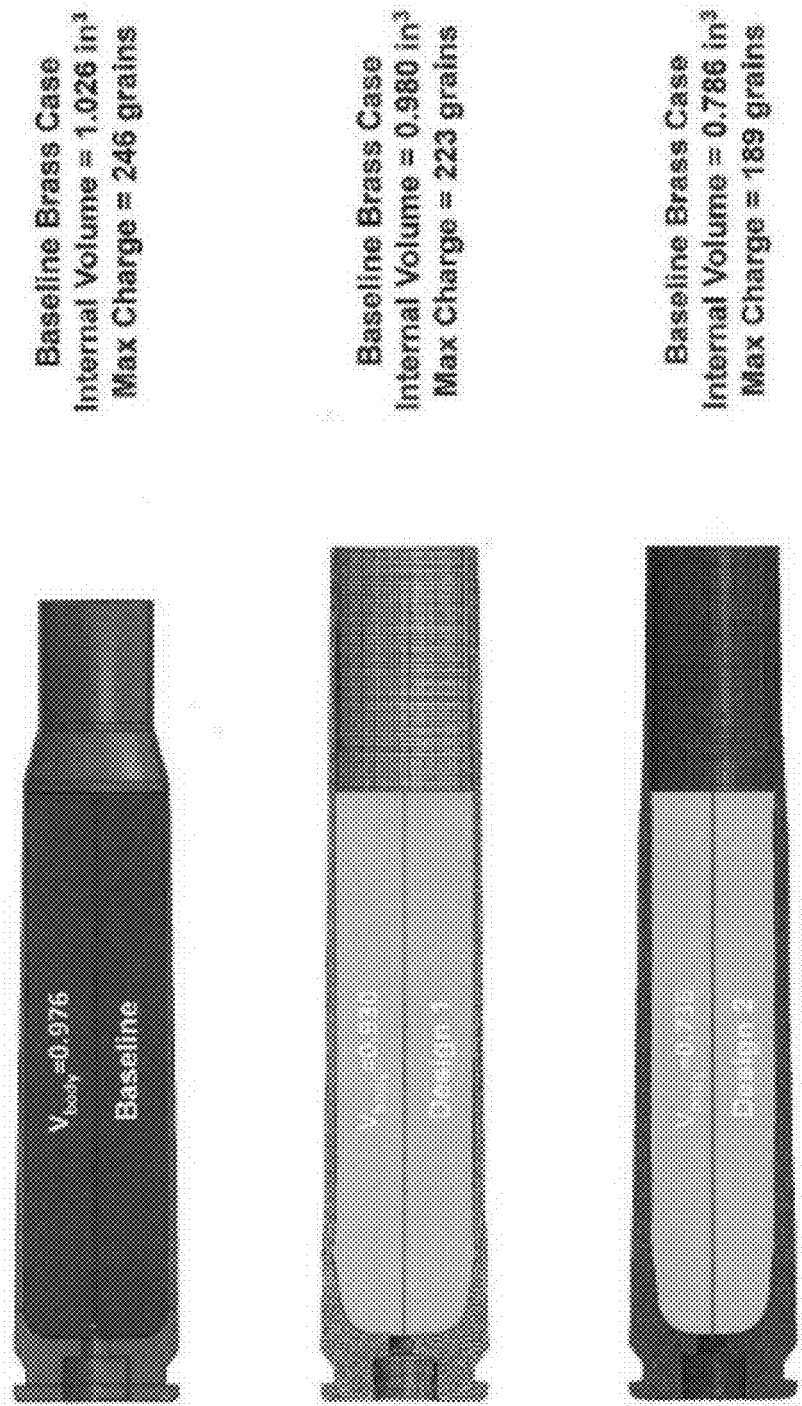

Referring to FIGS. 18A-18B, interior cartridge case volume (e.g., the volume of the hollow cavity 22) can be calculated and compared to a baseline interior cartridge case volume. Internal volume can be determined by Equation 3.

$$\text{Internal Volume} = v_{vent} + v_{neck} + v_{body} \quad \text{Equation (3)}$$

This may be done to determine and/or factor in propellant fill space and/or maximum charge. FIGS. 18A-18B show the calculated internal cartridge case volumes for the baseline cartridge case, the Design 1 cartridge case, and the Design 2 cartridge case. Using MIM can facilitate generating a cartridge case 10 without limiting the cartridge case's interior shape and size.

The calculated internal volume and the previously established firing simulation data can be used to analyze the MIM generated cartridge case geometry. From this data, the baseline can then be re-established or refined by comparing the MIM generated cartridge case geometry with the cold worked brass or polymer material properties and hardness gradient. This may be done to develop an understanding of the impact of changes in geometry associated with the MIM generated cartridge case geometry.

As noted above, the inventive method can facilitate use of alternative materials, which may be higher in strength. His may allow for generating a cartridge case 10 that has less material density and weight, as compared to traditional or polymer cartridge cases. This can lighten the load a solder must carry, lower freight shipping costs, etc. FIG. 19 shows a comparison between the baseline cartridge case and various MIM generated cartridge cases 10, demonstrating the improvement in density and weight.

Some embodiments can include alternative means to generate a taper on the body 14 of a shouldered-style, centerfire, straight wall, or rimfire cartridge case 10. In at least one embodiment, a two-core (a first core 40 and a second core 42) design requiring secondary forming operations to create taper on one end of a shouldered-style cartridge case 10 can be used. (See FIG. 20). Other embodiments can include creating two green parts (one of the end piece and one of the long case including the end taper), which may be joined during the debinding 160 and/or sintering 170 steps to create one cartridge case 10. Other embodiments can include creating an initial MIM with a taper using specialized tooling which may collapse to permit mold ejection which would create the cartridge case 10 in a single step.

In an exemplary embodiment, a cartridge case 10 can include a body 14 with a head 12 at a first distal end and a mouth 16 at a second distal end, wherein the cartridge case 10 consists essentially of powdered metal and/or powdered metal alloy(s) 110 that has been formed into the cartridge case 10 through an injection mold processing. In some embodiments, the cartridge case 10 consists of powdered metal and/or powdered metal alloy(s) 110 that has been formed into the cartridge case 10 through an injection mold processing.

A method for producing a shouldered-style, centerfire, straight wall, or rimfire cartridge case 10 can include generating an initial part by subjecting a MIM material 140 to MIM processing 150. The method can further include at least one of tapering and trimming the initial part to generate the cartridge case 10. This can generate a cartridge case 10 as an elongated member with a head 12 at its first end, a mouth 16 at its second end, and a body 14 lying between the head 12 and the mouth 16. The body 14 could include sidewalls 18 conjoined with a base 20 to form a hollow cavity 22 to contain propellant 48. The base 20 could further include a primer pocket 24 structured to receive and retain a primer 52. The primer pocket 24 could further include a vent 26 formed within the primer pocket 24 that may extend from the primer pocket 24 to the hollow cavity 22. The head 12 could further include the base 20 and a rim 32 that may extend radially from the base 20 to generate an extractor groove 34. The mouth 16 could further be configured to receive and retain a projectile 50.

Alternatively, or in addition, a method for producing a cartridge case 10 can include using FEM analysis or other analytical techniques to generate variables representing factors and characteristics associated with enabling the cartridge case 10 to be made via a MIM processes 100 and to enable an MIM generated cartridge case 10 to function properly during subsequent use as ammunition in a weapon. The method can include generating operating parameters based on the variables to control the MIM design 100. Mixing or kneading 120 powdered metal and/or powdered metal alloy(s) 110 with a binder material 130 can be done to form a MIM material 140. Metal Injection Molding 150 can be performed on the MIM material 140 to generate a MIM initial part. The Metal Injection Molding 150 can include at least partially melting the binder material 130 to form a semisolid metal-binder slurry, injecting the semisolid metal-binder slurry into a die cavity to form a green preform, thermally debinding 160 and/or chemically debinding 160 the green preform to generate a net-shape component, and sintering 170 the net-shape component for densification and to generate the MIM initial part. Tapering and trimming the initial part can be done to generate the cartridge case 10.

Before, during, and/or after the tapering and/or trimming, the net-shape component or the cartridge case 10 can be conditioned using a heat treatment and/or other metal working or can be used in the as sintered state. This can include solution treatment, annealing, tempering, hardening, strengthening, etc. For example, a cartridge case 10 including 17-4 PH precipitation hardening stainless steel material can be heat treated to a H900 condition, a H1150M condition, a H1150 condition, etc. This may be done to improve performance of the case cartridge. FIGS. 21-57 show test results of net-shape components and case cartridges 10 produced by the MIM process 100, where the net-shape component and/or the case cartridge 10 was not heat treated, heat treated to a H900 condition, heat treated to a H1150M condition, and heat treated to a H1150 condition.

Figure 21:
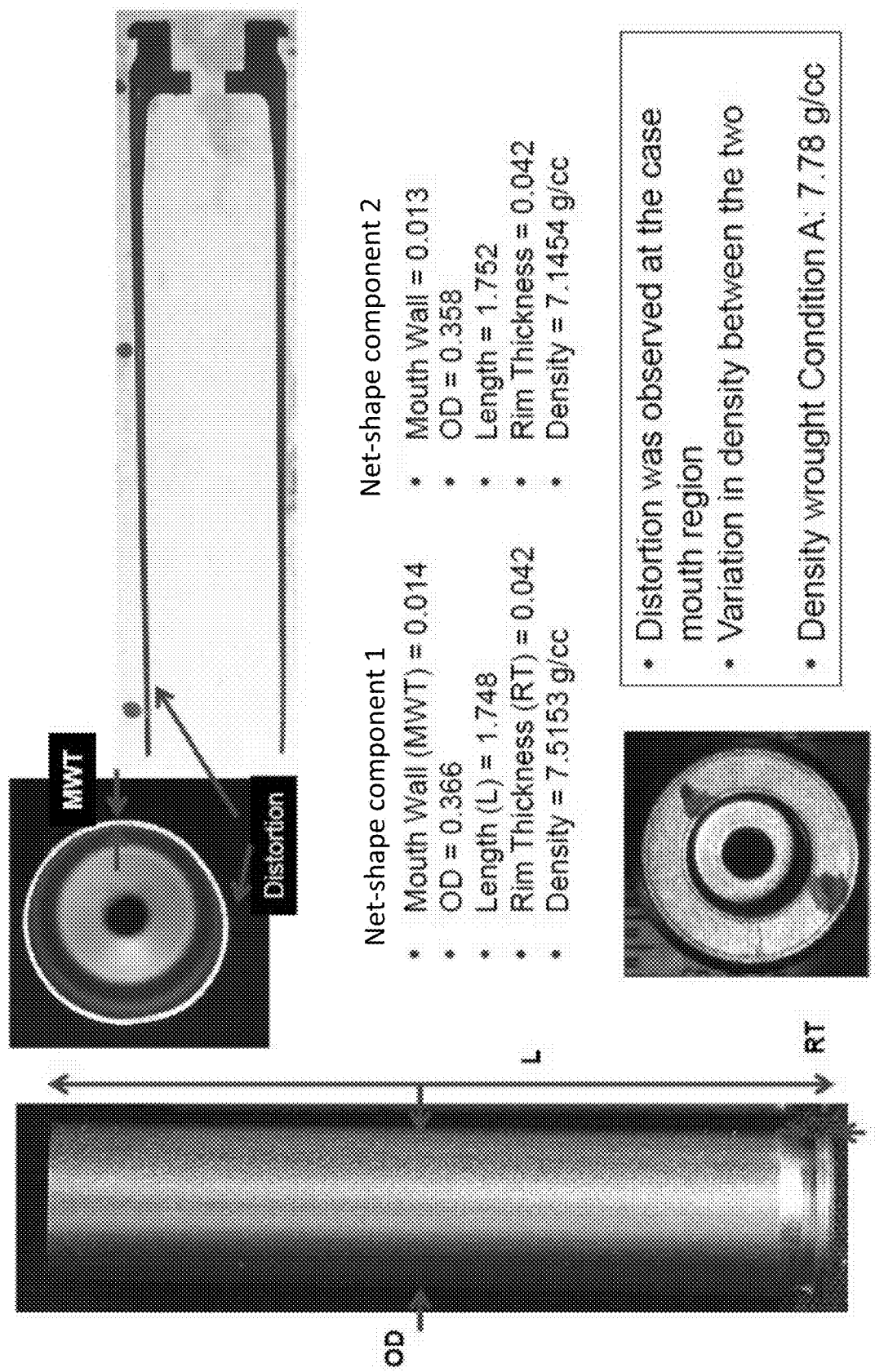
FIG. 21 shows the external dimensions of a MIM generated net-shape component.
Figure 22:
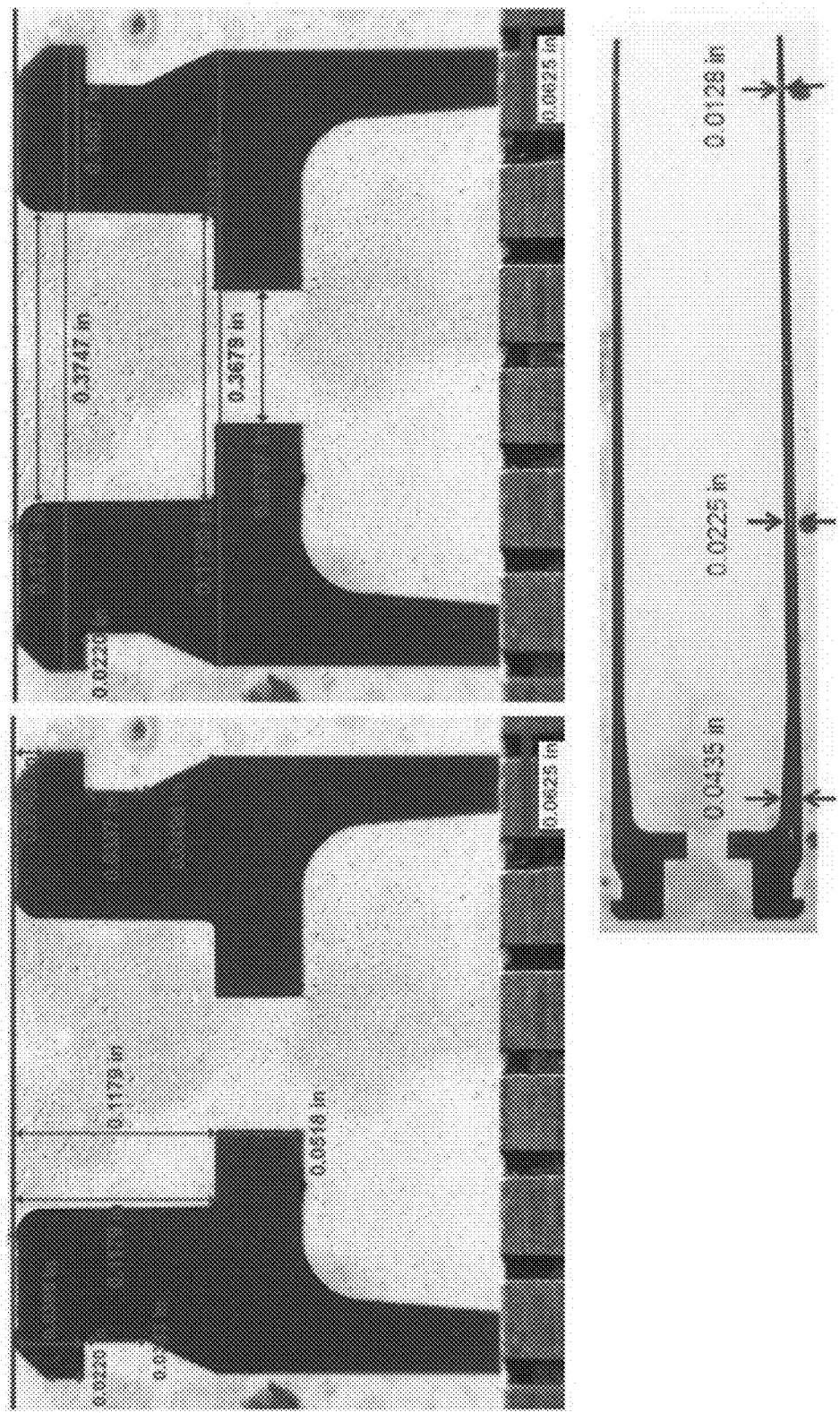
FIG. 22 shows the cross-sectional dimensions of two net-shape components that may be formed by the MIM process.
Figure 23:
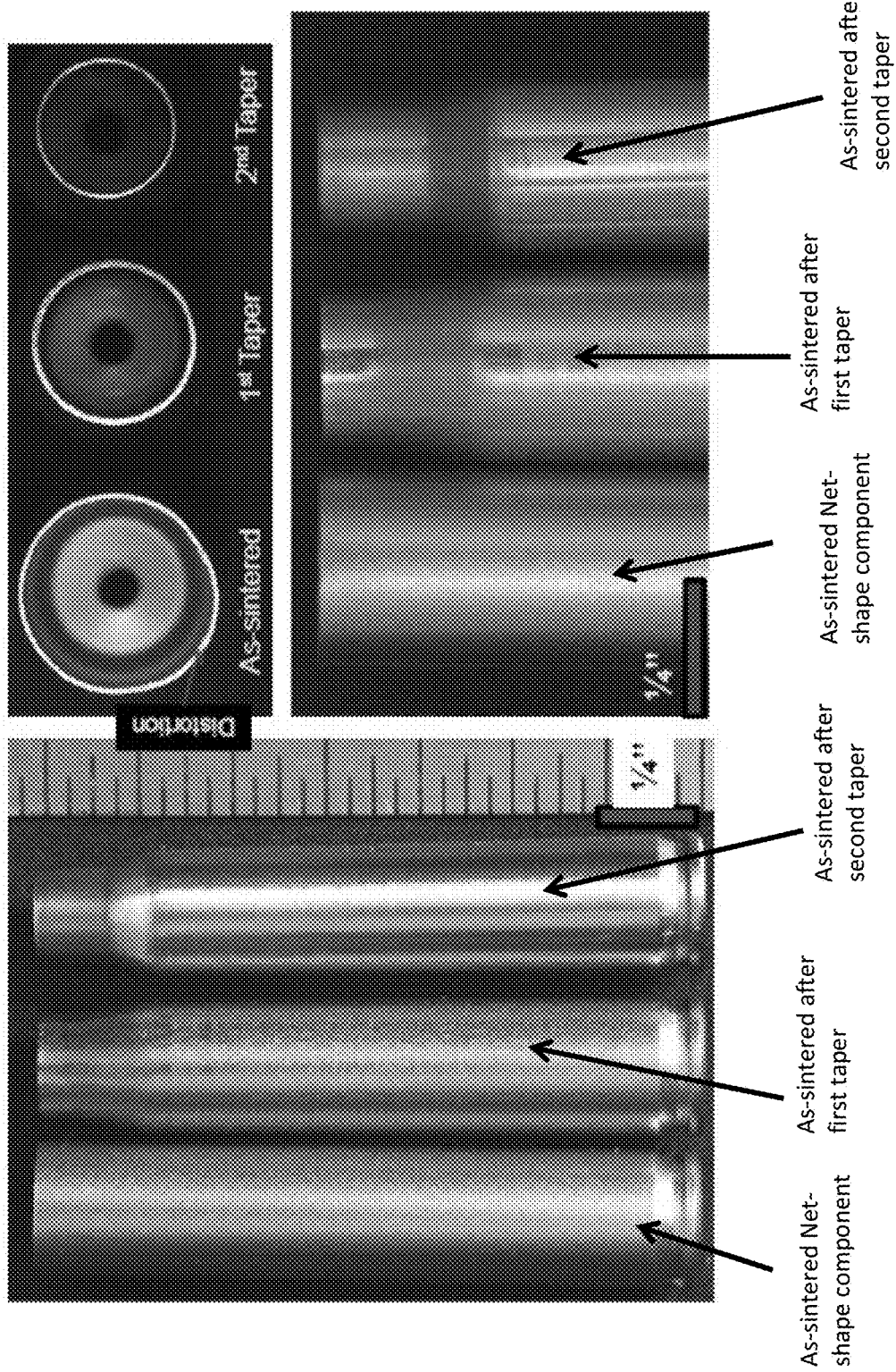
FIG. 23 shows a change in surface appearance and a reduction of mouth distortion due to formation of the taper.
Figure 24:
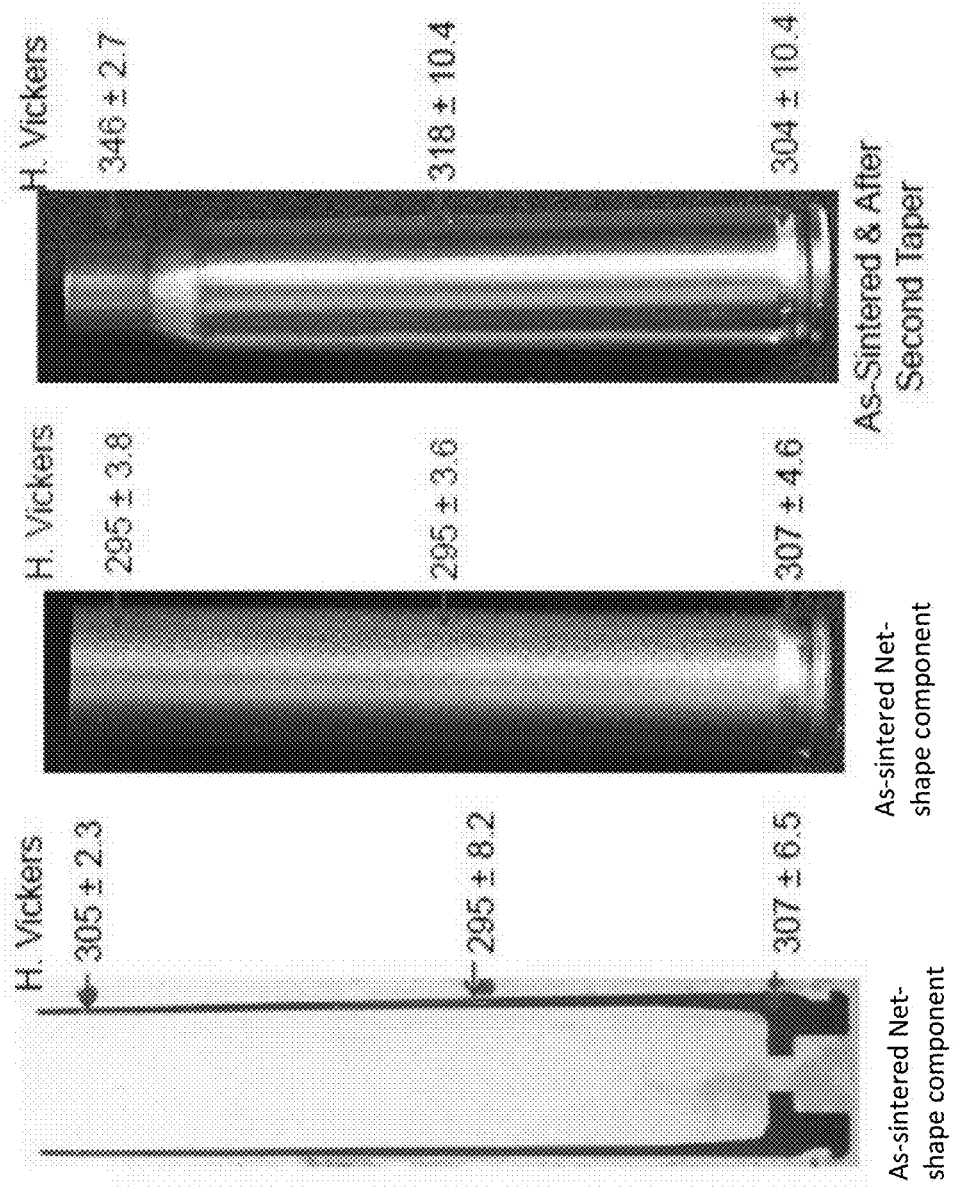
FIG. 24 shows the surface hardness of the net-component (before tapering) and that of the case cartridge 10 (after tapering).
Figure 25:
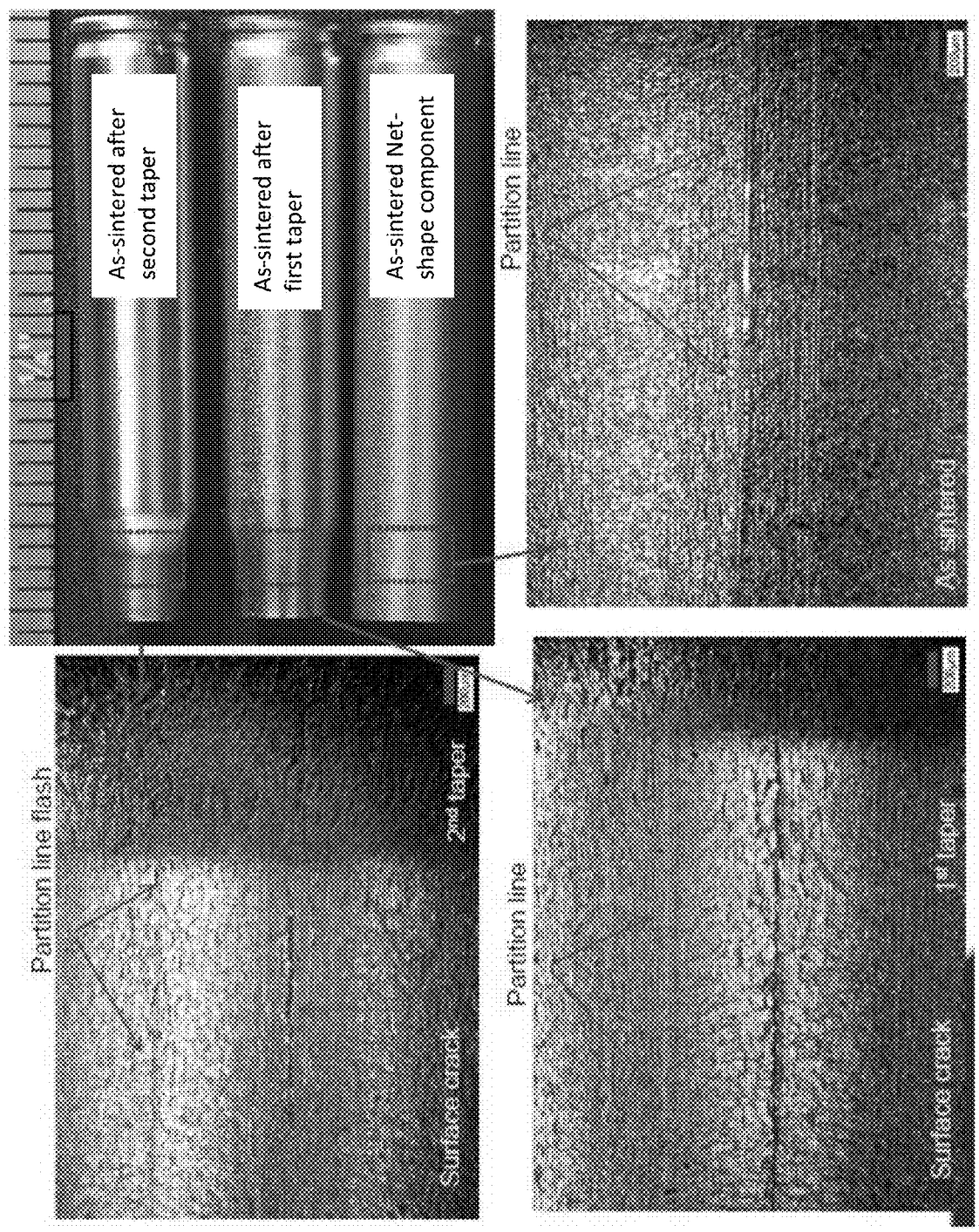
FIGS. 25-29 show the surface appearance of the net-shape component and the cartridge case after the first taper and after the second taper.
Figure 26:
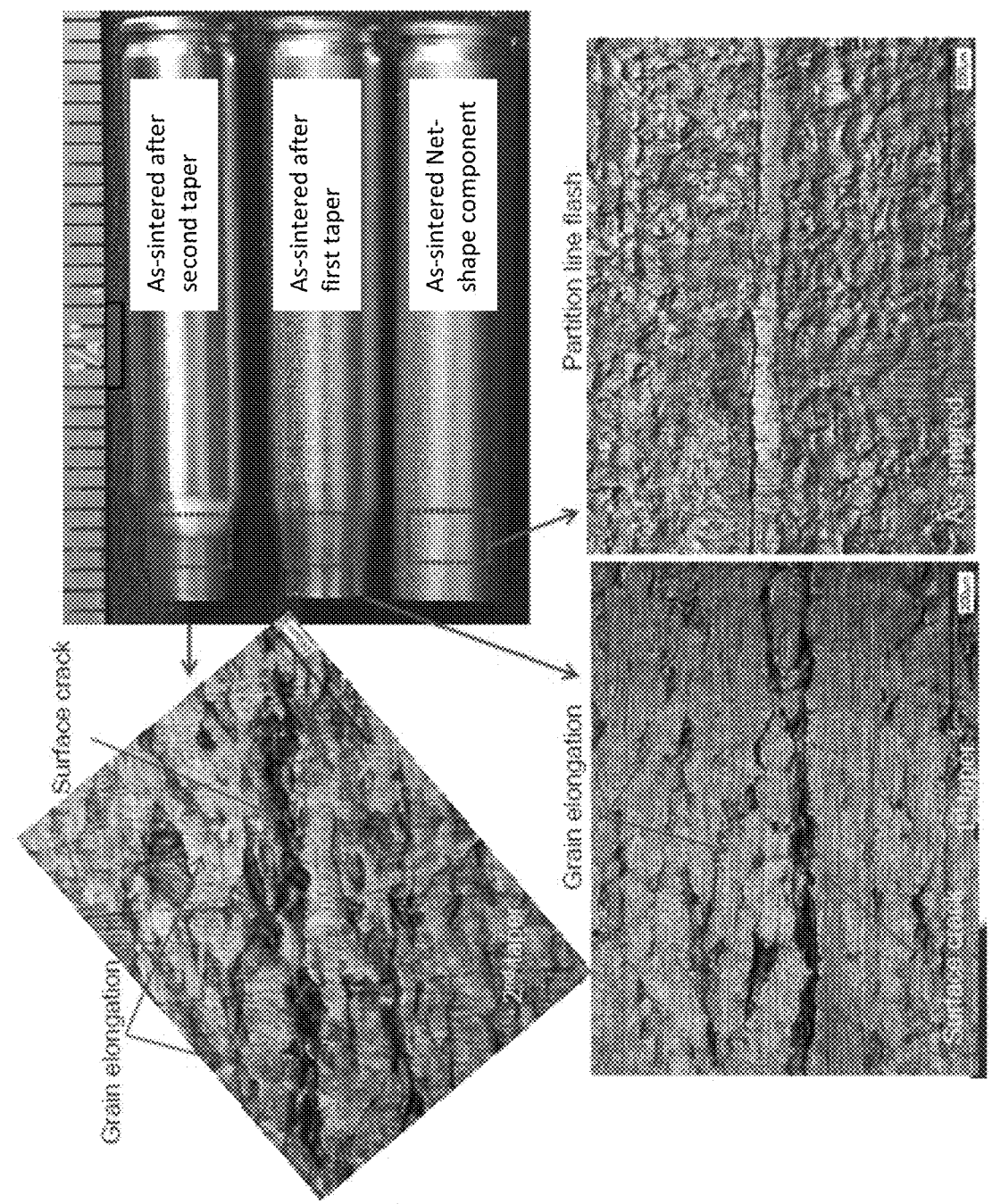
Figure 27:
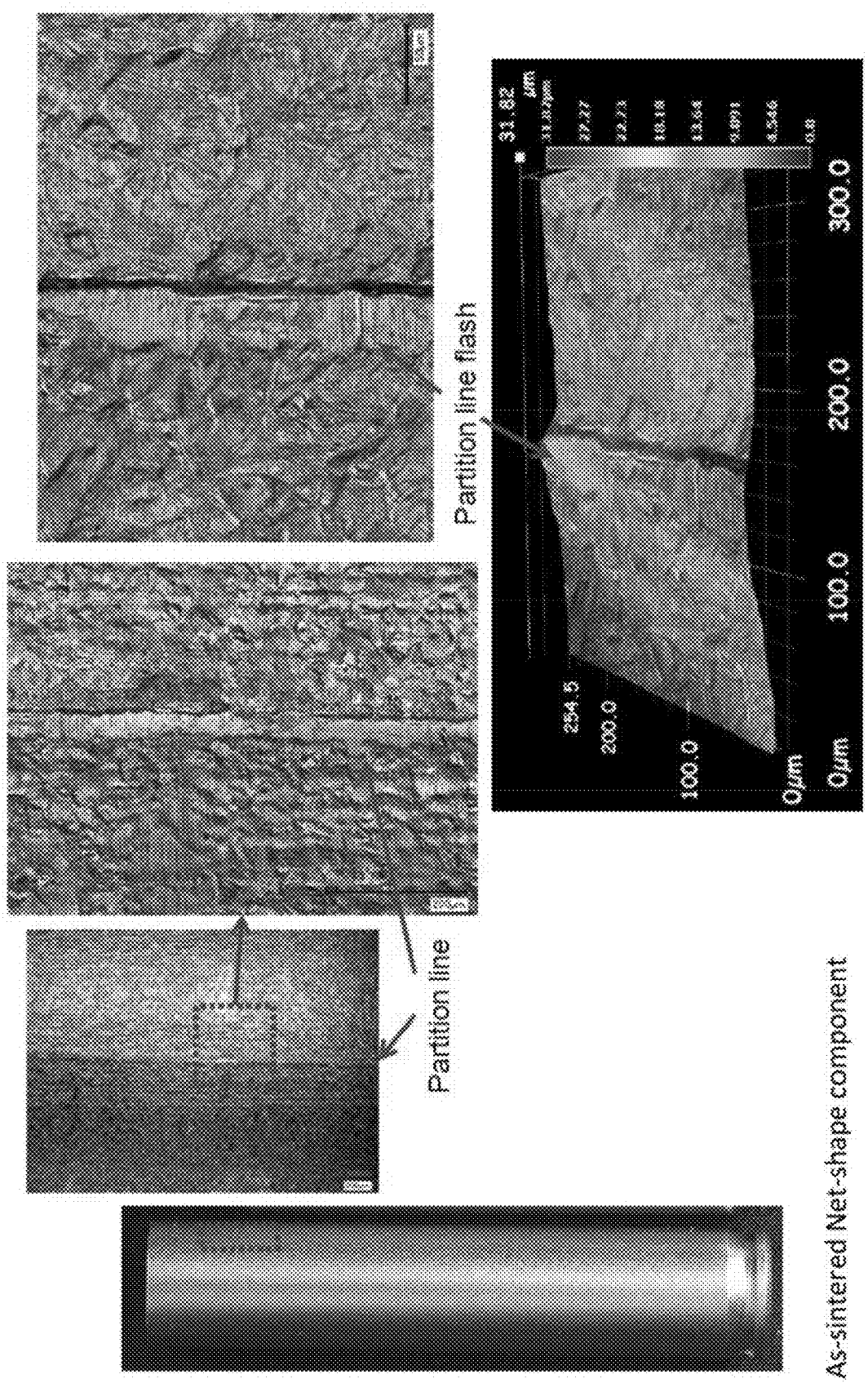
Figure 28:
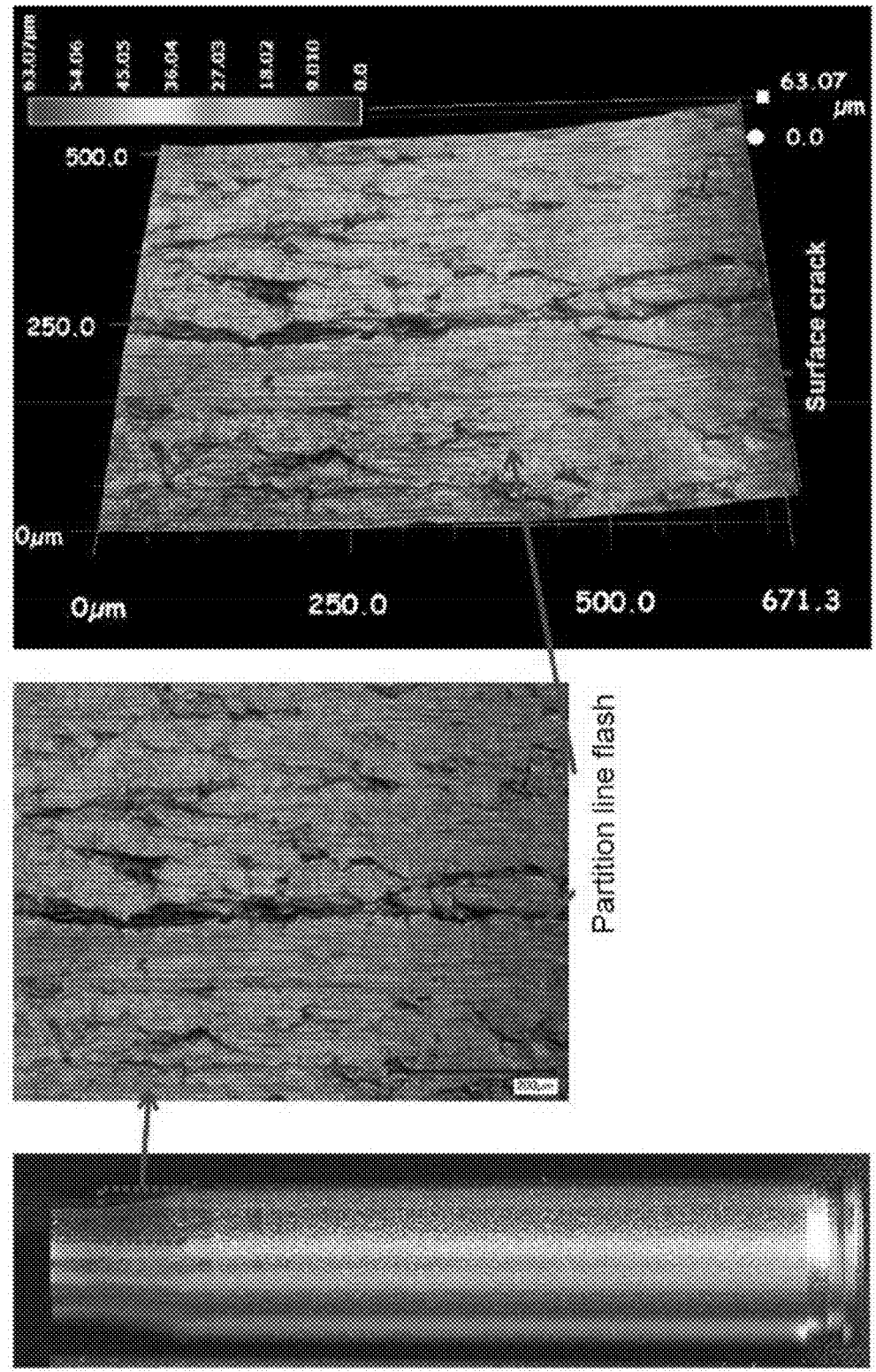
Figure 29:
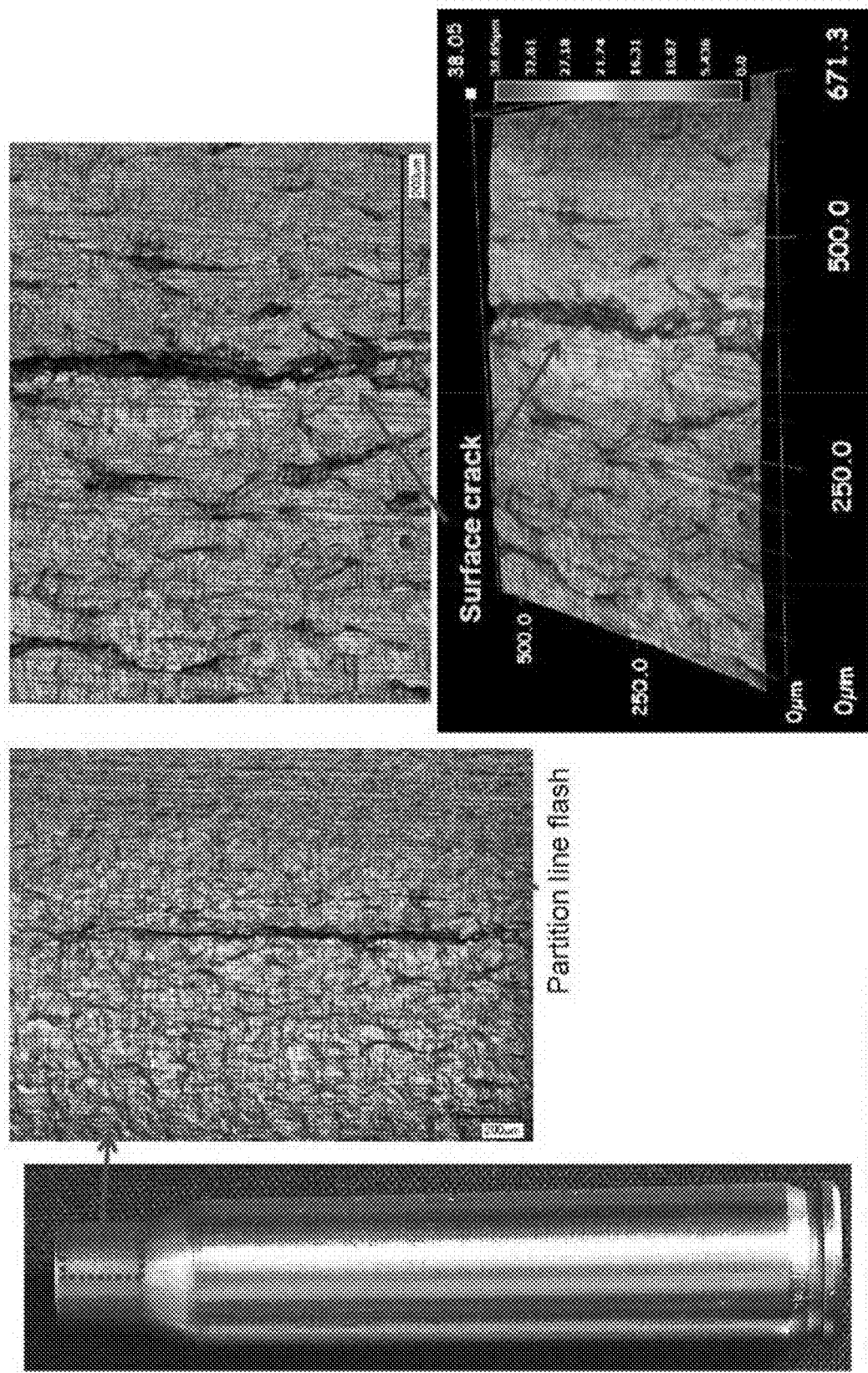

FIGS. 21-33 show test results of a net-shape component and a case cartridge comprising 17-4 PH stainless steel formed by the MIM process 100 without additional heat treatment. FIG. 21 shows the external dimensions of the MIM generated net-shape component. Distortion was observed at the mouth 16. Two net-shaped components (net-shape component 1 and net-shape component 2) were generated and compared. Slight variations in dimensions and densities were observed between net-shape component 1 and net-shape component 2. FIG. 22 shows the cross-sectional dimensions of net-shape component 1 and net-shape component 2. The dimensional variations may be due to electrical discharge machining ("EDM") cutting errors. FIG. 23 shows a change in surface appearance and a reduction of mouth 16 distortion after the first taper and/or second taper is formed. For example, the grainy-like appearance from the net-shape component changed to a smooth shiny surface after the second taper was formed. FIG. 24 shows the surface hardness of the net-component (before tapering) and that of the case cartridge 10 (after tapering). FIG. 24 shows that the surface hardness of the cartridge case 10 head 12 is slightly higher than that of the body 14. The surface hardness of the cartridge case 10 body 10 is uniform. The through wall thickness hardness of the cartridge case 10 head 12 is comparable to that of its surface. The through thickness hardness of the cartridge case 10 mouth 16 is slightly higher than that of the cartridge case 10 body 14. As can be seen, there is a slight increase of the hardness of the cartridge case 10 body 10 surface (~7%) after tapering. The hardness of the tapered mouth 16 surface of the cartridge case 10 increased by approximately 17% due to cold working. The as-sintered cartridge case 10 has a hardness lower than that of the H1150M Condition (see FIGS. 43-45). For example, the as sintered cartridge case 10 has a hardness of 29-31 Rc. The cartridge case 10 heat treated to H1150 has a hardness of 33 Rc~(327 HV).

FIGS. 25-29 show the surface appearance of the net-shape component and the cartridge case 10 after the first taper and after the second taper. Incipient surface cracks appeared in the cartridge case 10 after the first and second taper. The cracks are in the longitudinal direction and adjacent to the partition line flash. This is applicable to the parting line whether the parting line is longitudinal or horizontal. The "shinny" surface appearance of the cartridge case 10 body 14 after forming the second taper may indicate high friction produced surface deformation. The net-shape component shows some grain directionality and thermal etching. Cracks formed after the first taper are in the longitudinal direction, along the elongated grain boundaries. The cracks may be the result of a shear stress produced by flash material of a partition line flash. The partition line flash was flattened during the first and second taper (see FIGS. 31-32). Grain elongation occurred after the second taper, which is due to cold forming induced by tapering.

Figure 30:
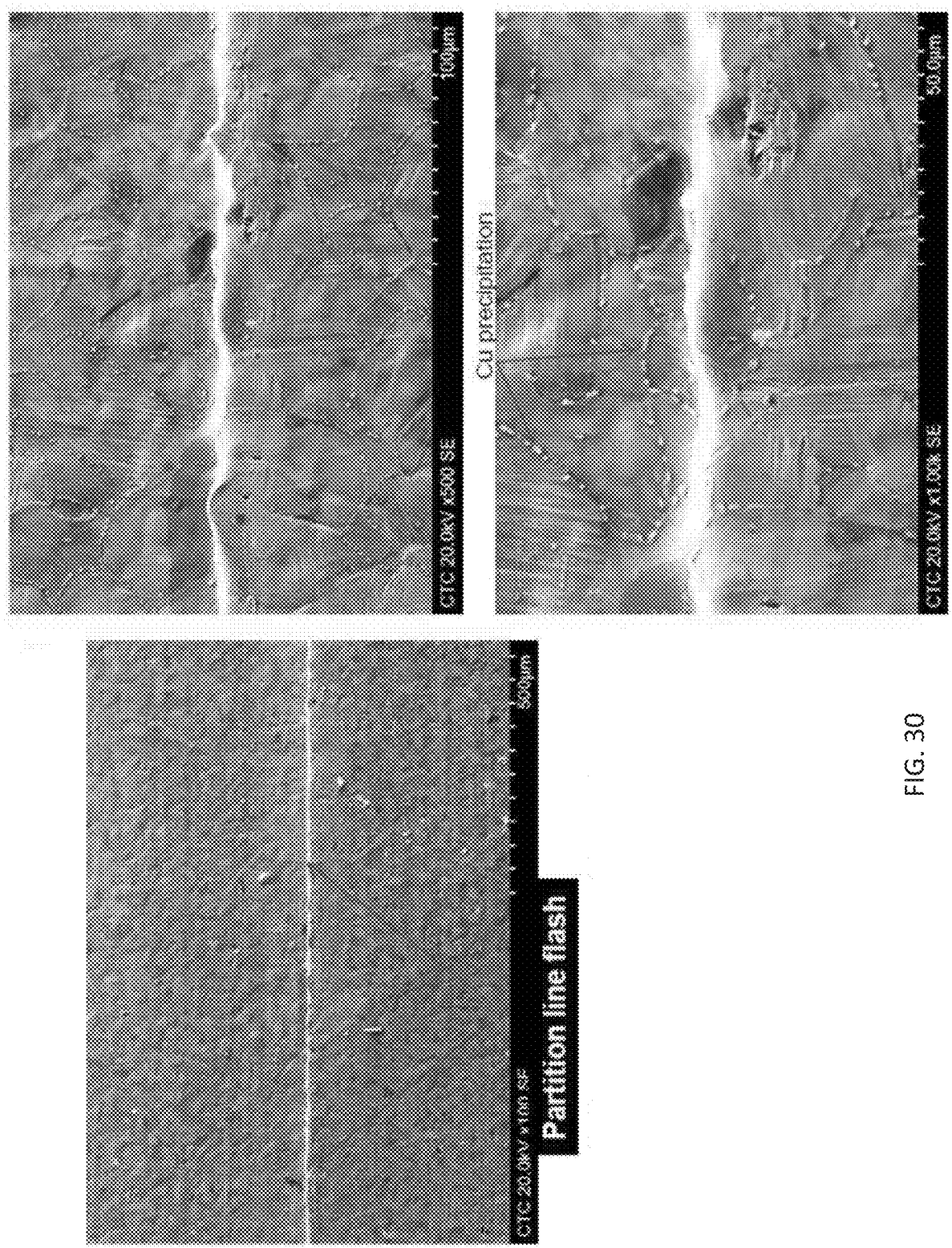
Figure 31:
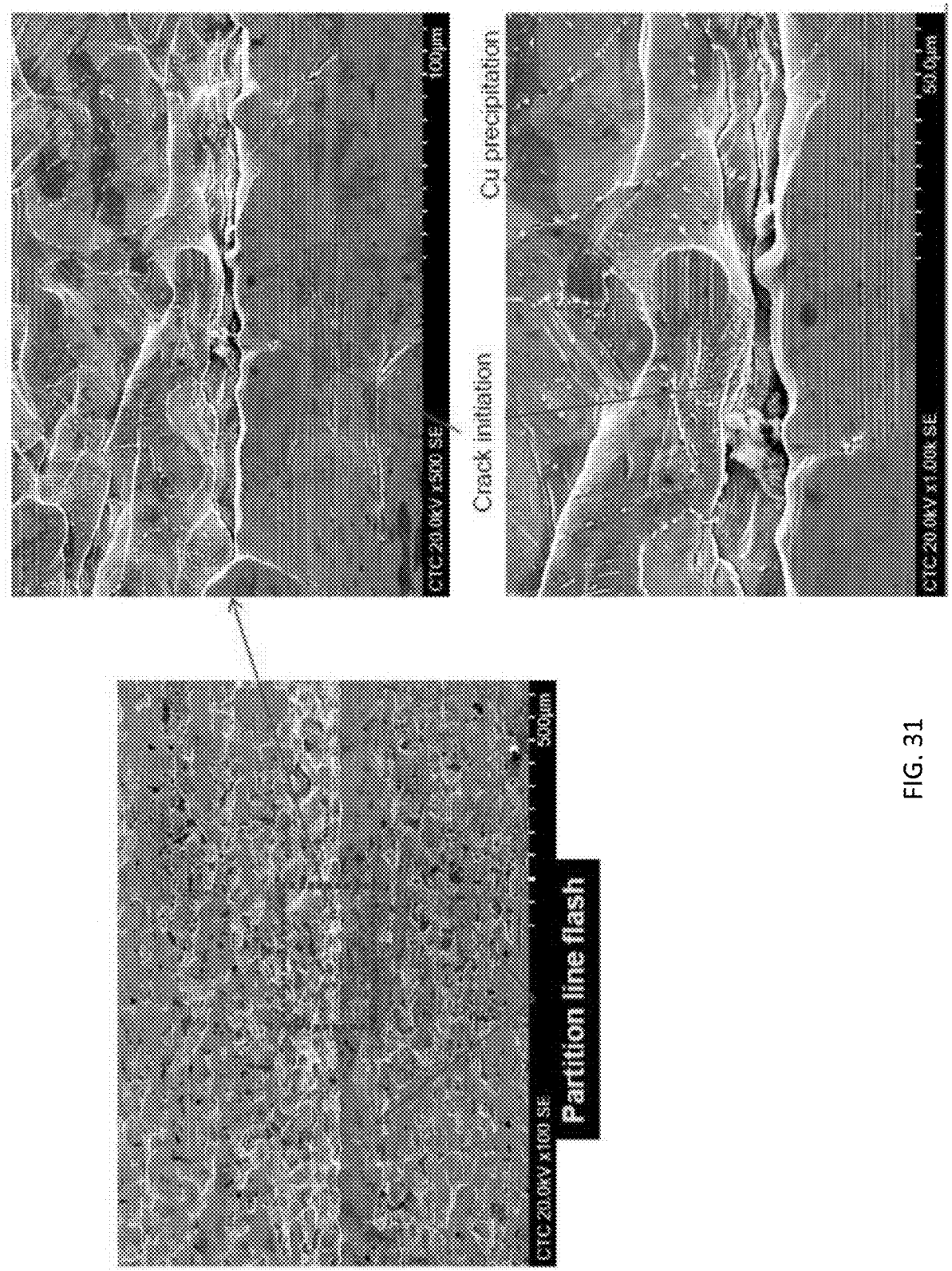

FIGS. 30-32 show SEM imagery of surface microstructure of the net-shape component, the cartridge case 10 after the first taper, and the cartridge case 10 after the second taper, respectively. Referring to FIG. 30, the net-shape component exhibited a parallel band-like appearance at the surface. The parallel bands are in the longitudinal direction of the tubular axis of the net-shape component. This may indicate the flow of the MIM material. A thin and narrow mold partition line appeared, and the partition line had a wavy-like (sinusoidal) appearance. Coarse Copper precipitation was observed at the grain boundaries. Equiaxed grains were also observed. Referring to FIG. 31, slight grain deformation in the direction of taper was observed. Crack initiation started to occur at the side of the partition line flash. Flattening of the flash also started to occur. Referring to FIG. 32, grain deformation and smearing (galling) in the direction of taper forming was observed. Cracking development adjacent to the partition line flash was observed. Complete flattening of the flash line also occurred.

Figure 33:
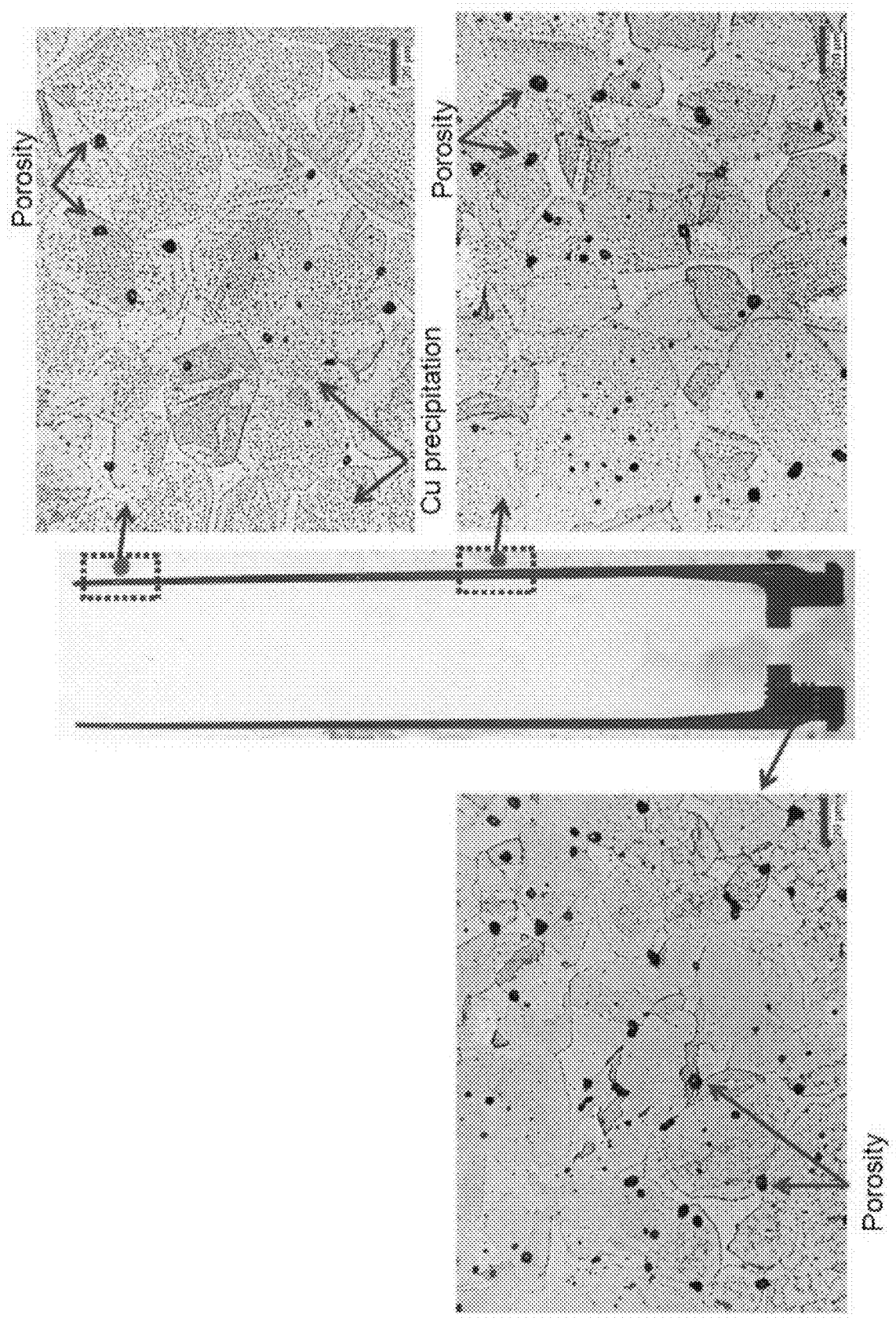
FIG. 33 shows light optical microstructure of the cartridge case.

FIG. 33 shows light optical microstructure of the cartridge case 10, which demonstrates a uniform microstructure including equiaxed martensitic grains with extensive inter and intragranular copper precipitation. The mouth 16 and the body 14 of the cartridge case 10 had a lesser amount of porosity than that observed in the cartridge case 10 head 12. There is some possible ferrite at the grain boundaries of the cartridge case 10 head 12 microstructure.

Figure 34:
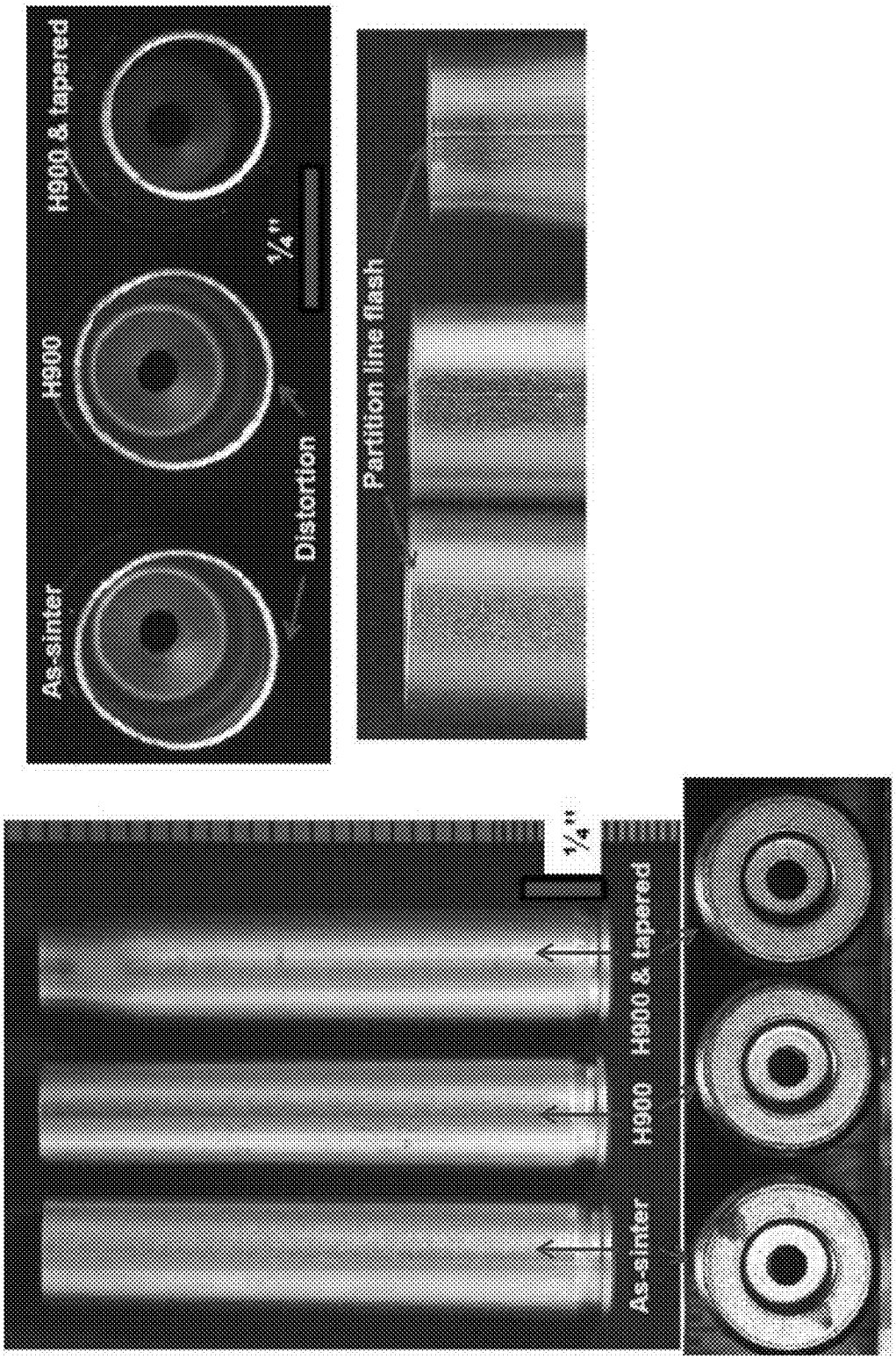
FIG. 34 shows the external dimensions of the MIM generated net-shape component subjected to a heat treatment.
Figure 35:
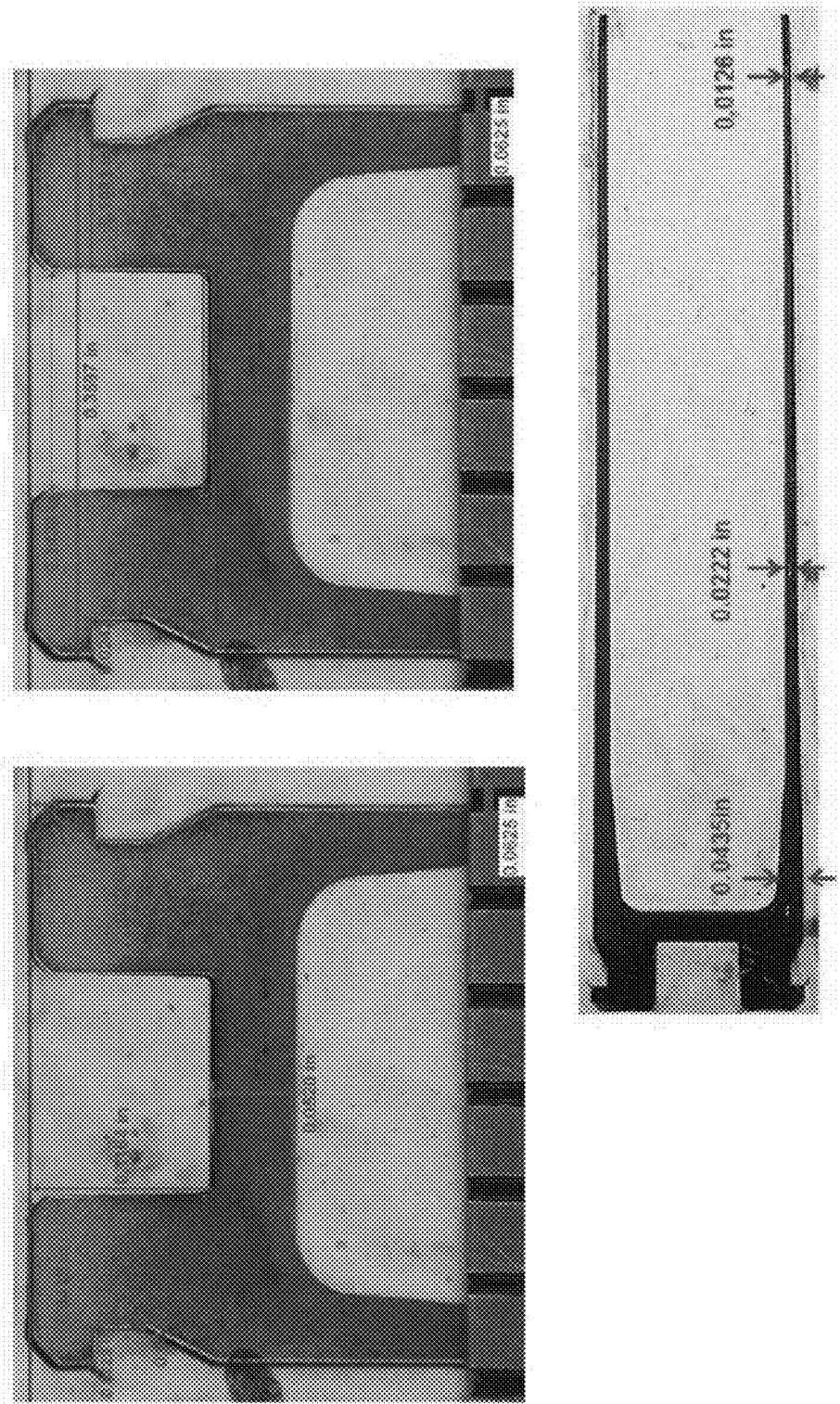
FIG. 35 shows the cross-sectional dimensions of two net-shape components subjected to a heat treatment.
Figure 36:
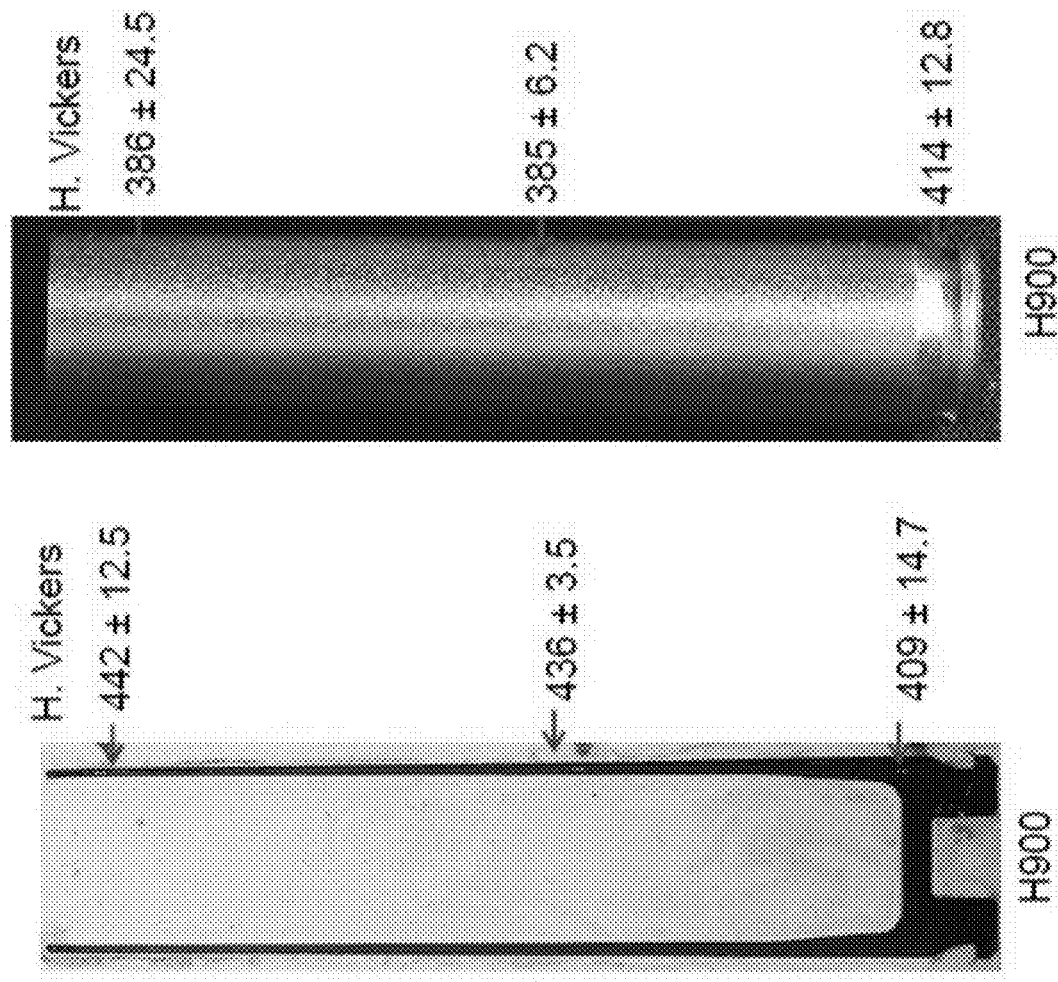
FIG. 36 shows the surface hardness as a result of a heat treatment.

FIGS. 34-42 show test results of a net-shape component and a case cartridge comprising 17-4 PH stainless steel formed by the MIM process 100 with a heat treatment at a H900 condition. FIG. 34 shows the external dimensions of the MIM generated net-shape component. The grainy-like appearance from the as-sintered condition changed to a smoother surface after heat treatment and forming of the first and/or second taper. The mouth outer diameter ("OD") distortion of the as-sintered case remained after heat treatment, but it disappeared after the first and/or second taper was formed. The partition line along the longitudinal axis still remained after heat treatment and after the first and second tapering. The density of the H900 condition material increased from 7.33 g/cm$^3$ to 7.762 g/cm$^3$ due to the H900 heat treatment. FIG. 35 shows the cross-sectional dimensions of two net-shape components (net-shape component 1 and net-shape component 2). The dimensional variations may be due to electrical discharge machining ("EDM") cutting errors. FIG. 36 shows the surface hardness as a result of the heat treatment. The surface hardness of the net-shape component head 12 is slightly higher than that of the body 14. The surface hardness of the net-shape component body 10 is uniform. The through wall thickness hardness of the net-shape component head 12 is comparable to that of its surface. The through thickness hardness of the net-shape component mouth 16 is slightly higher than that of the net-shape component body 14. The hardness of a net-shape component with a tapered mouth 16 was not measured but it is expected to increase due to cold working.

Figure 37:
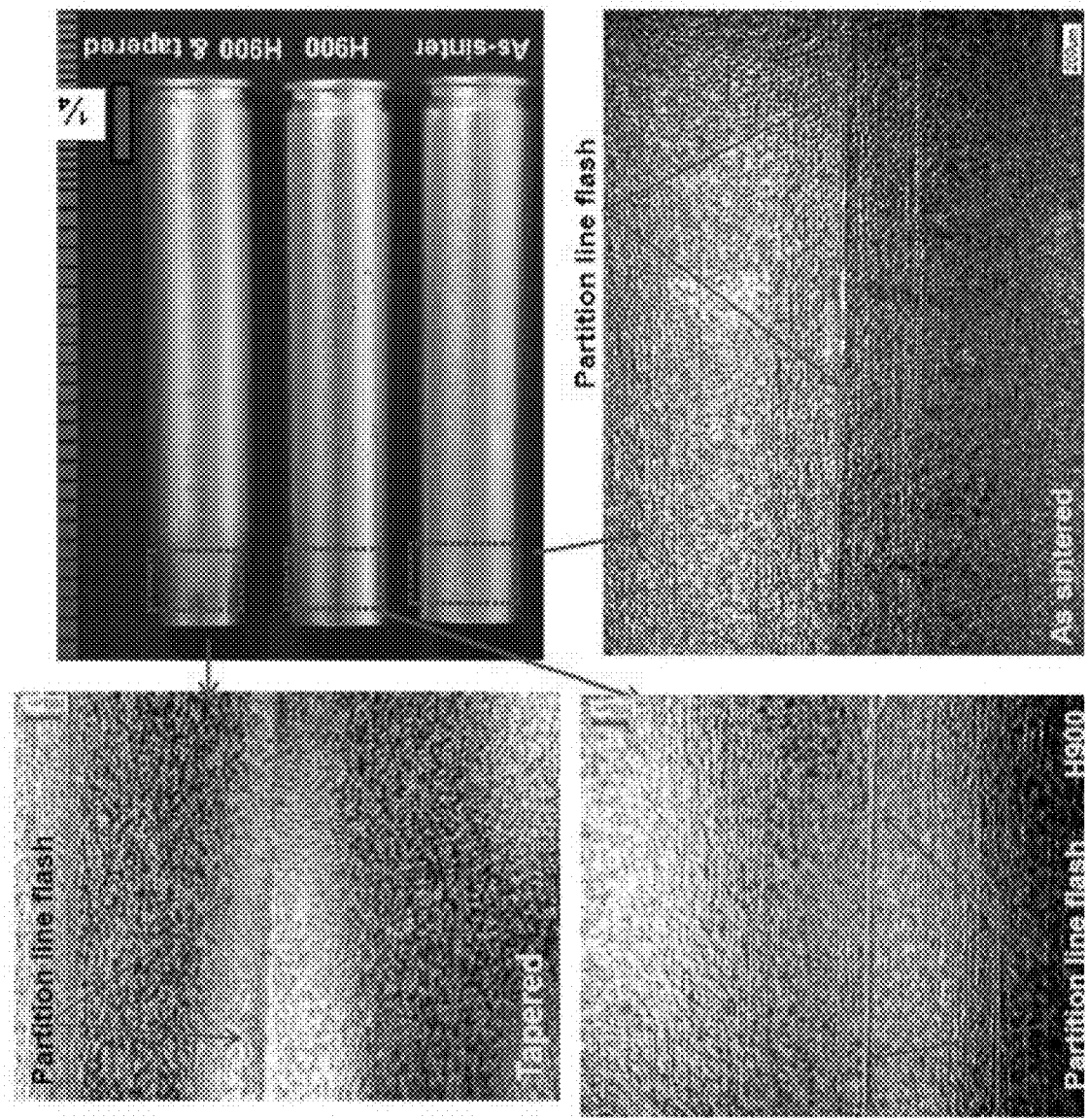
FIGS. 37-39 show the surface appearance of the net-shape component as-sintered, the net-shaped component after conditioned and the net-shaped component conditioned to H900 and after the taper is formed.
Figure 38:
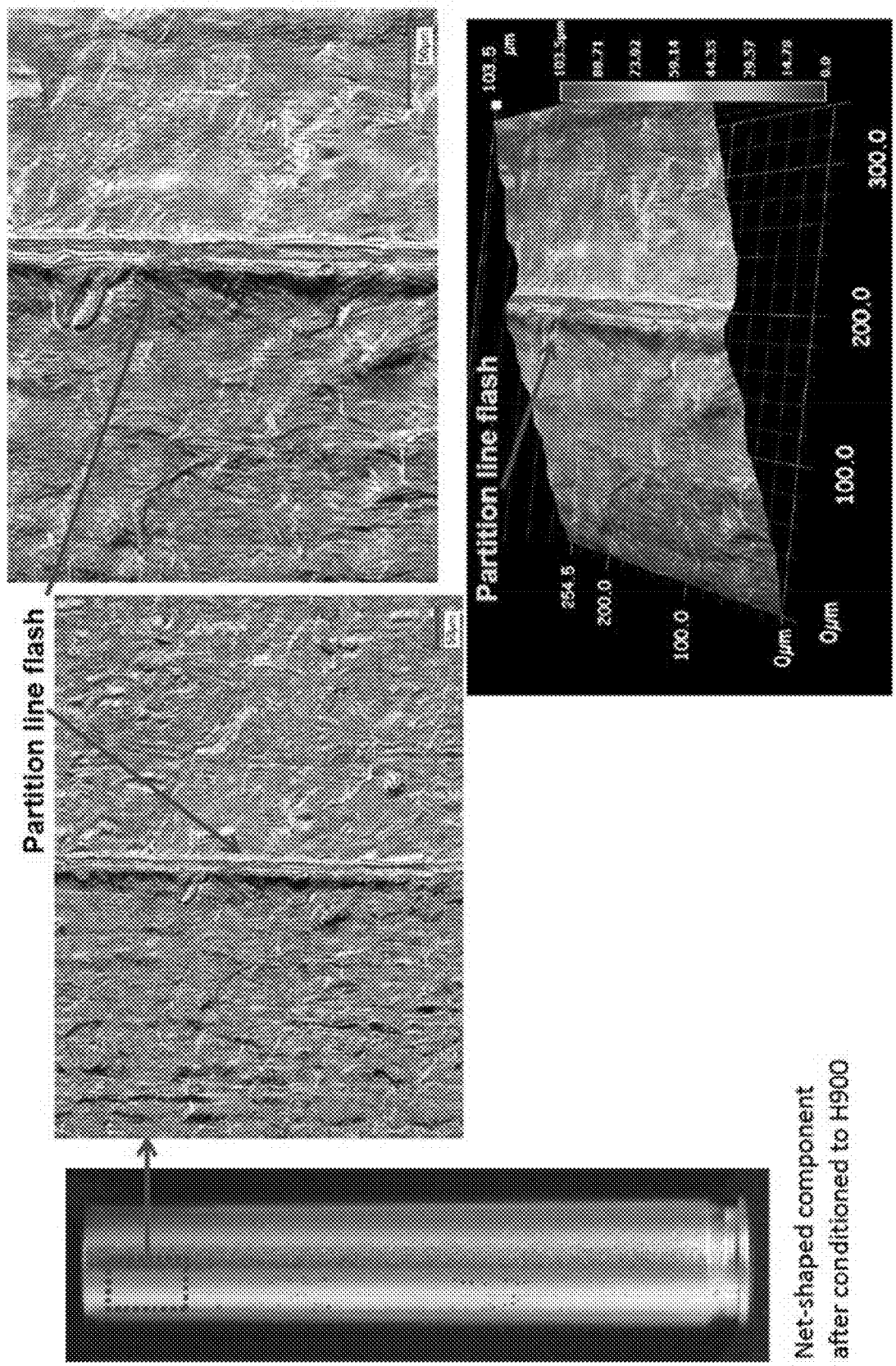
Figure 39:
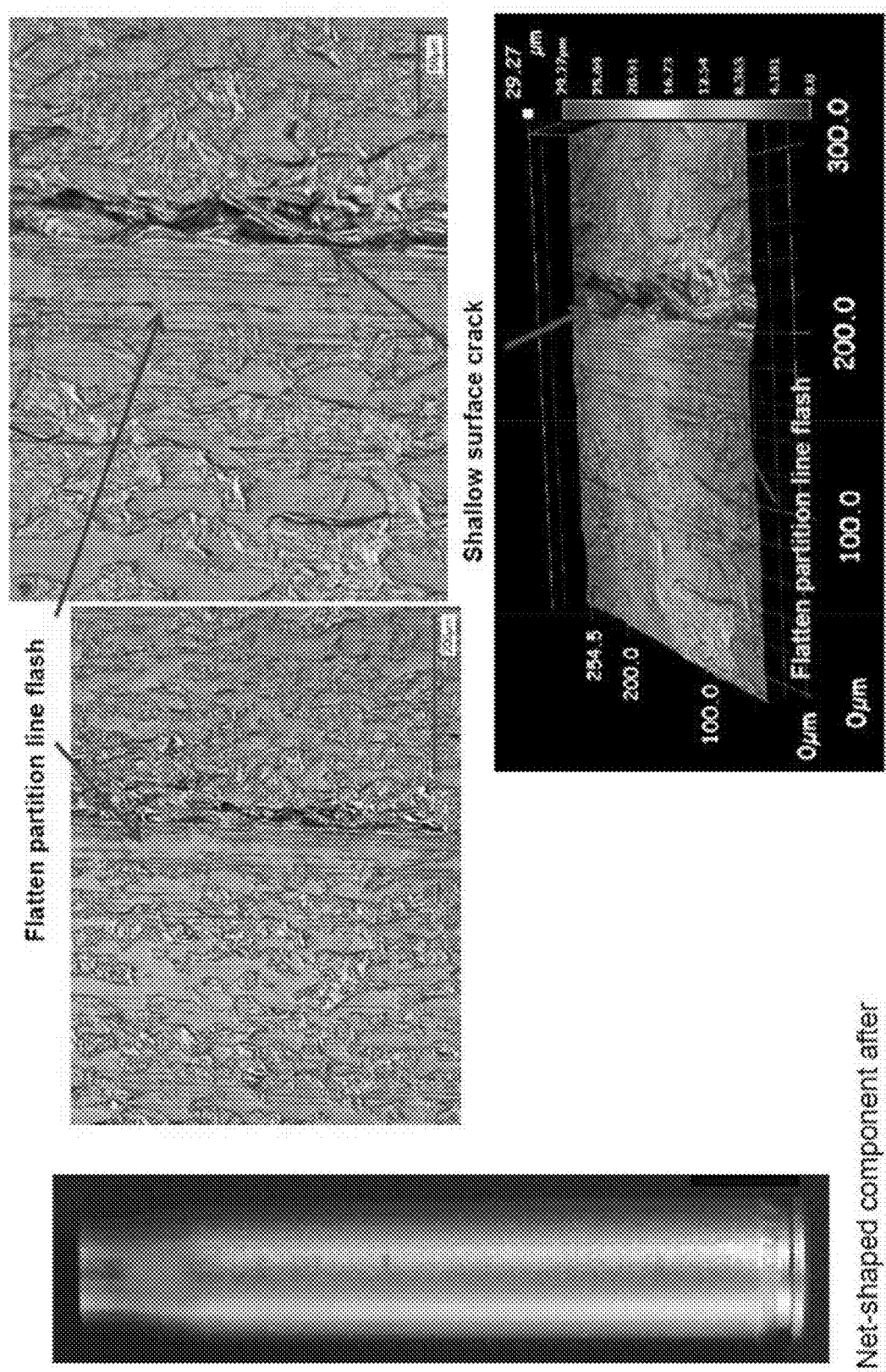

FIGS. 37-39 show the surface appearance of the net-shape component as-sintered, the net-shaped component after conditioned and the net-shaped component conditioned and after the taper is formed. Very well defined partition line flash was observed in both the net-shape component as-sintered and in the net-shaped component after conditioned. A very fine band-like pattern along the axis of the tube in was observed in all three. Grain elongation occurred due to the cold forming induced by tapering. No cracks were observed after the forming of the taper. The net-shaped component after conditioned exhibited a grainy-like appearance, equiaxed grain structure was observed at the surface, and no cracks were observed at the partition line flash or at adjacent regions. The partition line flash for the net-shaped component after conditioned. The net-shaped component conditioned with a taper exhibited a crack after the second taper was generated. The crack was observed adjacent to the partition line flash. The partition line flash was flattened by the forming of the second taper.

Figure 40:
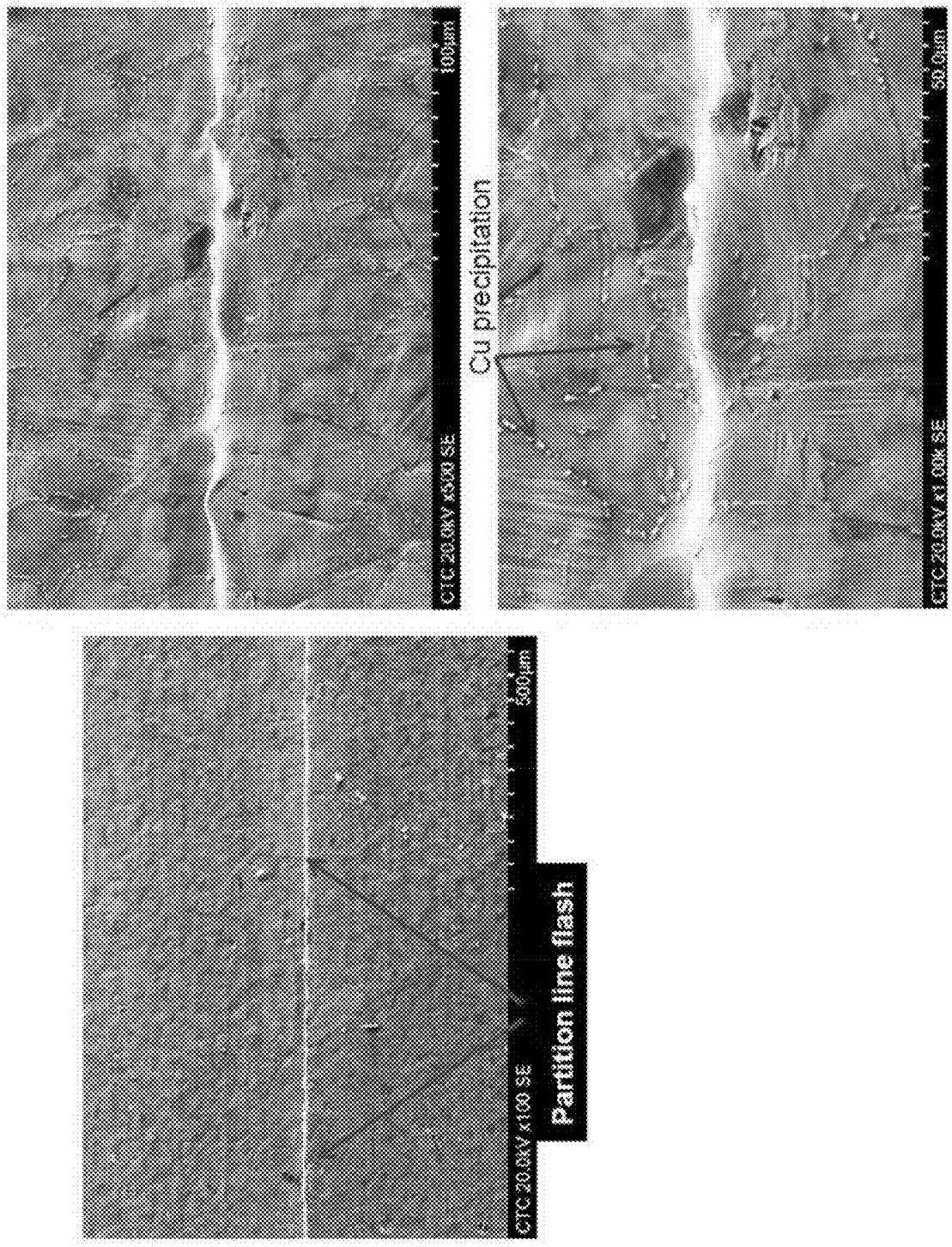
FIGS. 40-41 show SEM imagery of surface microstructure of the net-shape component and the net-shaped component and tapered, respectively.
Figure 41:
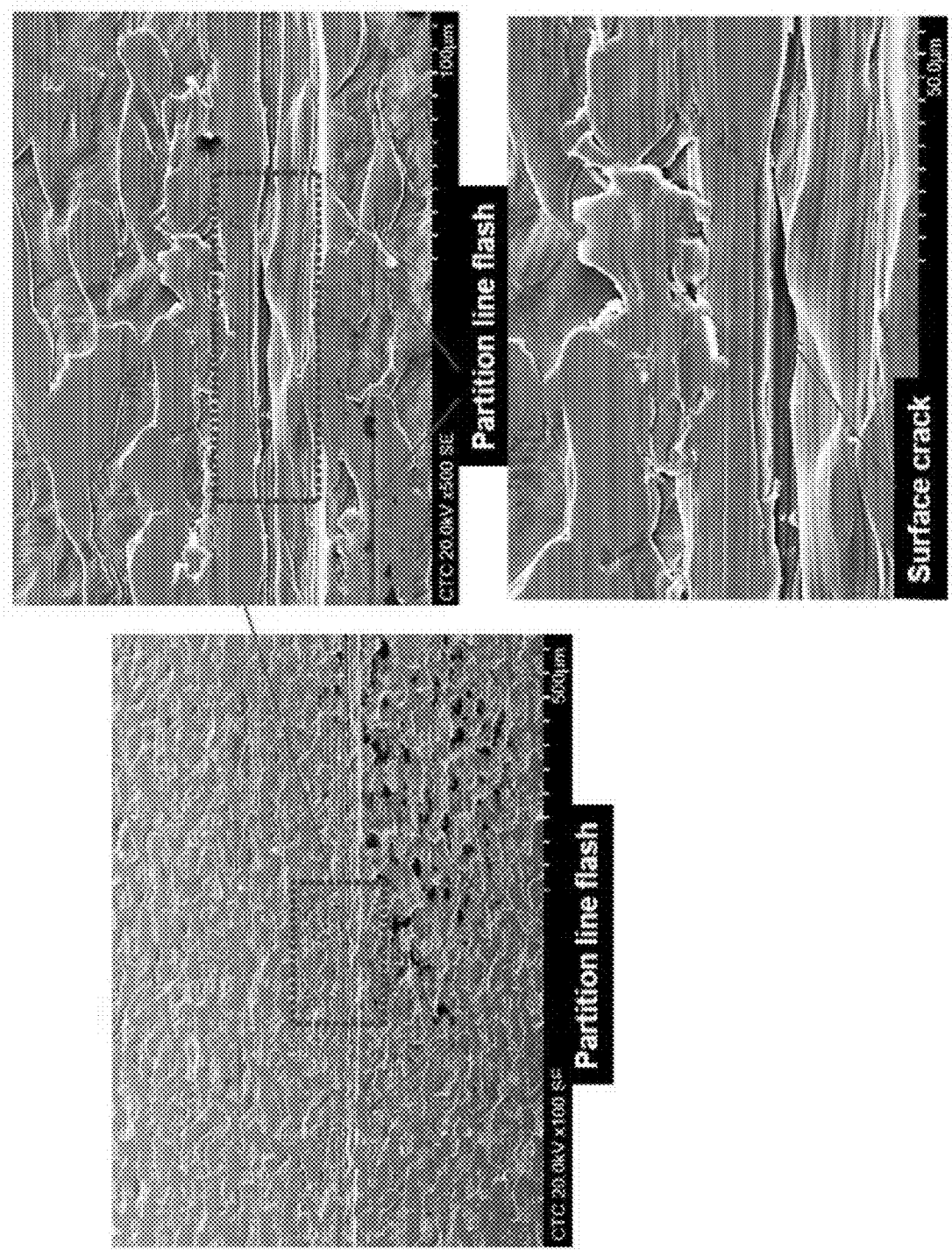

FIGS. 40-41 show SEM imagery of surface microstructure of the net-shape component and the net-shaped component and tapered, respectively. Referring to FIG. 40, the band-like appearance disappeared after heat treatment. A thin and narrow mold partition line flash with wavy-like (sinusoidal) appearance was observed. Coarse Copper precipitation at the grain boundaries was not present. Equiaxed grains were observed. Referring to FIG. 41, grain deformation and smearing (galling) in the direction of taper forming occurred. Surface cracking adjacent to the partition line flash was observed. Complete flattening of the partition line flash was also observed.

Figure 42:
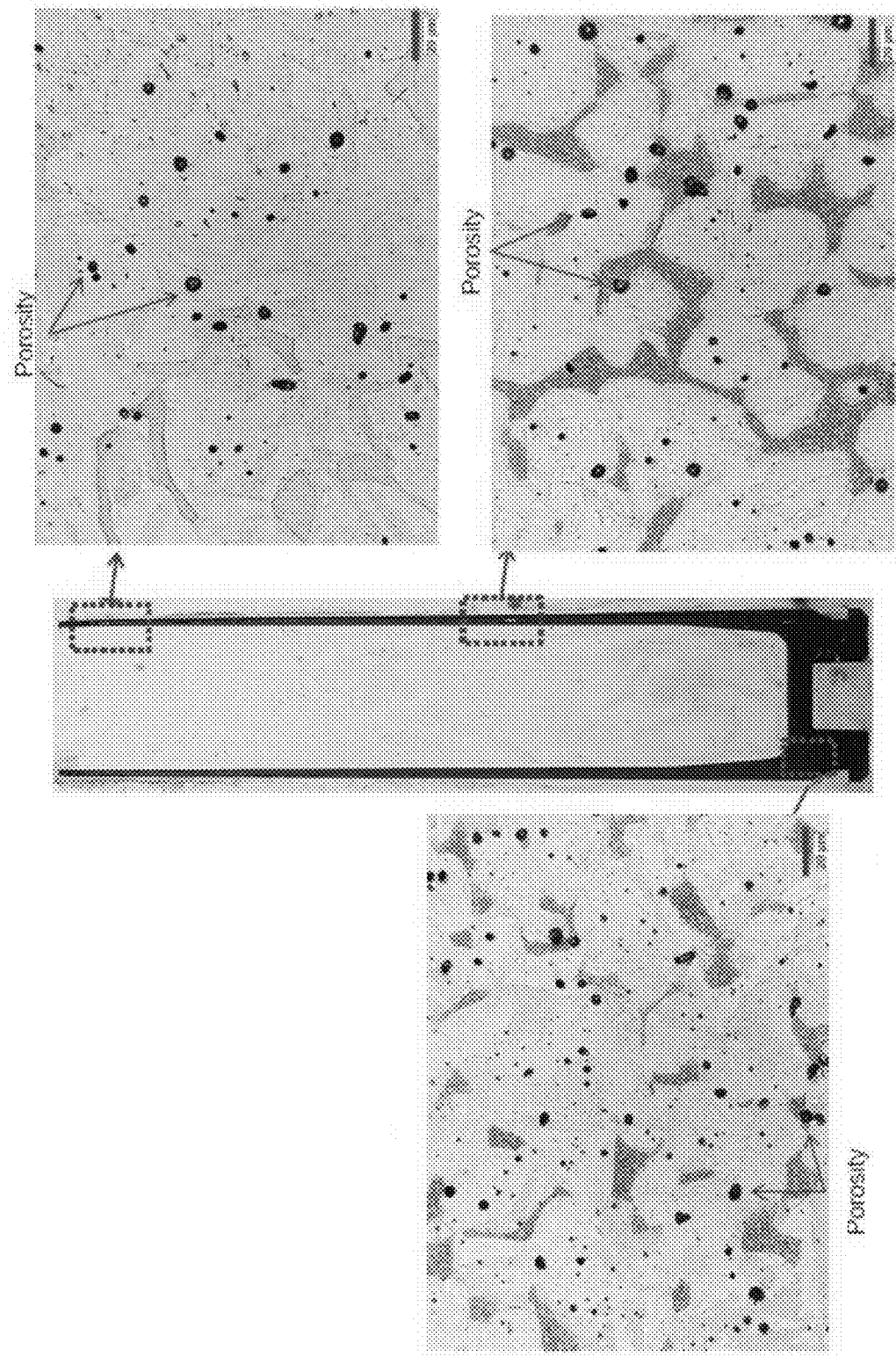
FIG. 42 shows light optical microstructure of the net-shaped component after being heat treated.

FIG. 42 shows light optical microstructure of the net-shaped component conditioned, which demonstrates a uniform microstructure including equiaxed martensitic grains with extensive inter and intragranular copper precipitation. The mouth 16 and the body 14 had a lesser amount of porosity than that observed in the head 12. The microstructure of all sections of the component show presence of some ferrite.

Figure 43:
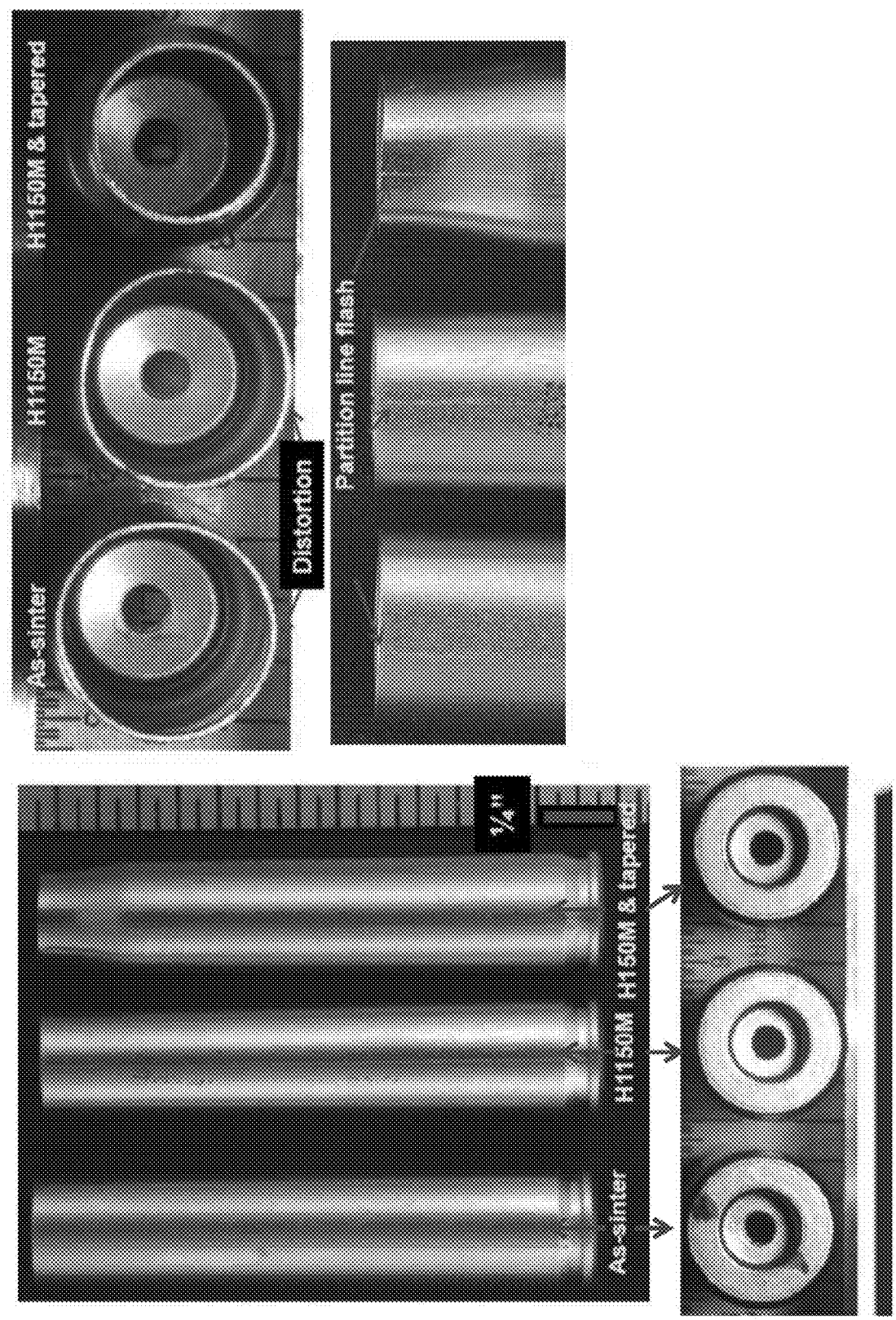
FIG. 43 shows the external dimensions of a MIM generated net-shape component subjected to a heat treatment.
Figure 45:
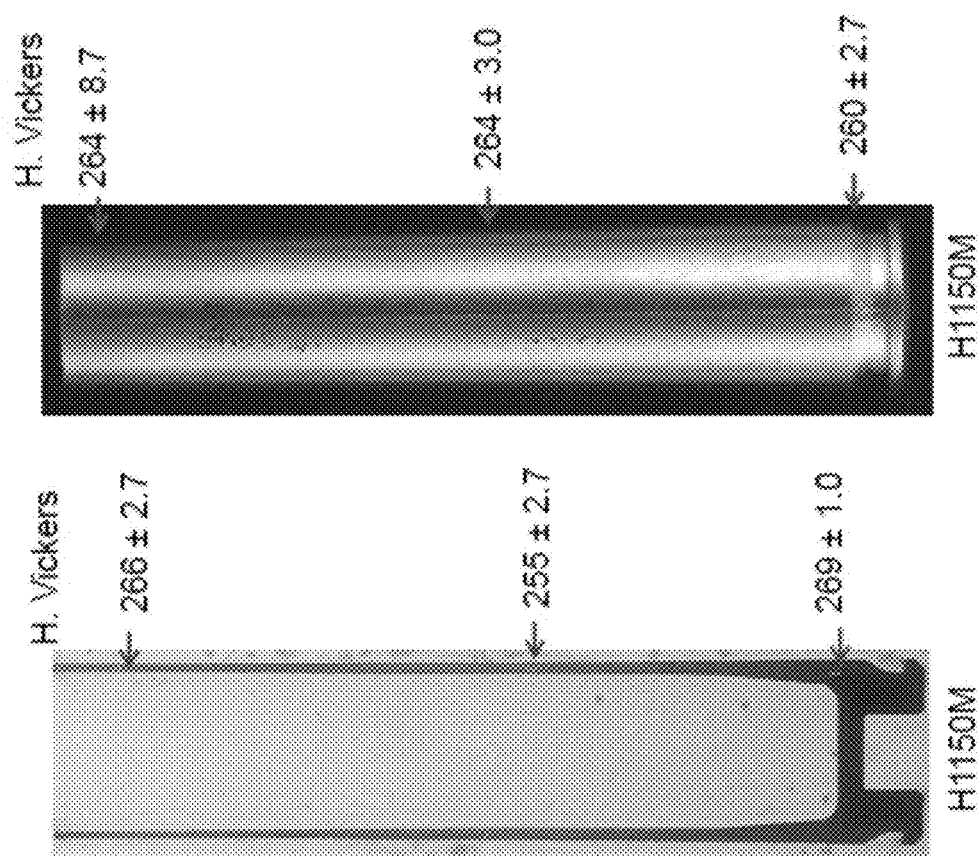
FIG. 45 shows the surface hardness as a result of a heat treatment.

FIGS. 43-51 show test results of a net-shape component and a case cartridge comprising 17-4 PH stainless steel formed by the MIM process 100 with a heat treatment condition. FIG. 43 shows the external dimensions of the MIM generated net-shape component. The grainy-like appearance from the as-sintered condition changed to a smoother surface after heat treatment and forming of the first and/or second taper. The mouth distortion of the as-sintered case remained after heat treatment, but it disappeared after the first and/or second taper was formed. The partition flash along the longitudinal axis still remained after heat treatment and after the first and second tapering. t. FIG. 44 shows the cross-sectional dimensions of two net-shape components (net-shape component 1 and net-shape component 2). The dimensional variations may be due to electrical discharge machining ("EDM") cutting errors. FIG. 45 shows the surface hardness as a result of the heat treatment. The surface hardness of the net-shape component head 12 is slightly higher than that of the body 14. The surface hardness of the net-shape component body 10 is uniform. The through wall thickness hardness of the net-shape component head 12 is comparable to that of its surface. The through thickness hardness of the net-shape component mouth 16 is slightly higher than that of the net-shape component body 14. The hardness of a net-shape component with a tapered mouth 16 was not measured but it is expected to increase due to cold working.

Figure 46:
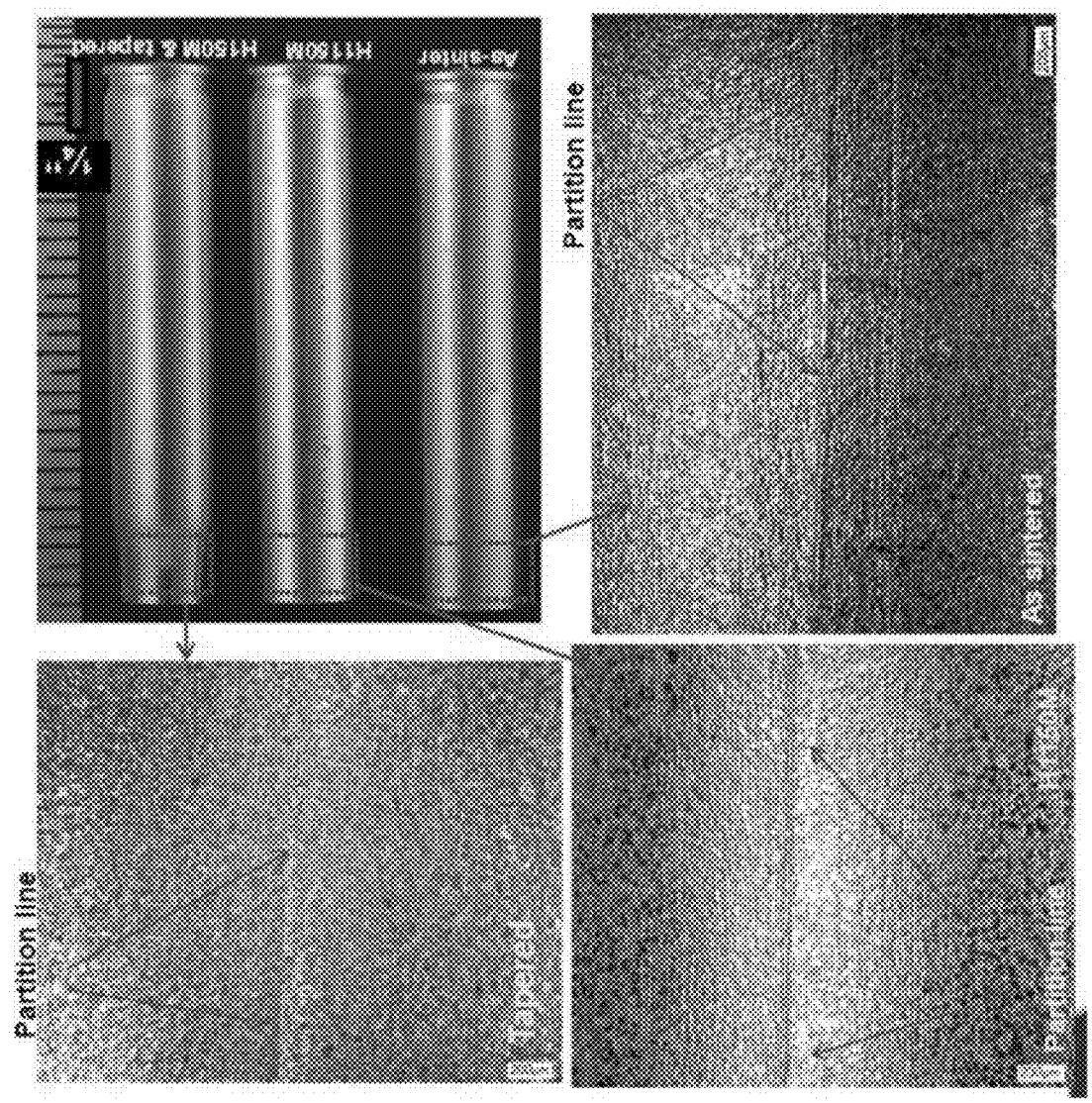
FIGS. 46-48 show the surface appearance of the net-shape component as-sintered, the net-shaped component after being conditioned, and the net-shaped component after being conditioned and after the taper is formed.
Figure 47:
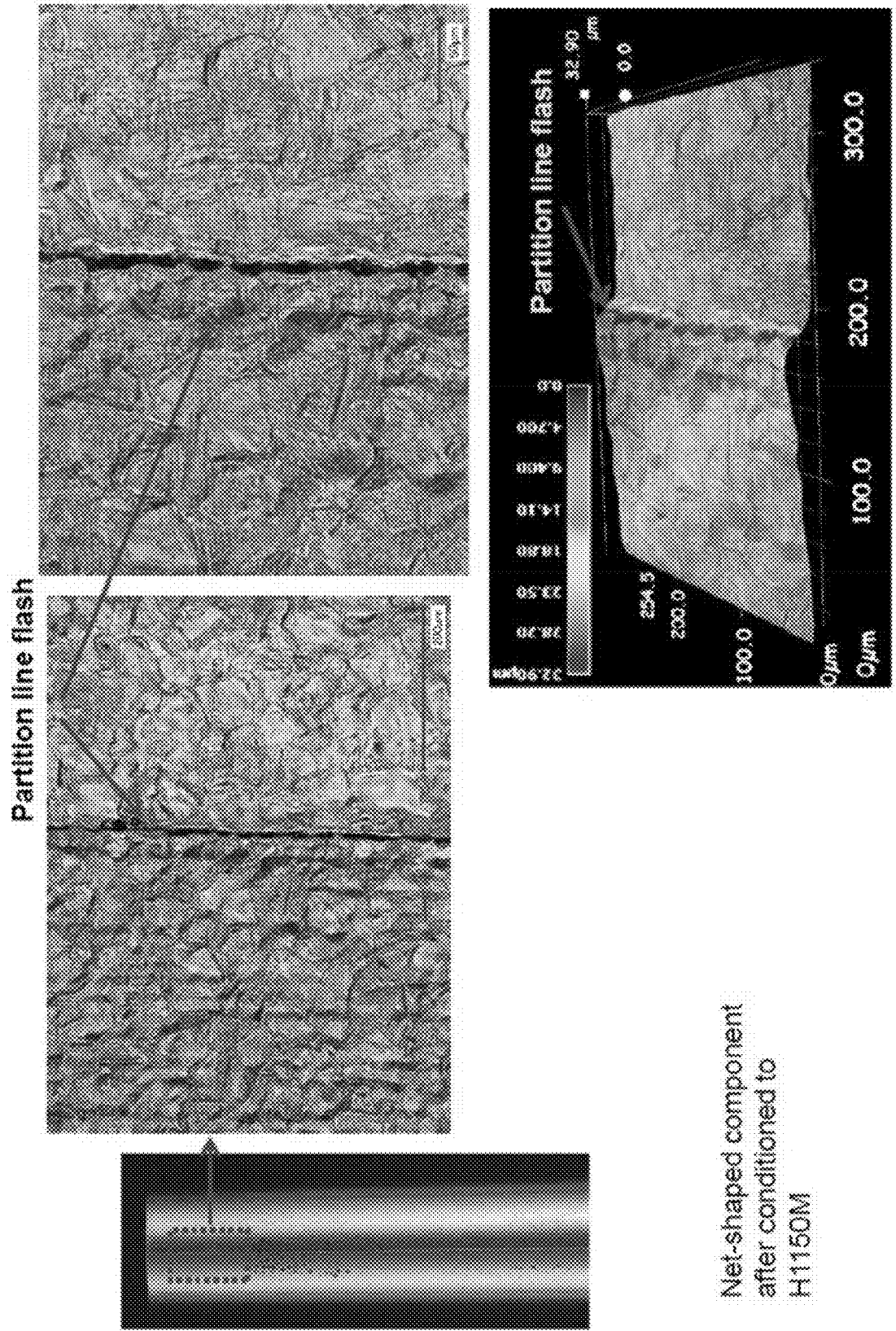
Figure 48:
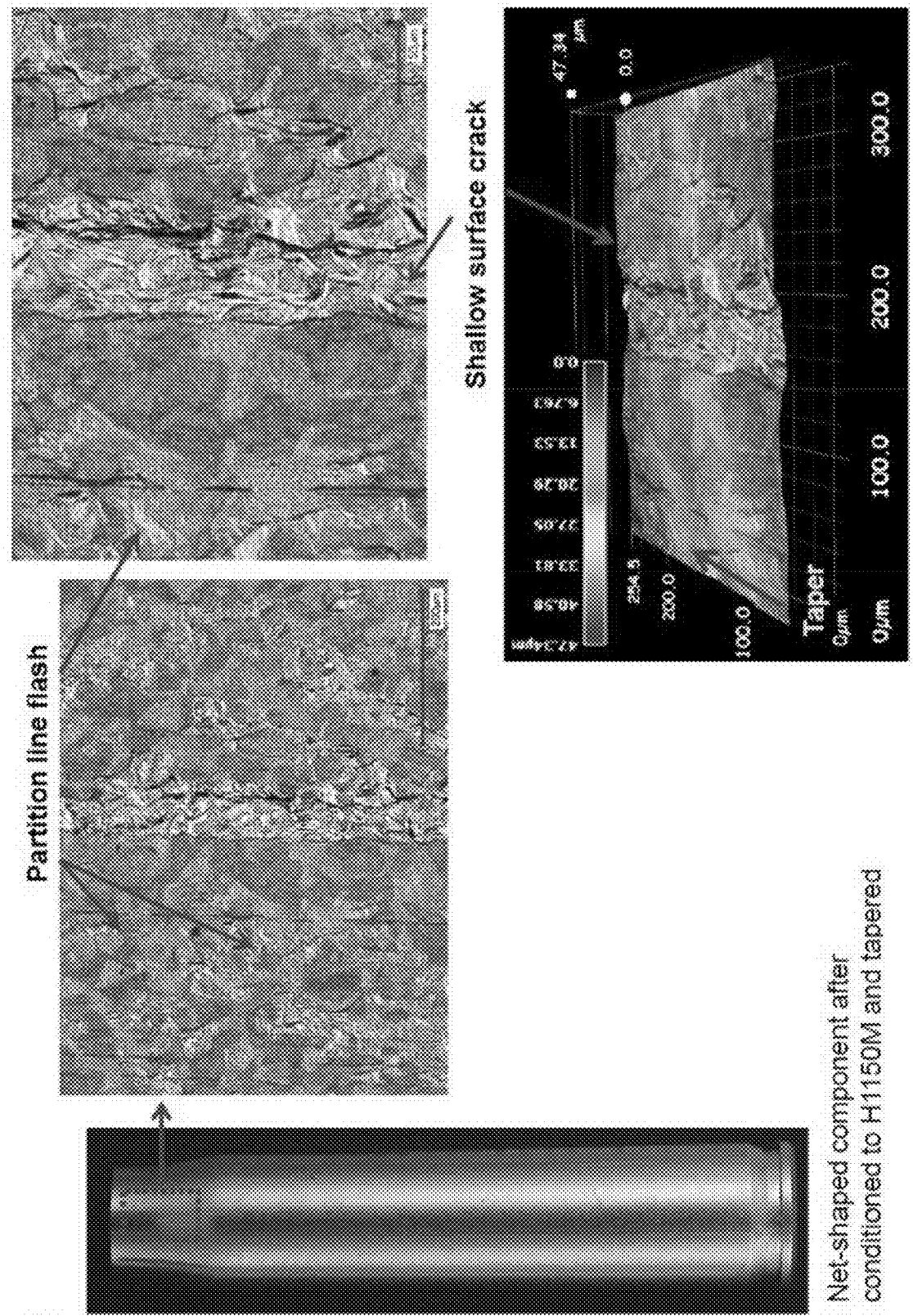

FIGS. 46-48 show the surface appearance of the net-shape component as-sintered, the net-shaped component after being conditioned, and the net-shaped component after being conditioned and after the taper is formed. Very well defined partition line flash was observed in both the net-shape component as-sintered and in the net-shaped component after being conditioned. A very fine band-like pattern along the axis of the tube was observed in all three. Grain elongation due to the cold forming induced by tapering occurred. No cracks were observed after the forming of the taper. The net-shaped component after conditioned exhibited a grainy-like appearance, equiaxed grain structure was observed at the surface, and no cracks were observed at the partition line flash or at adjacent regions. The partition line flash for the net-shaped component after being conditioned was approximately 20-30 µm tall. The net-shaped component after being conditioned and after the taper was formed exhibited a surface crack after the second taper was generated. The crack was observed adjacent to the partition line flash. The crack had depth of approximately 40-50 µm. The partition line flash was flattened by the forming of the second taper.

Figure 49:
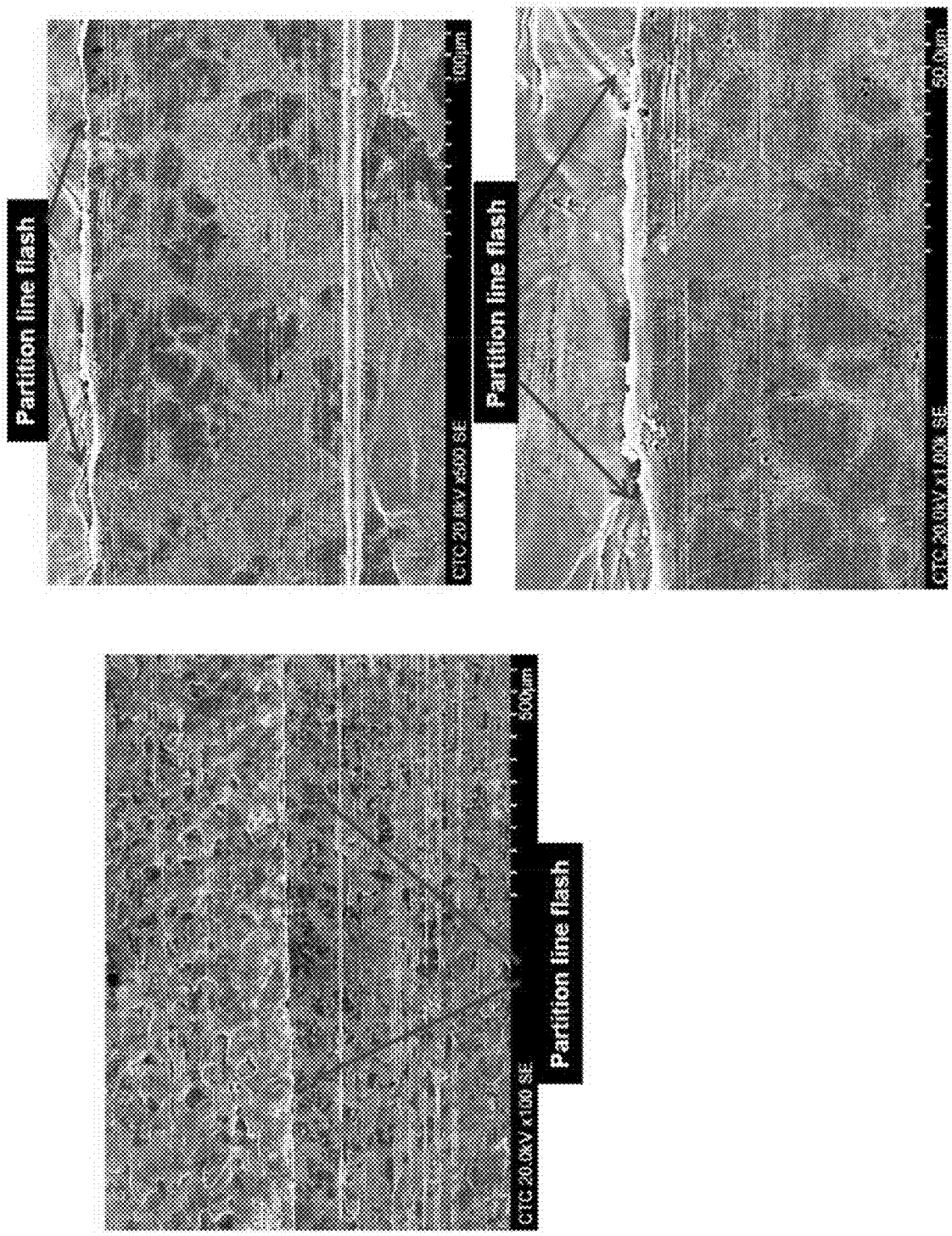
FIGS. 49-50 show SEM imagery of surface microstructure of the net-shape component after being conditioned, and the net-shaped component after being conditioned and tapered, respectively.
Figure 50:
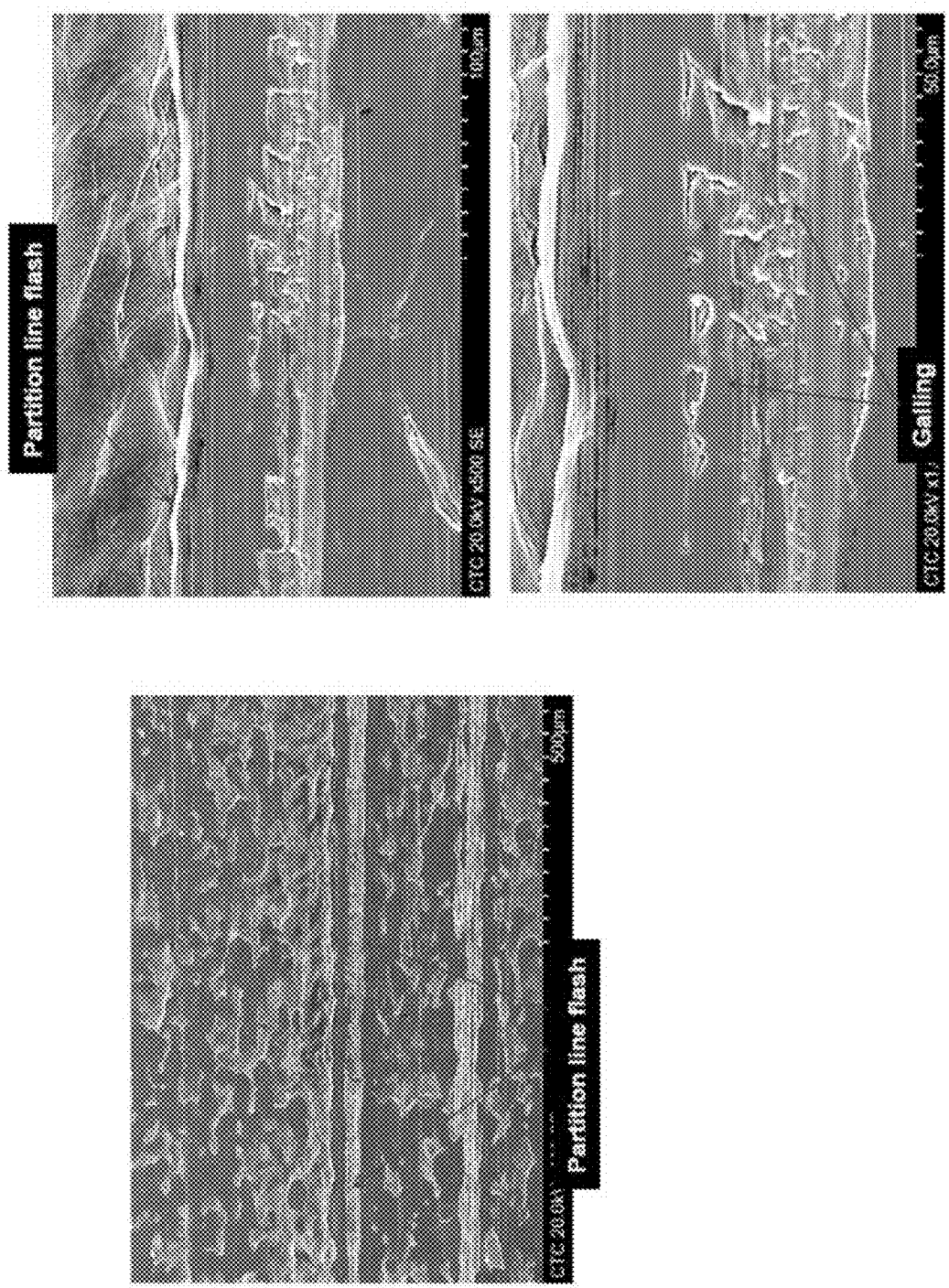

FIGS. 49-50 show SEM imagery of surface microstructure of the net-shape component at H1150M and the net-shaped component at H1150M and tapered, respectively. Referring to FIG. 49, the band-like appearance disappeared after heat treatment but shallow parallel gashes were observed. A thin and narrow mold partition line flash with wavy-like (sinusoidal) appearance was observed. Coarse Copper precipitation at the grain boundaries was not present. Equiaxed grains were observed. Referring to FIG. 50, grain deformation and smearing (galling) in the direction of taper forming occurred. Surface cracking adjacent to the partition line flash was not observed. Complete flattening of the partition line flash was also observed.

Figure 51:
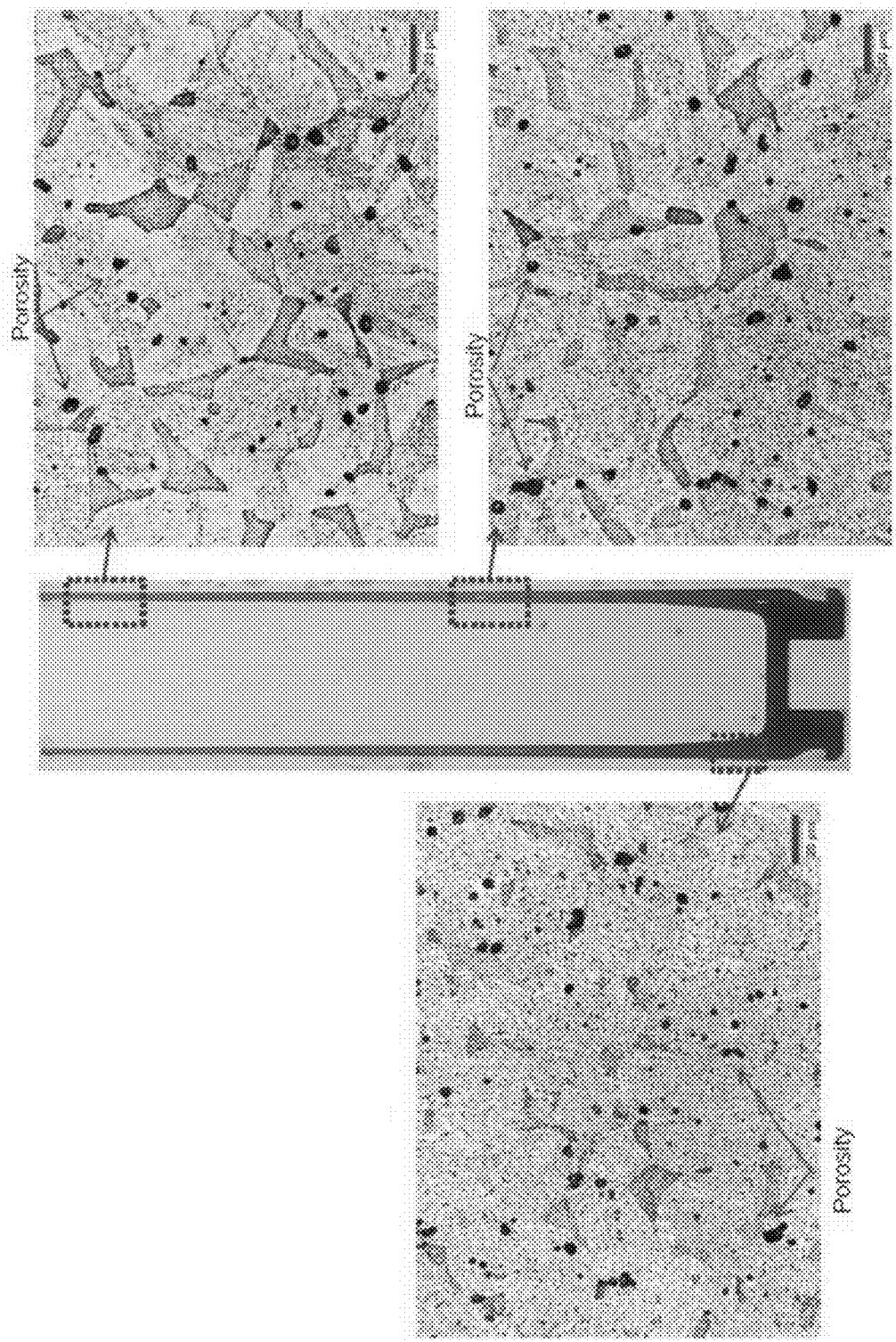
FIG. 51 shows light optical microstructure of the net-shaped component conditioned at H1150M.

FIG. 51 shows light optical microstructure of the net-shaped component after being conditioned, which demonstrates a uniform microstructure including equiaxed martensitic grains with extensive inter and intragranular copper precipitation. A relatively large amount of porosity was observed in all regions. The microstructure of all sections of the component show presence of some ferrite.

Figure 52:
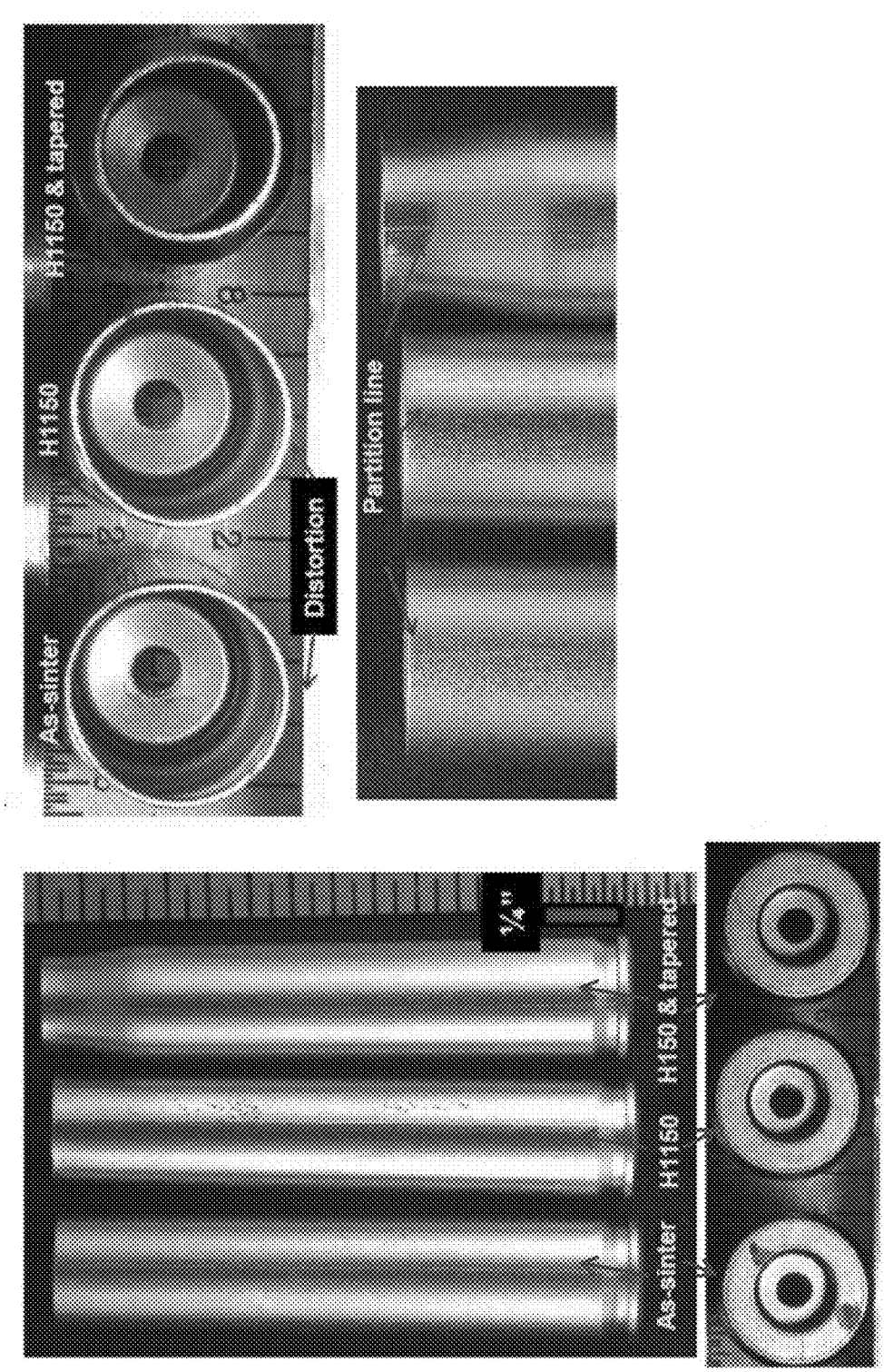
FIG. 52 shows the external dimensions of the MIM generated net-shape component subjected to a heat treatment.
Figure 53:
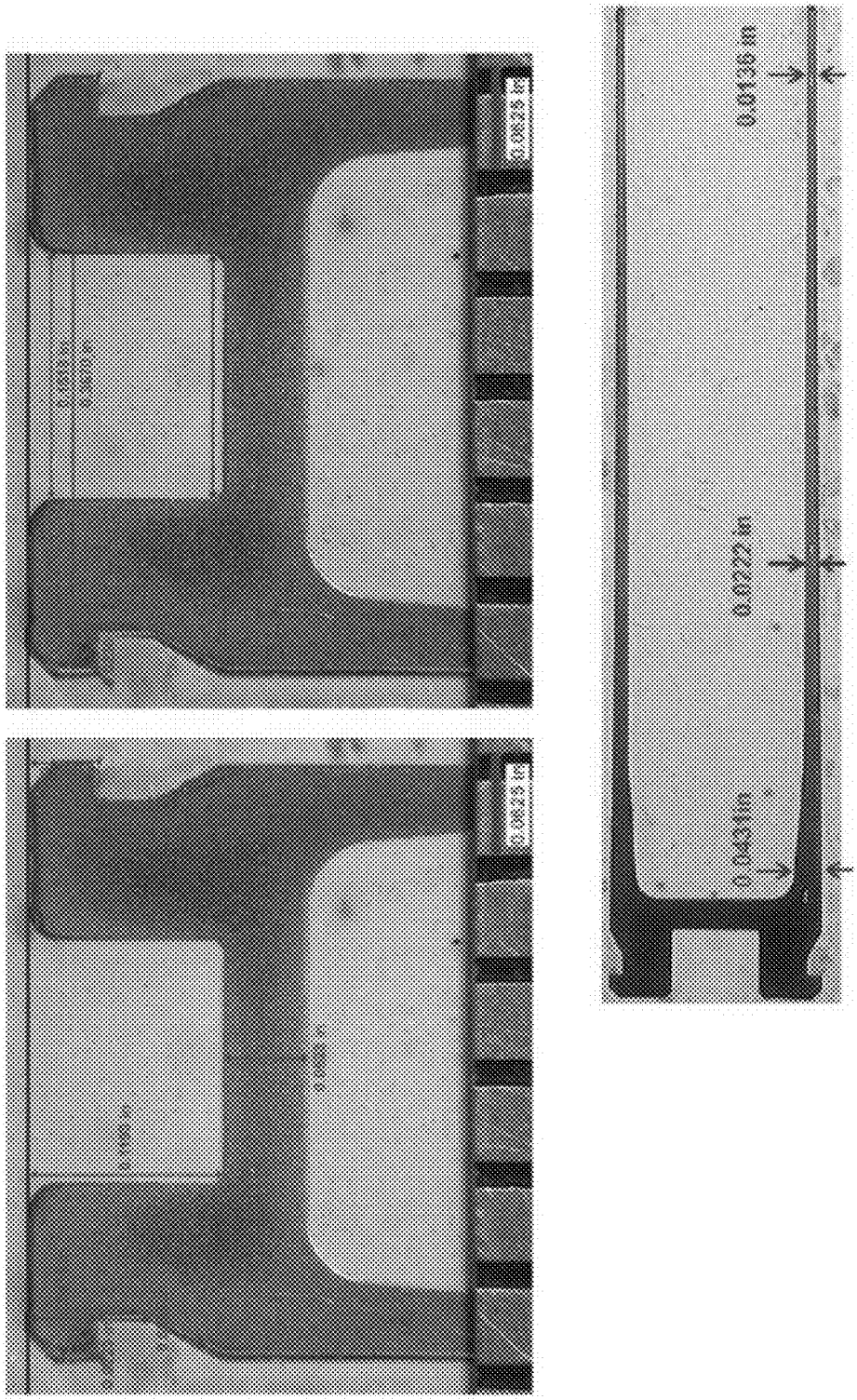
FIG. 53 shows the cross-sectional dimensions of two net-shape components subjected to a heat treatment.
Figure 54:
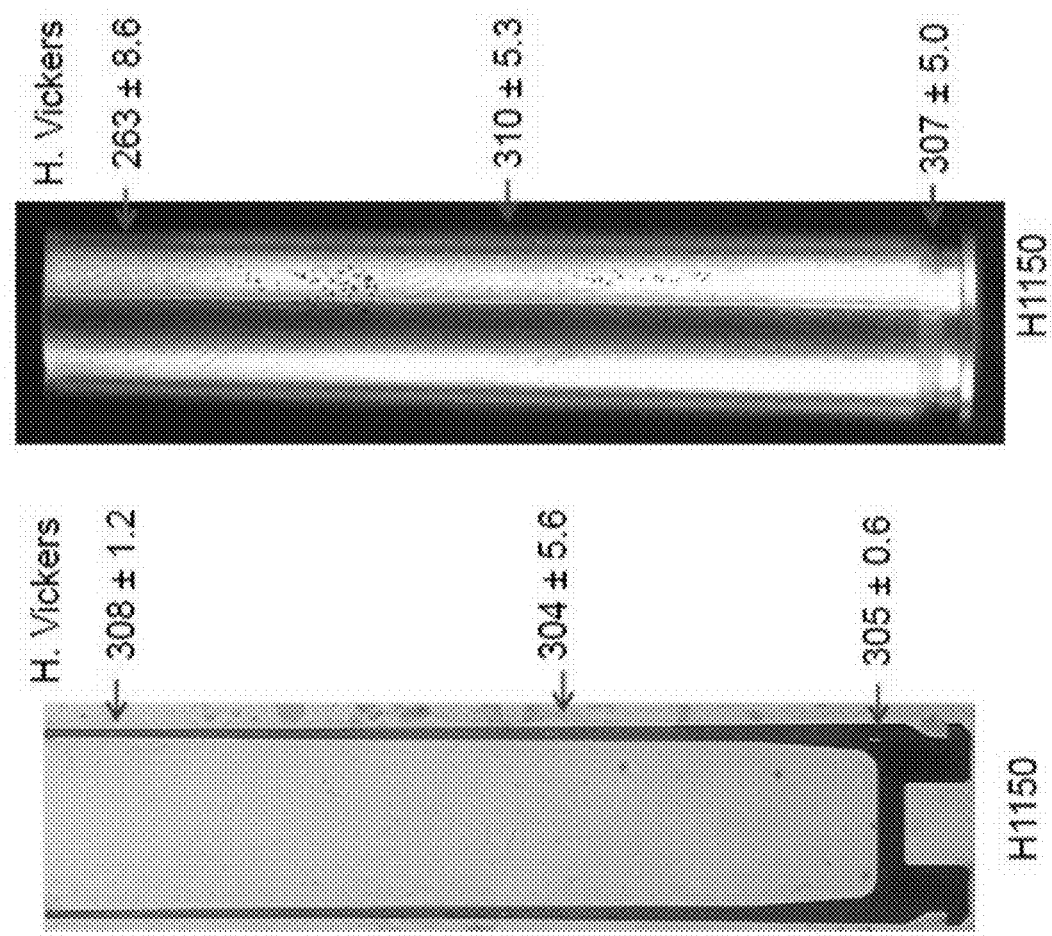
FIG. 54 shows the surface hardness as a result of a heat treatment.

FIGS. 52-57 show test results of a net-shape component and a case cartridge comprising stainless steel formed by the MIM process 100 with a heat treatment condition. FIG. 52 shows the external dimensions of the MIM generated net-shape component. The grainy-like appearance from the as-sintered condition changed to a smoother surface after heat treatment and forming of the first and/or second taper. The mouth OD distortion of the as-sintered case remained after heat treatment, but it disappeared after the first and/or second taper was formed. The partition flash along the longitudinal axis still remained after heat treatment and after the first and second tapering. FIG. 53 shows the cross-sectional dimensions of two net-shape components (net-shape component 1 and net-shape component 2). The dimensional variations may be due to electrical discharge machining ("EDM") cutting errors. Heat treatment did not cause distortion or dimensional changes. FIG. 54 shows the surface hardness as a result of the heat treatment. The surface hardness of the net-shape component neck 30 is lower than that of the body 14 and the head 12. The surface hardness of the net-shape component body 10 is comparable to that of the head 12. The through wall thickness hardness of the net-shape component head 12 is uniform from the head 12 to the neck 30. The hardness of a net-shape component with a tapered mouth 16 was not measured but it is expected to increase due to cold working. Surface appearance stereoscopic analysis of the net-shape component after being conditioned was not conducted but it is expected to show similar to that of the net-shape components that were heat treated.

FIGS. 55-56 show SEM imagery of surface microstructure of the net-shape component after being conditioned and tapered, respectively. Referring to FIG. 55, the band-like appearance disappeared after heat treatment. A thin and narrow mold partition flash line with wavy-like (sinusoidal) appearance was observed. Coarse Copper precipitation at the grain boundaries was not present. Equiaxed grains were observed. Referring to FIG. 56, extensive grain deformation (flattening) and smearing (galling) of the partition line flash occurred during tapering. Grain deformation and smearing in the direction of the taper forming was observed. Surface cracking adjacent to the partition line flash was not observed.

Figure 57:
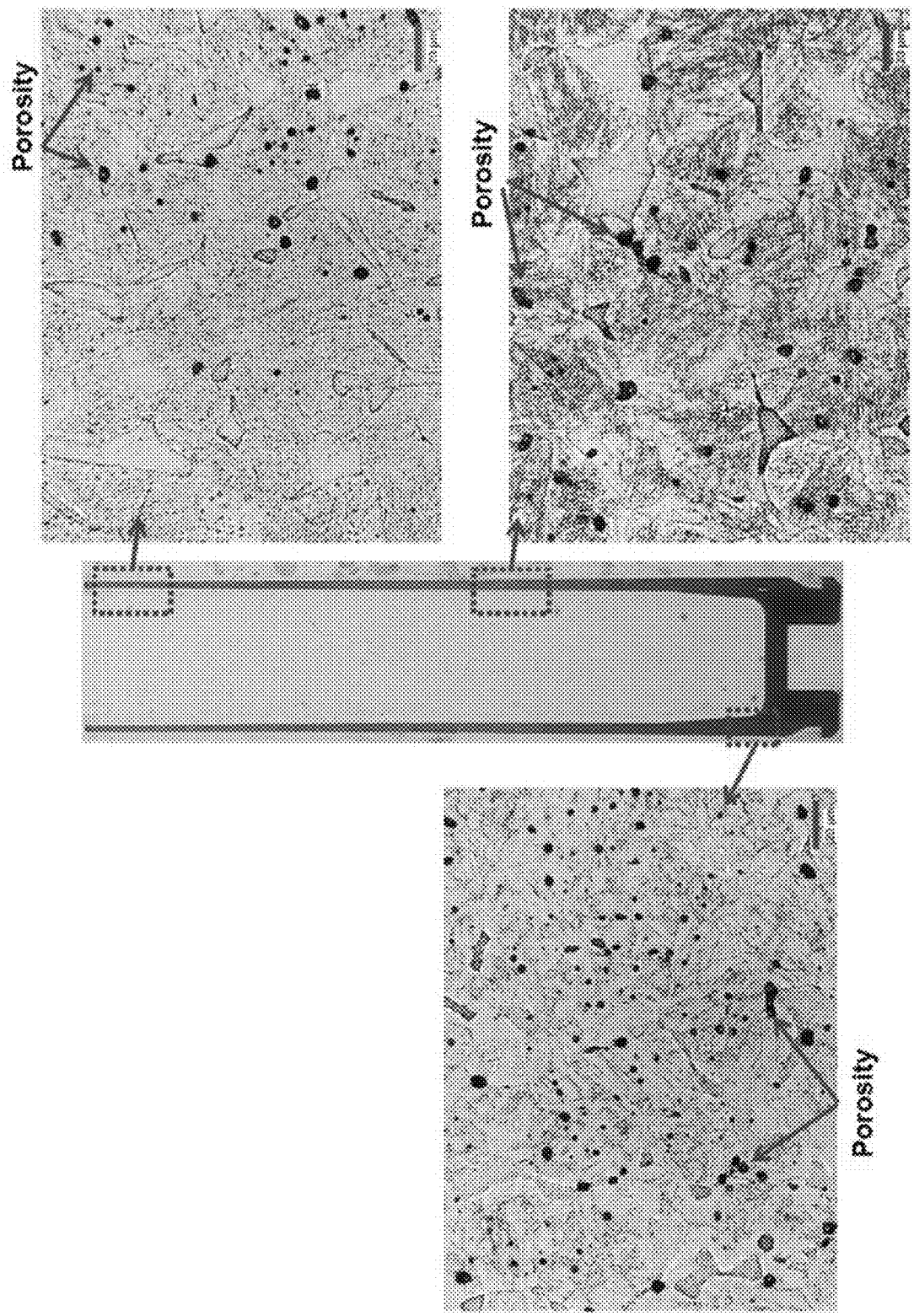
FIG. 57 shows light optical microstructure of the net-shaped component after being conditioned.

FIG. 57 shows light optical microstructure of the net-shaped component conditioned at H1150, which demonstrates a uniform microstructure including equiaxed martensitic grains with extensive inter and intragranular copper precipitation. A relatively large amount of porosity was observed in all regions. The microstructure of all sections of the component show presence of some ferrite.

All net-shape component and cartridge cases 10 examined were sound and free of visual defects. Also, in all cases a minor distortion of the mouth 16 was present. However, distortion of the mouth 16 was eliminated during tapering. The case 10 dimensions were close to what was expected. Stereoscopic microscopy of the cartridge case 10 surface shows a grainy-like appearance forming fine parallel bands in the longitudinal axis of case 10. The inspection also shows a partition line flash in the longitudinal direction. This flash was produced by the narrow gap between the mating of the molding dies. Surface cracks parallel to the longitudinal axis were formed during the tapering process, and these cracks were observed adjacent to the partition line flash. These cracks were only observed in the as-sintered and certain heat treated condition cases 10. The flash line may be responsible for uneven shear stresses, which may have led to the crack formation. During tapering, the flash was flattened and galling occurred.

Cold forming of the taper on cases 10 that were heat treated conditions did not cause cracking but galling at the flash line and at adjacent regions was observed. The microstructure of the as-sintered and heat treated MIM stainless steel cases 10 consists of martensite and copper precipitates. The copper precipitates are coarser in the as-sintered material and are very fine in the heat treated alloy. Some ferrite is possibly found to be present in all as-sintered and heat treated alloy cases; however, X-ray diffraction may be necessary to ascertain its presence in the MIM alloy. A relative increase in density (3-5%) with respect to the as-sintered condition was observed with the various heat treatments used. Table I shows the hardness for all as-sintered and heat treated MIM cases 10. As expected, the H900 condition was the hardest and was comparable to that of the wrought alloy. The as-sintered is similar to the H1150 condition. The H1150 M had the lower hardness.

| Heat Treatment Condition | Head Through Thickness | Head Surface | Central Body Through Thickness | Central Body Surface | Neck Through Thickness | Neck Surface | Neck Taper(*) Surface | Wrought |
|---|---|---|---|---|---|---|---|---|
| As Sintered | 307 (31 Rc) | 307 (31 Rc) | 295 (26 Rc) | 295 (26 Rc) | 305 (30 Rc) | 295 (26 Rc) | 346 (35 Rc) | — |
| H900 | 409 (42 Rc) | 414 (42 Rc) | 436 (44 Rc) | 385 (39 Rc) | 442 (45 Rc) | 386 (39 Rc) | | 45 Rc |
| H1150 | 305 (30 Rc) | 307 (31 Rc) | 304 (30 Rc) | 310 (31 Rc) | 308 (31 Rc) | 263 (25 Rc) | | 35 Rc |
| H1150M | 269 (25 Rc) | 260 (24 Rc) | 255 (23 Rc) | 264 (25 Rc) | 266 (25 Rc) | 264 (25 Rc) | | 33 Rc |

(*)Increase in hardness due to cold work of the neck taper of the case.

Figure 58A:
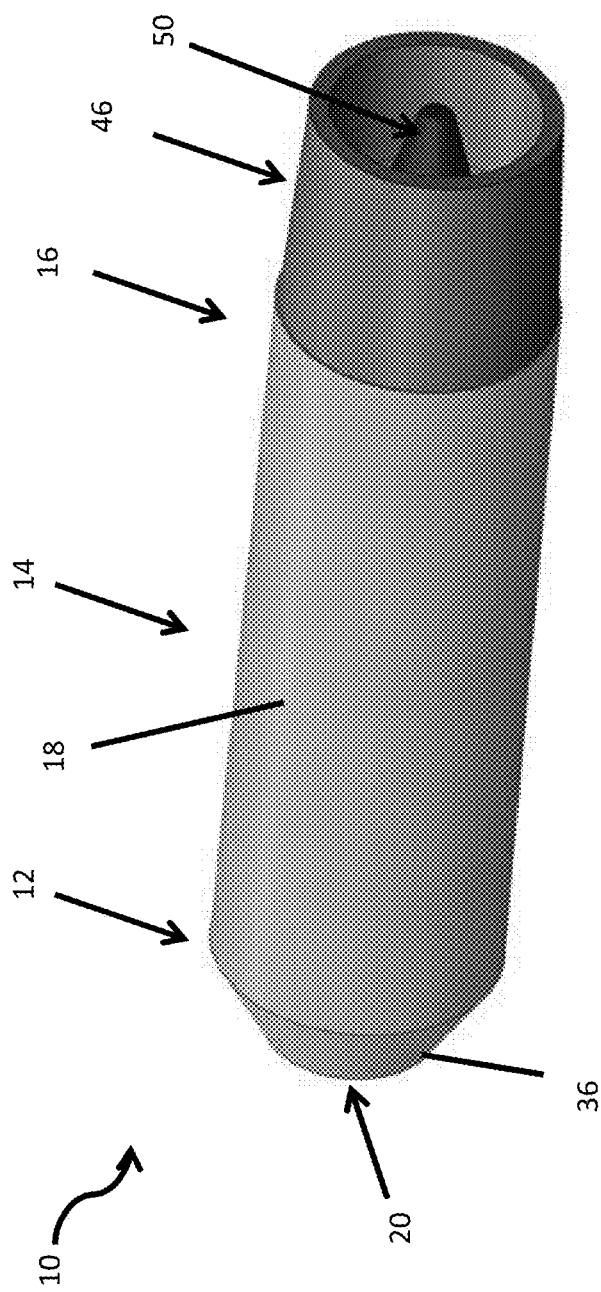
Figure 58B:
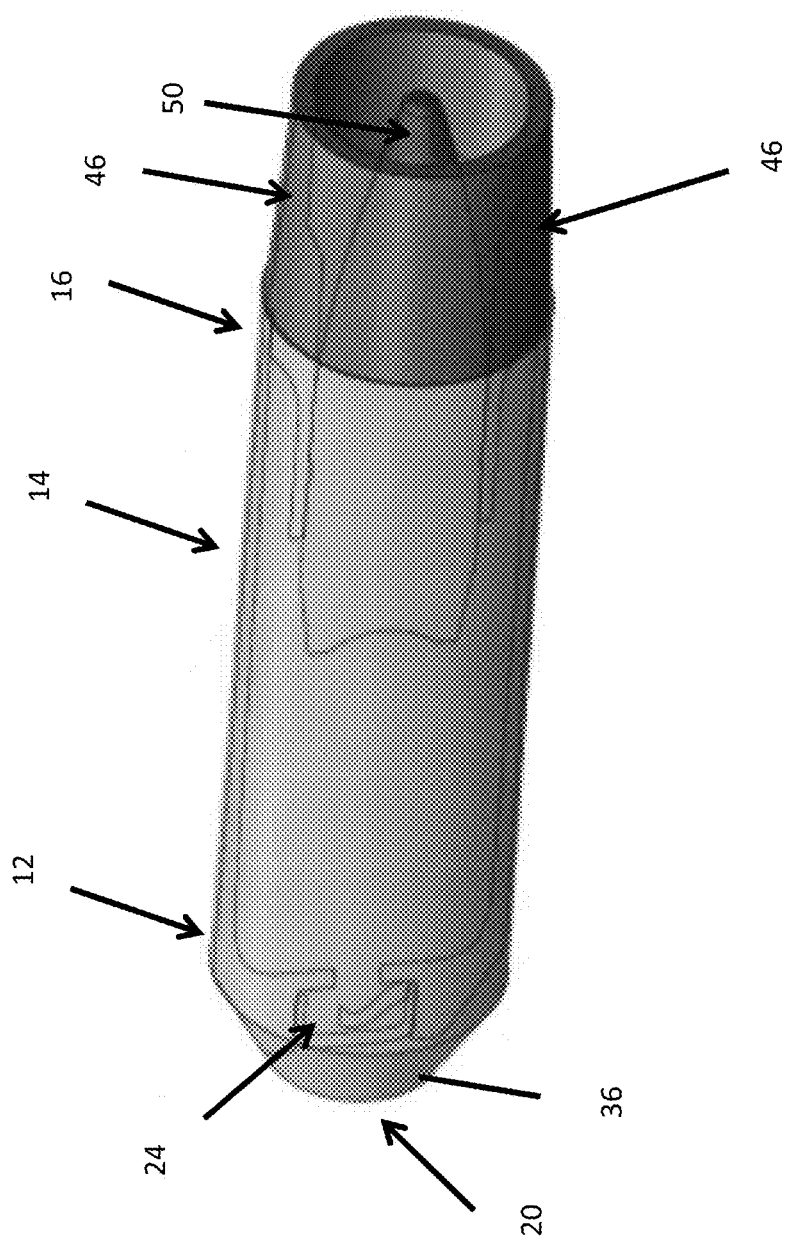
Figures 59A, 59B:
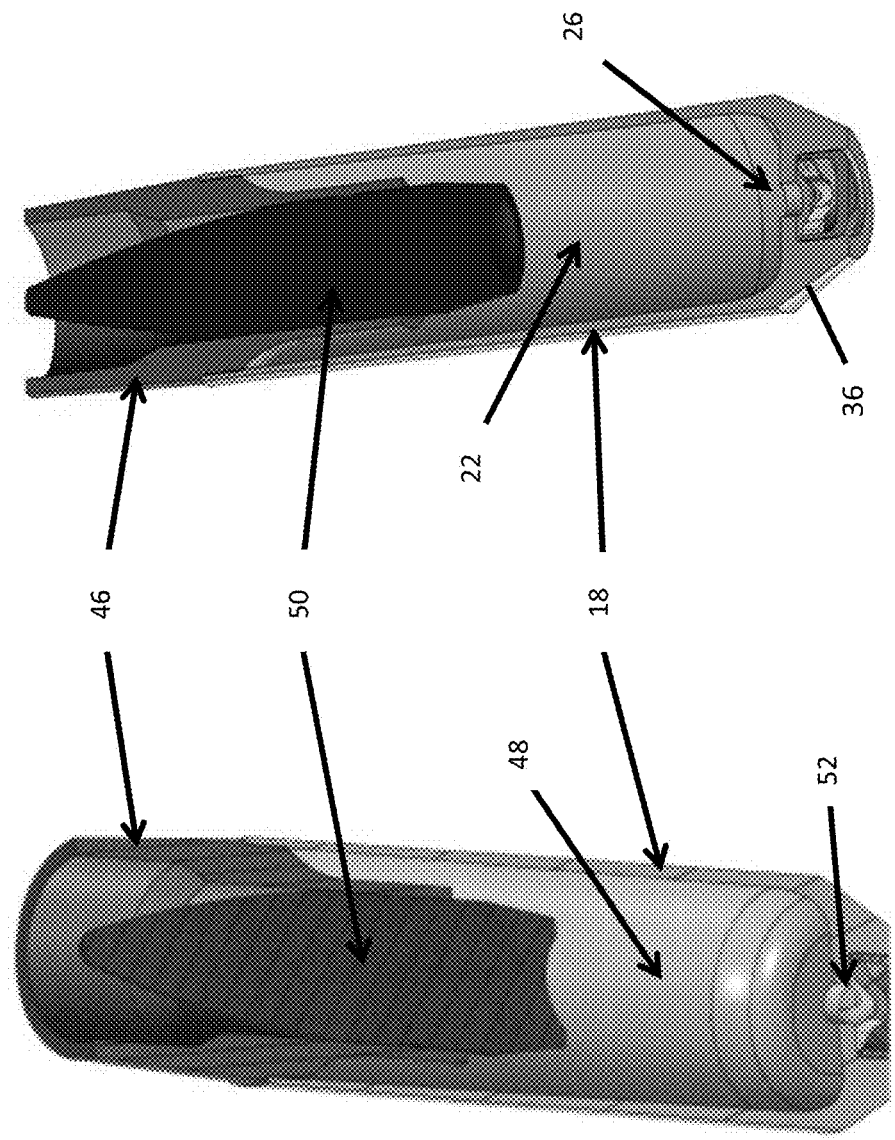
Figure 60:
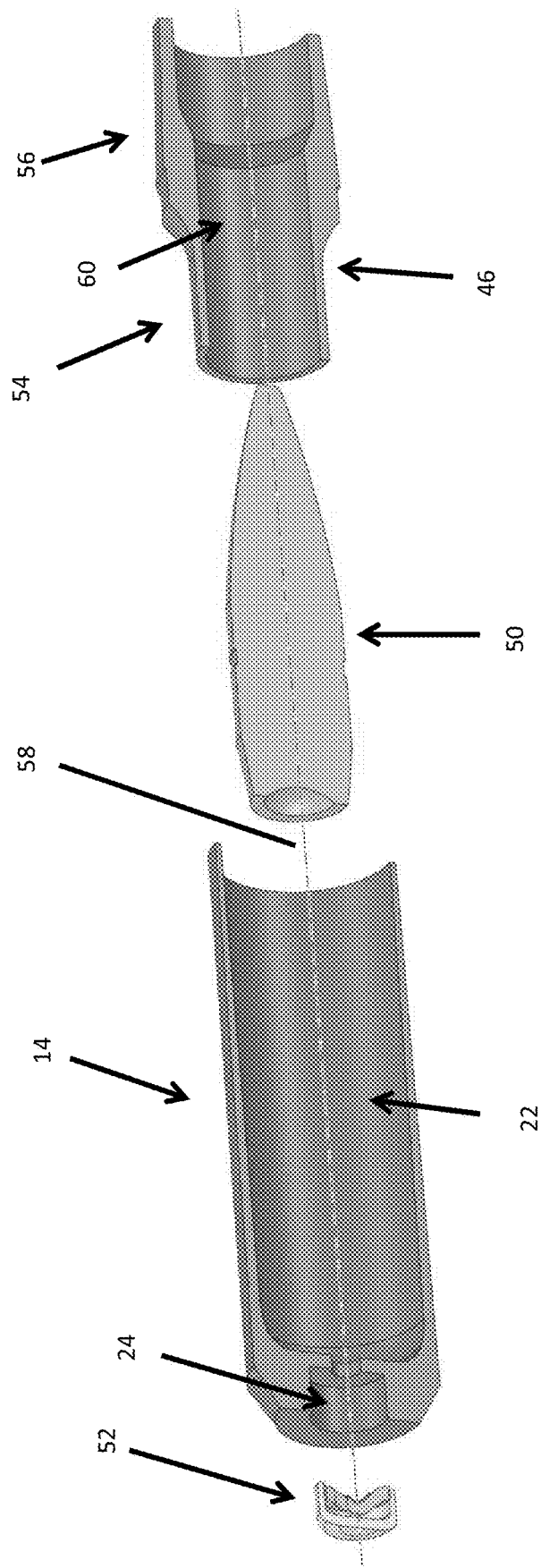
FIG. 60 shows an exploded cross-sectional view of an exemplary CT cartridge case.

Referring to FIGS. 58-60, embodiments of a CT cartridge case 10 are disclosed. The CT cartridge case 10 can consists essentially of or consists of a powdered metal and/or a powdered metal alloy(s) 110 that has been formed into the cartridge case 10 through an injection mold processing. Methods for forming the CT cartridge case 10 can involve any of the MIM processing methods described herein. Further embodiments can include use of Finite Element Method ("FEM") analytics (which may be done through FEM software) or other forms of analytics to take into account desired material and mechanical characteristics and other parameters. This may assist in enabling the CT cartridge case 10 to be made in the MIM process 100 and to function properly during subsequent use as ammunition in a weapon. Further embodiments can include use of the FEM analytics or other analytics techniques to provide inputs that may be used during the MIM process 100.

The CT cartridge case 10 can include a hollow elongated member with a first end and a second end. In some embodiments, the cartridge case 10 can be segmented into three portions, which may be a head 12 at the first distal end, a mouth 16 at the second distal end, and a body 14 lying between the head 12 and the mouth 16. The body 14 can further include sidewalls 18 conjoined with a base 20 to form a hollow cavity 22. The hollow cavity 22 may be used to contain a propellant 48, a projectile 50, and/or an end cap 46 when using the CT cartridge case 10 as ammunition. The body 14 can have a general cylindrical structure so as to facilitate insertion of the CT cartridge case 10 into a chamber and/or bore of a weapon. The base 20 can further include a primer pocket 24 configured to receive and retain a primer 52. The primer pocket 24 can include a vent 26 to provide a means for heat exchange (e.g., spark of flame) between the primer 52 and the propellant 48 located in the hollow cavity 22 and to ignite the propellant 48. In some embodiments, the vent 26 can be an aperture formed within the primer pocket 24 that extends from the primer pocket 24 to the hollow cavity 22. The sidewalls 18 can have a thickness. Any portion of the sidewalls 18 can be structured to be thicker and/or stronger at and/or near the head 12 of the cartridge case 10. In some embodiments, the thickness and/or strength of at least a portion of the sidewalls 18 can change gradually from the mouth 16 to the head 12. In other embodiments, the thickness and/or strength of any portion of the sidewalls 18 can change gradually from any portion of the sidewalls 18 to the head 12. For example, a portion of the sidewalls 18 near the head 12 can be made to be progressively thicker and/or stronger as it leads into the head 12.

With a CT cartridge case 10, the head 12 can include a beveled edge 36 at or near its base 20. This can include the base 20 being formed into a frustoconical shape. Generally, CT case cartridges do not need a rim and/or an extractor groove. Thus, some embodiments of the CT cartridge 10 can be made without a rim and/or an extractor groove. However, a rim and/or extractor groove can be formed into the case 10 if desired.

With a CT cartridge case 10, the mouth 16 can be configured to receive and retain the end cap 46 and/or the projectile 50 (both axially and concentrically), but this is not required. For example, the projectile 50 can be inserted into the cavity 22 through the mouth 16. The end cap 46 may then be inserted into the cavity 22 through the mouth 16 and slid over the projectile 50 to seat the projectile 50 within the cavity 22. The mouth 16 may be ductile enough to facilitate press fitting the end cap 46 into the mouth 16 by crimping the mouth 16 onto the end cap 46 after the end cap 46 is inserted into the mouth 16. The end cap 46 can be configured to retain the projectile 50 within the body 14 of the CT cartridge case 10 and/or form a seal between the cavity 22 and the outside environment of the cartridge case 10. The mouth 16 and/or end cap 46 may be further configured so that the press fit forms a seal during firing (obturation). The mouth 16 can also be structured to rebound for ejection purposes.

The end cap 46 can include a hollowed structure configured to slidably insert into at least a portion of the cavity 22. For example, the end cap 46 can be configured to slidably insert into the mouth 16 of the CT cartridge case 10 for a friction fit. In some embodiments, the end cap 46 can include an elongated member with a first end 54, a second end 56, and a longitudinally formed hollow 60. The first end 54 can have an outer diameter that is less than an outer diameter of the second end 56. The first end 54 may be configured to slidably insert into the mouth 16 of the CT cartridge case 10. The second end 46 may be configured to abut against a distal end of the mouth 16. This may prevent the end cap 46 from sliding all the way into the cavity 22 of the CT cartridge case 10 due to a mechanical fit. For example, at least a portion of the end cap 46 first end 54 can include an outer diameter that is slightly less than that of the CT cartridge case 10 at/or near the mouth 16. At least a portion of the end cap 46 second end 56 can include an outer diameter that is the same or slightly larger than that of the CT cartridge case at/or near the mouth 16. Inserting the end cap 46 by advancing the first end 54 through the mouth 16 first can allow the end cap 46 to be inserted, at least partially, into the cavity 22 so that the second end 56 abuts the distal end of the mouth 16 and prevents any further movement of the end cap 46 into the cavity 22. The use of an adhesive can be utilized.

The configuration of the outer surface of the end cap 46 can be sized and shaped to complement the chamber and/or barrel of a weapon. The configuration of the inner surface of the end cap 46 can be sized and shaped to facilitate movement of the projectile 50 in the longitudinal direction 58 through the hollow 60 when the projectile 50 is being seated within the CT cartridge case 10 and/or when the projectile 50 is being expelled from the CT cartridge case 10. The end cap 46, however, can facilitate retaining the projectile 50 in a seated position after it has been seated and before being expelled. The end cap 46 can also facilitate forming a seal between itself and the at least a portion of the projectile 50. For example, at least a portion of the inner surface of the end cap 46 can be configured to complement a shape of at least a portion of the outer surface of the projectile 50. In addition, or in the alternative, at least a portion of the inner surface of the end cap 46 can be configured to adhere to at least a portion of the outer surface of the projectile 50. The end cap 46 can also facilitate forming a seal between itself and at least a portion of the mouth 16. For example, at least a portion of the outer surface of the end cap 46 can be configured to complement a shape of at least a portion of the inner surface of the body 14 at or near the mouth 16.

The CT cartridge case 10 and/or the end cap 46 can be configured such that the projectile 50 is completely enveloped by the cartridge case 10 and the end cap 46 when the projectile 50 is seated in the CT cartridge case 10. This can include no portion of the projectile 50 extending beyond a distal end of the end cap 46 second end 56. In some embodiments, the CT cartridge case 10 and/or the end cap 46 can be configured such that the projectile 50 is partially enveloped by the cartridge case 10 and the end cap 46 when the projectile 50 is seated in the CT cartridge case 10. This can include at least a portion of the projectile 50 extending beyond a distal end of the end cap 46 second end 56. In some embodiments, the projectile 50 can be seated within the cavity 22 such that it is completely or partially enveloped by the propellant 48.

The end cap 46 can comprise polymer, powdered metal, and/or powdered metal alloy(s). If the end cap 46 is made from polymer, a plastic injection molding process can be used. If the end cap 46 is made from powdered metal and/or powdered metal alloy(s), any of the MIM processes disclosed herein can be used. This can include use of any of the analytical techniques disclosed herein.

In some embodiments, the MIM process can be used to make the CT cartridge case body 14. Either the MIM or plastic injection molding can be used to make the end cap 46. Using the MIM process for the CT cartridge case body 14 and the MIM or plastic injection molding for the end cap 46 can facilitate making the CT cartridge case 10 with only two parts. For example, the MIM process can be used to produce the body 14 having predetermined dimensions where the propellant 48 will be retained. The end cap 46 can then be produced using MIM or plastic injection molding. The end cap 46 can then be integrated with the projectile 50 and assimilated with the body 14 to produce the final part. Conventional methods, however, requires forming three separate parts when forming the CT cartridge case.

Any of the MIM processing techniques, including any of the analytical techniques, described herein can be used to generate a CT cartridge case 10. The MIM process 100 can significantly reduce the number of process steps and streamline the process used to produce cartridge cases 10, thus for reducing the total cost of ownership (TCO) for ammunition producers. For example, a traditional CT cartridge case production method includes at least the steps of: 1) forming a cup; 2) generating an initial draw from the cup; 3) generating a final draw from the cup; 4) forming a header; 5) turning the head; 6) piercing the base; 7) producing the end cap; 8) producing the primer, the propellant, and the projectile, and 9) assembling the case, the propellant, the projectile, the primer, and the end cap. This can be a complex forming process with multiple inspection points that requires high capital equipment and high personnel costs. Traditional cartridge case production methods can further result in relatively low piece-part price, a complex acquisition process for production, and/or a high total ownership cost (e.g., combined facility, personnel, equipment, inspection, piece part, etc.). Furthermore, end cap production via conventional methods is limited to plastic injection molding. With conventional methods, the body 14 can also be produced using plastic injection molding (which may lead to less required manufacturing steps), but the plastic body cannot meet all requirements (e.g., cannot meet environmental and performance specifications). A body produced by plastic injection molding may be producible, but it lacks in meeting all requirements, therefore is a subpar solution.

Conversely, the inventive method can use a MIM process 100 for a CT cartridge case 10 that may include as little as four steps: 1) metal injection molding a part to form the body 14; 2) producing or providing the end cap 46; 3) producing or providing the primer 52, the propellant 48, and the projectile 50, and 4) assembling the body 14, the propellant 48, the projectile 50, the primer 52, and the end cap 46. With the inventive method, the end cap 46 can be produced using plastic injection molding and/or MIM. As contrasted with traditional CT cartridge case production methods, the inventive method can be a simpler process that involves less inspection points, low capital equipment costs, higher piece-part price, simpler acquisition processes for production, and/or lower total ownership costs. Utilizing MIM for a CT cartridge case 10 allows the environmental and performance requirements to be met due to metals being more robust than plastics/polymers.

In an exemplary embodiment, a CT cartridge case 10 can include a body 14 with a head 12 at a first distal end and a mouth 16 at a second distal end, wherein the cartridge case 10 consists essentially of powdered metal and/or powdered metal alloy(s) 110 that has been formed into the cartridge case 10 through an injection mold processing. In some embodiments, the cartridge case 10 consists of powdered metal and/or powdered metal alloy(s) 110 that has been formed into the cartridge case 10 through an injection mold processing.

A method for producing a CT cartridge case 10 can include generating a part by subjecting a MIM material 140 to MIM processing 150. This can generate a cartridge case 10 as an elongated member with a head 12 at its first end, a mouth 16 at its second end, and a body 14 lying between the head 12 and the mouth 16. The body 14 could include sidewalls 18 conjoined with a base 20 to form a hollow cavity 22 to contain propellant 48, a projectile 50, and/or a primer 52. The base 20 could further include a primer pocket 24 structured to receive and retain the primer 52. The primer pocket 24 could further include a vent 26 formed within the primer pocket 24 that may extend from the primer pocket 24 to the hollow cavity 22. The head 12 could further include the base 20. In some embodiments, the base 20 can include a frustoconical shape. The mouth 16 could further be configured to receive and retain the end cap 46 and/or projectile 50.

The method can further include generating a part by subjecting a MIM material 140 to MIM processing 150 to form the end cap 46. This can generate an end cap 46 as an elongated member with a first end 54, a second end 56, and a longitudinally formed hollow 60. The first end 54 can have an outer diameter that is less than an outer diameter of the second end 56. The first end 54 may be configured to slidably insert into the mouth 16 of the CT cartridge case 10. The second end 46 may be configured to abut against a distal end of the mouth 16.

Alternatively, or in addition, a method for producing the CT cartridge case 10 and/or the end cap 46 can include using FEM analysis or other analytical techniques to generate variables representing factors and characteristics associated with enabling the CT cartridge case 10 and/or end cap 46 to be made via a MIM processes 100 and to enable an MIM generated cartridge case 10 and/or end cap 46 to function properly during subsequent use as ammunition in a weapon. The method can include generating operating parameters based on the variables to control the MIM design 100. Mixing or kneading 120 powdered metal and/or powdered metal alloy(s) 110 with a binder material 130 can be done to form a MIM material 140. Metal Injection Molding 150 can be performed on the MIM material 140 to generate the MIM CT cartridge case 10 and/or end cap 46. The Metal Injection Molding 150 can include at least partially melting the binder material 130 to form a semisolid metal-binder slurry, injecting the semisolid metal-binder slurry into a die cavity to form a green preform, thermally debinding 160 and/or chemically debinding 160 the green preform to generate a net-shape component, and sintering 170 the net-shape component for densification and to generate the MIM part (CT cartridge case 10 and/or end cap 46).

The MIM produced CT cartridge case 10 and/or end cap 46 can be conditioned using a heat treatment and/or other metal working or can be used in the as sintered state. This can include solution treatment, annealing, tempering, hardening, strengthening, etc. This may be done to improve performance of the CT case cartridge 10 and/or end cap 46.

The method can further include providing or producing a primer 52, propellant 48, and/or a projectile 50. The primer 52, propellant 48, and/o projectile 50 can be made via conventional methods. After the body 14, the end cap 46, the primer 52, propellant 48, and the projectile 50 are generated, the various components can be assembled to form the ammunition. This can include inserting the projectile 50 into the cavity 22 through the mouth 16. Before, during, or after the projectile 50 is inserted into the cavity 22, propellant 48 can be introduced into the cavity 22. The propellant 48 can be in powder form or solid form. In some embodiments, the propellant 48 can at least partially envelop the projectile 50. The end cap 46 may then be inserted into the cavity 22 through the mouth 16 and slid over the projectile 50 to seat the projectile 50 within the cavity 22. The end cap 46 can be configured to generate a seal so that the propellant 48 is isolated from an environment outside the CT cartridge case 10. The end cap 46 can be secured to the mouth 16 via an interference fit, a mechanical interlock, and/or use of an adhesive. Before, during, or after the propellant 48, the projectile 50, and/or the end cap 46 are inserted, the primer 52 can be seated within the primer pocket 24.

The MIM process can facilitate production of a cartridge case 10 without the need for staking primers 52. For example, the ability to produce and maintain tight tolerances can eliminate the need for staking primers 52. The materials available for use with the MIM process can have better material characteristics, which can lead to better primer 52 retention. The elimination of staking primers can result in a reduction in manufacturing process steps, but still allows for meeting all specification requirements.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A method for producing a cartridge case, the method comprising:
   using an analytical technique to generate variables representing factors and characteristics associated with enabling a cartridge case to be made via a Metal Injection Molding (MIM) process and to enable the MIM generated cartridge case to function properly during subsequent use as ammunition in a weapon, the analytical techniques comprising:
   generating baseline parameters of known cartridge case designs, the parameters including firing, extraction, and recovery performance;
   generating MIM cartridge parameters representing firing, extraction, and recovery performance of MIM cartridge cases; and
   down-selecting a MIM material for use in the MIM process based on a comparison between the baseline parameters and the MIM cartridge parameters:
   subjecting the down-selected MIM material to the MIM process to form the MIM cartridge case having an elongated member with a head at its first end, a mouth at its second end, and a body lying between the head and the mouth, wherein:
      the body further comprises sidewalls conjoined with a base to form a hollow cavity;
      the head further comprises the base;
      the mouth is further configured to receive a projectile; and
      the MIM cartridge case consists essentially of MIM material.

2. The method recited in claim 1, wherein:
   the hollow cavity is configured to contain propellant; and
   the base further comprises a primer pocket structured to receive and retain a primer, the primer pocket further comprising a vent formed within the primer pocket that extends from the primer pocket to the hollow cavity.

3. The method recited in claim 1, further comprising generating an end cap.

4. The method recited in claim 3, wherein the elongated member is produced by a first MIM material and the end cap is produced by at least one of plastic injection molding a polymer and MIM processing a second MIM material.

5. The method recited in claim 4, further comprising using an analytical technique to generate variables representing factors and characteristics associated with enabling the cartridge case and/or the end cap to be made via the MIM processes and to enable the MIM generated cartridge case and/or end cap to function properly during subsequent use as ammunition in a weapon.

6. The method recited in claim 4, further comprising mixing or kneading powdered metal and/or powdered metal alloy(s) with a binder material to form the first MIM material and/or the second MIM material.

7. The method recited in claim 6, further comprising:
   at least partially melting the binder material to form a semisolid metal-binder slurry;
   injecting the semisolid metal-binder slurry into a die cavity to form a green preform;
   thermally debinding and/or chemically debinding the green preform to generate a net-shape component; and,
   sintering the net-shape component for densification and to generate the elongated member and/or the end cap.

8. The method recited in claim 3, further comprising configuring the end cap to slidably insert into the mouth.

9. The method recited in claim 3, further comprising configuring the end cap to receive and retain the projectile.

10. The method recited in claim 3, further comprising configuring the end cap to generate a seal between the end cap and at least one of the elongated member and the projectile.

11. The method recited in claim 3, further comprising configuring the body and/or the end cap to at least partially envelop the projectile.

12. The method recited in claim 3, wherein the end cap consists essentially of powdered metal and/or powdered metal alloy(s) that has been subjected to the MIM process.

13. The method recited in claim 3, wherein the end cap consists of powdered metal and/or powdered metal alloy(s) that has been subjected to the MIM process.

14. The method recited in claim 1, wherein the elongated member consists essentially of powdered metal and/or powdered metal alloy(s) that has been subjected to the MIM process.

15. The method recited in claim 1, wherein the elongated member consists of powdered metal and/or powdered metal alloy(s) that has been subjected to the MIM process.

16. The method recited in claim 1, further comprising mixing or kneading powdered metal and/or powdered metal alloy(s) with a binder material to form the MIM material.

17. The method recited in claim 16, further comprising:
   at least partially melting the binder material to form a semisolid metal-binder slurry;
   injecting the semisolid metal-binder slurry into a die cavity to form a green preform;
   thermally debinding and/or chemically debinding the green preform to generate a net-shape component; and,
   sintering the net-shape component for densification and to generate the elongated member.

* * * * *